US010613284B2

(12) United States Patent
Elford et al.

(10) Patent No.: US 10,613,284 B2
(45) Date of Patent: Apr. 7, 2020

(54) FIBER-TO-THE-PREMISES (FTTP) METHODS AND SYSTEMS

(71) Applicant: CenturyLink Intellectual Property LLC, Denver, CO (US)

(72) Inventors: Michael L. Elford, Calhoun, LA (US); Thomas C. Barnett, Jr., Atchison, KS (US); Michael P. Winterrowd, Calhoun, LA (US); Thomas Schwengler, Lakewood, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 14/517,574

(22) Filed: Oct. 17, 2014

(65) Prior Publication Data

US 2015/0110453 A1      Apr. 23, 2015

Related U.S. Application Data

(60) Provisional application No. 61/893,034, filed on Oct. 18, 2013.

(51) Int. Cl.
*G02B 6/44* (2006.01)
*G02B 6/50* (2006.01)

(52) U.S. Cl.
CPC ......... *G02B 6/4452* (2013.01); *G02B 6/4467* (2013.01); *G02B 6/504* (2013.01);
(Continued)

(58) Field of Classification Search
CPC .................................................. G02B 6/504
See application file for complete search history.

(56) References Cited

U.S. PATENT DOCUMENTS

| 2,754,101 A | 7/1956 | Haworth et al. |
| 4,034,567 A | 7/1977 | Roggen |

(Continued)

FOREIGN PATENT DOCUMENTS

| CA | 2337284 | 8/2002 |
| FR | 2750717 | 1/1998 |

(Continued)

OTHER PUBLICATIONS

U.S. Appl. No. 13/779,488; Final Rejection dated Sep. 24, 2015; 9 pages.

(Continued)

*Primary Examiner* — Sung H Pak
*Assistant Examiner* — Hoang Q Tran

(57) ABSTRACT

Novel tools and techniques are provided for implementing FTTx, which might include Fiber-to-the-Home ("FTTH"), Fiber-to-the-Building ("FTTB"), Fiber-to-the-Premises ("FTTP"), and/or the like. In some embodiments, a method might include routing an F1 line(s) from a central office or DSLAM to a fiber distribution hub ("FDH") located within a block or neighborhood of customer premises, via at least an apical conduit source slot. From the FDH, an F2 line(s) might be routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises. An F3 line(s) might be distributed, at the NAP and from the F2 line(s), to a network interface device ("NID") or optical network terminal ("ONT") at each customer premises, via any combination of the Apical Conduit Components, which include channels in at least portions of roadways.

17 Claims, 28 Drawing Sheets

(52) U.S. Cl.
CPC .......... *G02B 6/4416* (2013.01); *G02B 6/4442* (2013.01); *Y10T 29/49718* (2015.01); *Y10T 29/49826* (2015.01)

(56) References Cited

U.S. PATENT DOCUMENTS

| | | | |
|---|---|---|---|
| 4,329,083 | A | 5/1982 | Parkinson |
| 4,815,814 | A | 3/1989 | Ulijasz |
| 4,940,359 | A | 7/1990 | Van Duyn et al. |
| 5,239,129 | A | 8/1993 | Ehrenfels |
| 5,313,546 | A | 5/1994 | Toffetti |
| 5,528,684 | A | 6/1996 | Schneider et al. |
| 5,566,622 | A | 10/1996 | Ziaylek, Jr. et al. |
| 5,583,492 | A * | 12/1996 | Nakanishi .............. G08C 17/02 340/870.02 |
| 5,606,606 | A | 2/1997 | Schneider et al. |
| 5,760,706 | A | 6/1998 | Kiss |
| 5,879,109 | A | 3/1999 | Diermeier et al. |
| 6,099,080 | A | 8/2000 | Hirashita et al. |
| 6,272,346 | B1 | 8/2001 | Fujinami |
| 6,371,691 | B1 | 4/2002 | Finzel et al. |
| 6,414,605 | B1 * | 7/2002 | Walden .................. G01D 4/008 340/870.02 |
| 6,499,410 | B1 | 12/2002 | Berardi |
| 6,503,025 | B1 | 1/2003 | Miller |
| 6,807,355 | B2 | 10/2004 | Dofher |
| 6,829,424 | B1 * | 12/2004 | Finzel .................. G02B 6/4446 385/135 |
| 6,866,448 | B2 | 3/2005 | Finzel et al. |
| 6,990,192 | B1 | 1/2006 | Denovich et al. |
| 7,050,683 | B2 | 5/2006 | Dofher |
| 7,095,930 | B2 | 8/2006 | Storaasli et al. |
| 7,514,628 | B2 | 4/2009 | Kadrnoska et al. |
| 7,522,805 | B2 | 4/2009 | Smith et al. |
| 7,674,980 | B2 | 3/2010 | Lubanski |
| 7,740,417 | B2 | 6/2010 | Jang |
| 7,849,886 | B2 | 12/2010 | Carew et al. |
| D640,290 | S | 6/2011 | Stellman et al. |
| 8,061,344 | B2 | 11/2011 | Dofher |
| 8,480,332 | B2 | 3/2013 | Miller et al. |
| 9,062,423 | B2 | 6/2015 | Allouche et al. |
| 9,226,418 | B2 | 12/2015 | Magno et al. |
| 9,270,098 | B2 | 2/2016 | Isaaks et al. |
| 9,466,966 | B2 | 10/2016 | Allouche et al. |
| 9,531,174 | B2 | 12/2016 | Elford et al. |
| 9,588,315 | B1 | 3/2017 | Turner |
| 9,742,172 | B2 | 8/2017 | Elford et al. |
| 9,780,433 | B2 | 10/2017 | Schwengler et al. |
| 9,786,997 | B2 | 10/2017 | Schwengler et al. |
| 2002/0057945 | A1 | 5/2002 | Dahowski |
| 2002/0061231 | A1 | 5/2002 | Finzel et al. |
| 2003/0123935 | A1 | 7/2003 | Dofher |
| 2003/0210958 | A1 | 11/2003 | Nothofer |
| 2004/0115004 | A1 | 6/2004 | Serrano |
| 2004/0129445 | A1 | 7/2004 | Winkelbach |
| 2004/0142658 | A1 | 7/2004 | McKenna |
| 2004/0221324 | A1 | 11/2004 | Ansari et al. |
| 2004/0234215 | A1 | 11/2004 | Serrano et al. |
| 2005/0013566 | A1 | 1/2005 | Storaasli |
| 2005/0191113 | A1 | 9/2005 | Frazier |
| 2005/0191133 | A1 | 9/2005 | Purcell |
| 2005/0207711 | A1 * | 9/2005 | Vo ........................ G02B 6/4444 385/94 |
| 2005/0259930 | A1 | 11/2005 | Elkins et al. |
| 2005/0285807 | A1 | 12/2005 | Zehngut |
| 2006/0008231 | A1 | 1/2006 | Reagan |
| 2006/0093303 | A1 * | 5/2006 | Reagan ................. G02B 6/4466 385/135 |
| 2006/0118338 | A1 | 6/2006 | Maybury, Jr. |
| 2006/0204187 | A1 | 9/2006 | Dofher |
| 2007/0018849 | A1 | 1/2007 | Salser, Jr. |
| 2007/0154152 | A1 | 7/2007 | Morris |
| 2008/0298755 | A1 | 12/2008 | Caplan |
| 2009/0177172 | A1 | 7/2009 | Wilkes |
| 2009/0214163 | A1 | 8/2009 | Lu |
| 2009/0317047 | A1 * | 12/2009 | Smith .................. G02B 6/4452 385/135 |
| 2010/0010117 | A1 | 1/2010 | Bricout |
| 2010/0047021 | A1 | 2/2010 | Scola |
| 2010/0071596 | A1 | 3/2010 | Konczak |
| 2010/0086254 | A1 | 4/2010 | Dofher |
| 2010/0243096 | A1 * | 9/2010 | Berglund ............. G02B 6/4459 138/107 |
| 2011/0016754 | A1 | 1/2011 | Ruhl et al. |
| 2011/0052131 | A1 | 3/2011 | Park et al. |
| 2011/0315259 | A1 | 12/2011 | Kelly |
| 2012/0048148 | A1 | 3/2012 | Konczak |
| 2012/0195694 | A1 | 8/2012 | Konczak |
| 2012/0268886 | A1 | 10/2012 | Leontiev |
| 2013/0011198 | A1 | 1/2013 | Pichler |
| 2013/0044918 | A1 | 2/2013 | Nielsen et al. |
| 2013/0121761 | A1 | 5/2013 | Dixon |
| 2013/0216187 | A1 | 8/2013 | Dowling |
| 2013/0216313 | A1 | 8/2013 | Gustavsson et al. |
| 2013/0223807 | A1 | 8/2013 | Elford et al. |
| 2013/0287500 | A1 | 10/2013 | Miller |
| 2013/0294839 | A1 | 11/2013 | Gustavsson et al. |
| 2014/0146905 | A1 | 5/2014 | Zavadsky |
| 2014/0202571 | A1 * | 7/2014 | Spijker ................ G02B 6/4464 138/108 |
| 2014/0270971 | A1 * | 9/2014 | Allouche ................ E01F 9/041 405/184.4 |
| 2014/0327583 | A1 | 11/2014 | Sparks |
| 2015/0035704 | A1 | 2/2015 | Schwengler et al. |
| 2015/0070221 | A1 | 3/2015 | Schwengler et al. |
| 2015/0139598 | A1 | 5/2015 | Barnes et al. |
| 2015/0230008 | A1 | 8/2015 | Elford et al. |
| 2015/0288161 | A1 | 10/2015 | Allouche et al. |
| 2015/0300527 | A1 | 10/2015 | Konczak |
| 2016/0064829 | A1 | 3/2016 | Schaepperle |
| 2016/0109036 | A1 | 4/2016 | Elford et al. |
| 2016/0109678 | A1 | 4/2016 | Schwengler et al. |
| 2016/0112779 | A1 | 4/2016 | Barnett et al. |
| 2016/0226231 | A1 | 8/2016 | Elford et al. |
| 2017/0059802 | A1 | 3/2017 | Elford et al. |
| 2017/0110784 | A1 | 4/2017 | Vermes et al. |
| 2017/0317482 | A1 | 11/2017 | Elford et al. |
| 2017/0358837 | A1 | 12/2017 | Schwengler et al. |
| 2017/0358869 | A1 | 12/2017 | Schwengler et al. |
| 2018/0084596 | A1 | 3/2018 | Schwengler et al. |
| 2018/0136424 | A1 | 5/2018 | Elford |
| 2018/0196216 | A1 | 7/2018 | Elford et al. |
| 2019/0107683 | A1 | 4/2019 | Elford et al. |
| 2019/0124425 | A1 | 4/2019 | Elford et al. |

FOREIGN PATENT DOCUMENTS

| | | |
|---|---|---|
| GB | 2327680 | 2/1999 |
| JP | H03 139705 | 6/1991 |
| JP | 10-140507 A | 5/1998 |
| WO | WO 99/61710 | 12/1999 |
| WO | WO 02/29947 | 4/2002 |
| WO | WO 2013-130644 A1 | 9/2013 |
| WO | WO 2014-151726 A1 | 9/2014 |

OTHER PUBLICATIONS

PCT International Patent Application No. PCT/US2014/026325, International Preliminary Report on Patentability dated Sep. 15, 2015; 8 pages.

U.S. Appl. No. 14/746,508; Non-Final Rejection dated Dec. 3, 2015; 16 pages.

International Search Report and Written Opinion prepared by the U.S. Patent and Trademark Office as International Search Authority in PCT International Patent Application No. PCT/US2014/026325, dated Aug. 8, 2014; 12 pages.

International Search Report and Written Opinion prepared by the U.S. Patent and Trademark Office as International Searching Authority for PCT International Patent Application No. PCT/US2013/0280 dated May 3, 2013; 20 pages.

Preliminary Report on Patentability for PCT International Patent Application No. PCT/US2013/0280 dated Sep. 12, 2014; 13 pages.

(56) References Cited

OTHER PUBLICATIONS

Publication Notice of PCT International Patent Application No. PCT/U/26325; dated Sep. 25, 2014; 1 page.
U.S. Appl. No. 13/779,488; Non-final Rejection dated Sep. 10, 2014; 11 pages.
U.S. Appl. No. 13/779,488; Requirement for Restriction/Election dated May 30, 2014; 5 pages.
U.S. Appl. No. 14/209,754; Non-Final Rejection dated Jan. 13, 2015; 16 pages.
U.S. Appl. No. 13/779,488; Final Rejection dated Feb. 9, 2015; 9 pages.
U.S. Appl. No. 14/209,754; Notice of Allowance dated Feb. 18, 2015; 11 pages.
U.S. Appl. No. 13/779,488; Non-final Rejection dated Jun. 11, 2015; 11 pages.
U.S. Appl. No. 14/209,754; Issue Notification dated Jun. 3, 2015; 1 page.
U.S. Appl. No. 13/779,488; Non-final Rejection dated Feb. 17, 2016; 13 pages.
U.S. Appl. No. 13/779,488; Final Rejection dated May 2, 2016; 7 pages.
U.S. Appl. No. 13/779,488; Notice of Allowance dated Aug. 16, 2016; 16 pages.
U.S. Appl. No. 14/316,665; Non-Final Rejection dated Aug. 10, 2016; 38 pages.
U.S. Appl. No. 14/316,676; Non-Final Rejection dated Aug. 10, 2016; 43 pages.
U.S. Appl. No. 14/578,851; Non-Final Rejection dated Jun. 8, 2016; 26 pages.
U.S. Appl. No. 14/746,508; Notice of Allowance dated May 25, 2016; 13 pages.
U.S. Appl. No. 14/746,508; Supplemental Notice of Allowability date Sep. 9, 2016; 3 pages.
U.S. Appl. No. 14/973,458; Non-Final Rejection dated Jun. 7, 2016; 25 pages.
U.S. Appl. No. 14/746,508; Issue Notification dated Sep. 21, 2016; 1 page.
European Patent Application No. 14768062.3; Extended European Search Report dated Oct. 18, 2016; 5 pages.
U.S. Appl. No. 14/578,851; Non-Final Rejection dated Nov. 17, 2016; 17 pages.
U.S. Appl. No. 14/973,458; Non-Final Rejection dated Nov. 18, 2016; 21 pages.
U.S. Appl. No. 14/971,243; Notice of Allowance dated Apr. 17, 2017; 23 pages.
U.S. Appl. No. 14/578,851; Non-Final Rejection dated May 3, 2017; 19 pages.
U.S. Appl. No. 14/973,458; Non-Final Rejection dated May 3, 2017; 21 pages.
U.S. Appl. No. 15/352,869; Non-Final Rejection dated May 15, 2017; 20 pages.
U.S. Appl. No. 14/316,665; Notice of Allowance dated May 19, 2017; 15 pages.
U.S. Appl. No. 14/316,676; Notice of Allowance dated May 19, 2017; 12 pages.
U.S. Appl. No. 14/973,470; Non-Final Rejection dated Jul. 3, 2017; 34 pages.
U.S. Appl. No. 14/316,665; Final Rejection dated Feb. 8, 2017; 17 pages.
U.S. Appl. No. 14/316,676; Non-Final Rejection dated Feb. 14, 2017; 17 pages.
U.S. Appl. No. 14/971,243; Non-Final Rejection dated Dec. 29, 2016; 51 pages.

\* cited by examiner

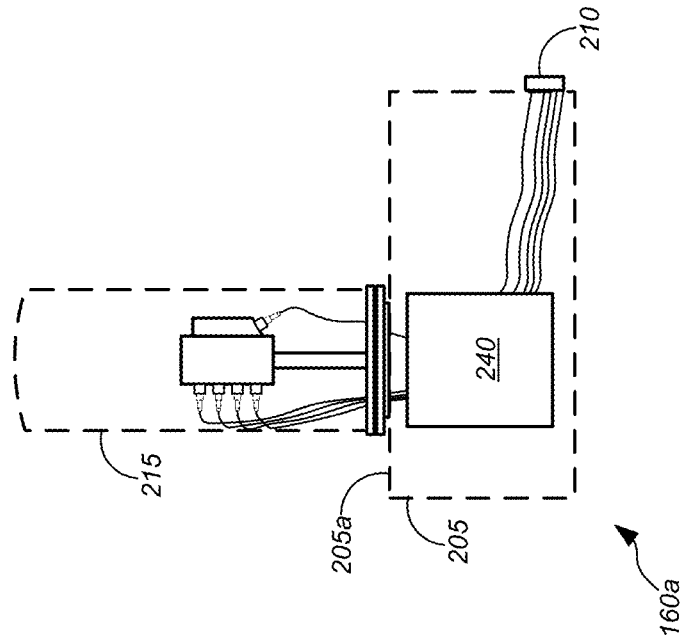
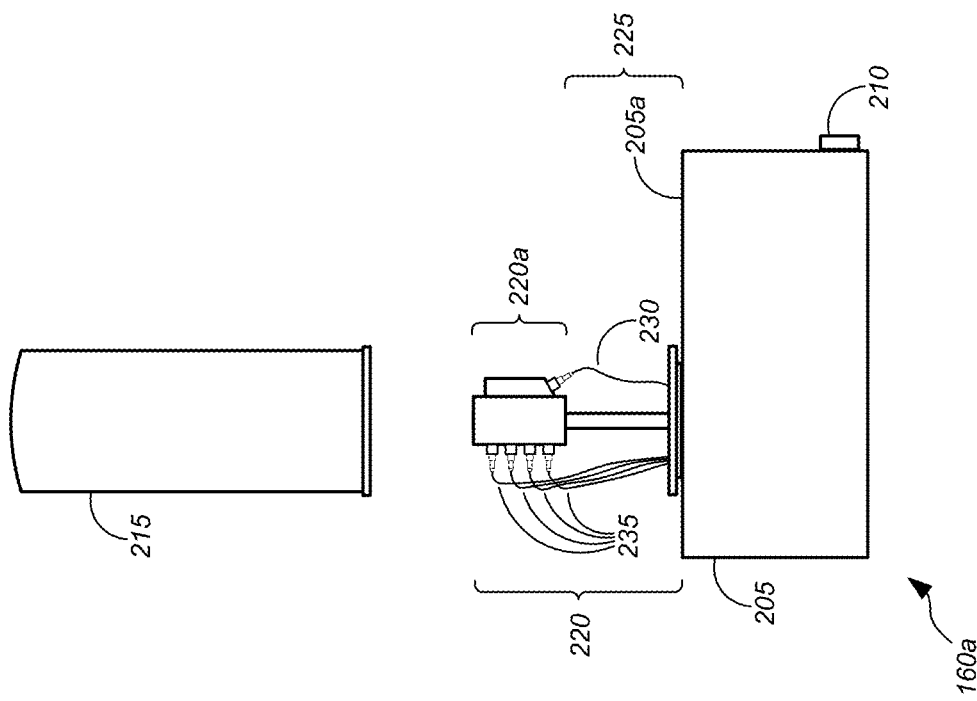

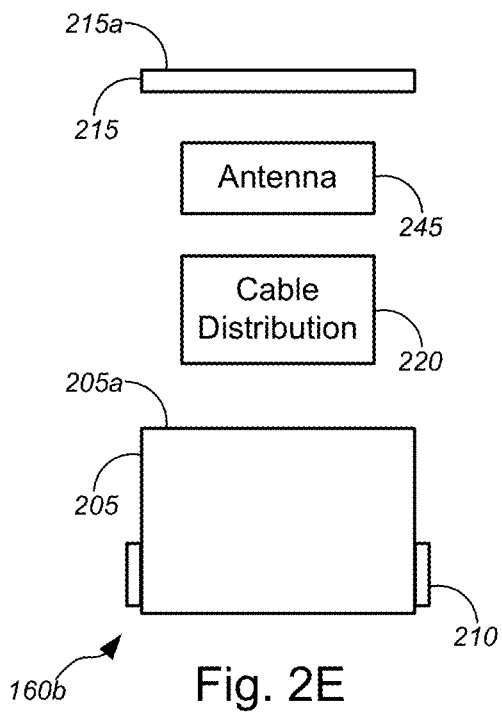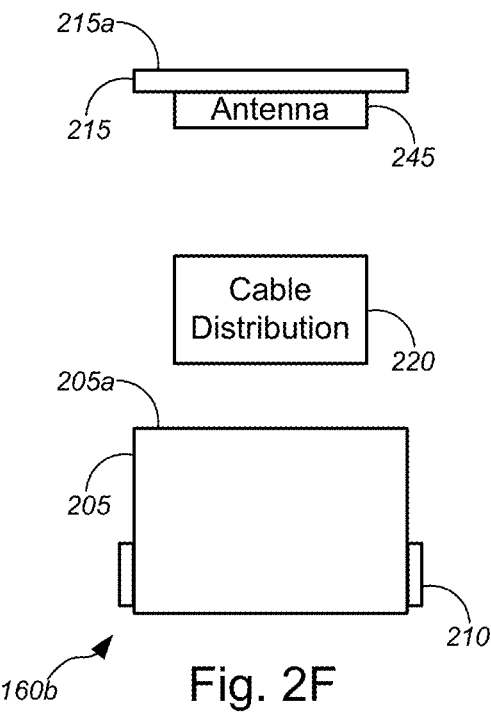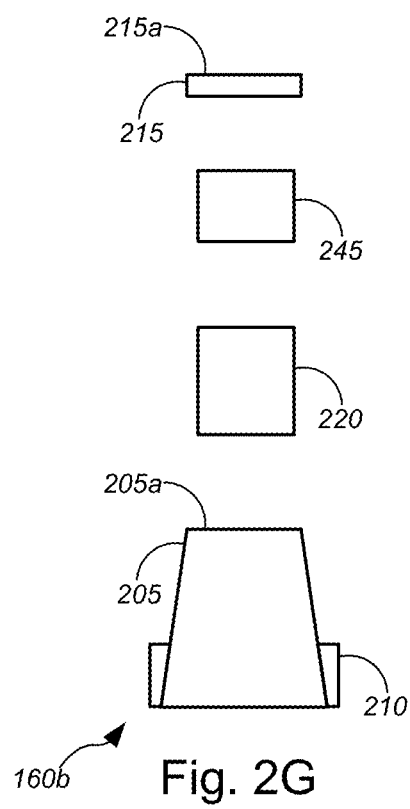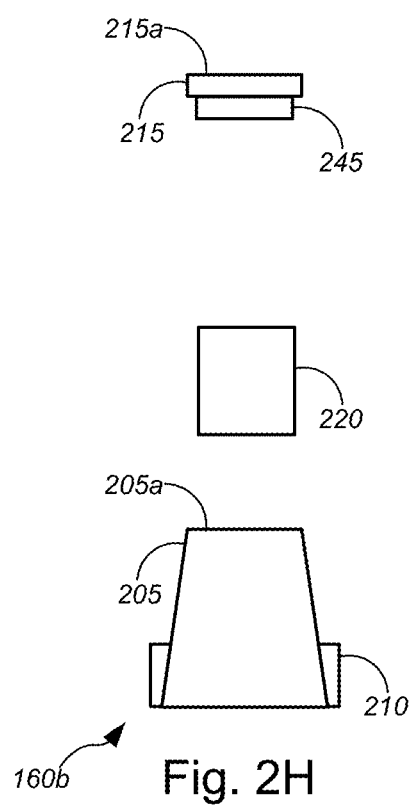

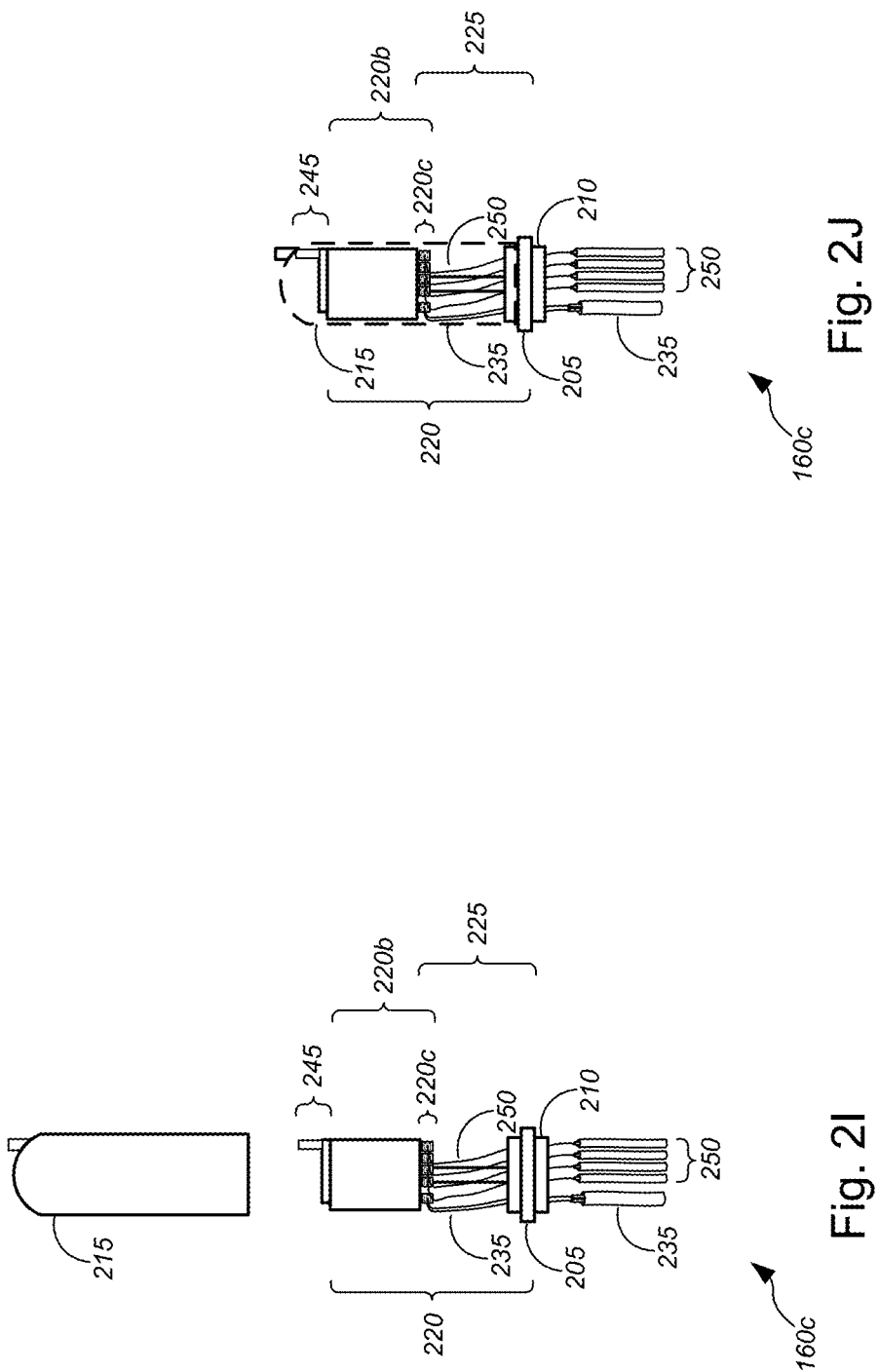

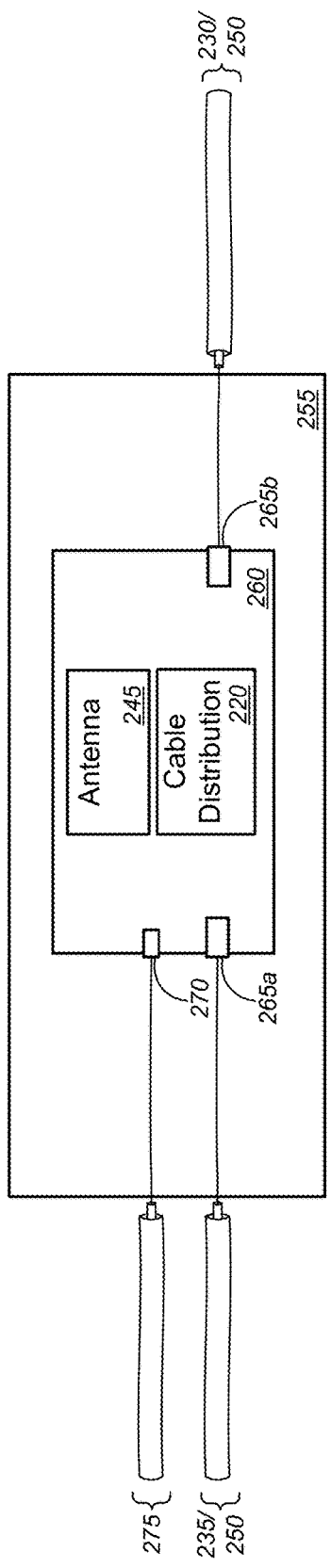
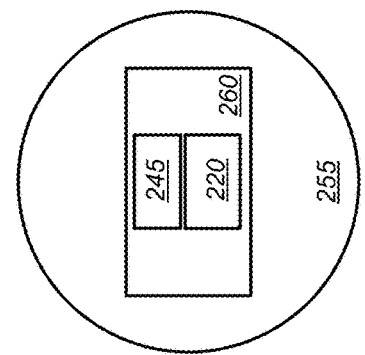
Fig. 2M
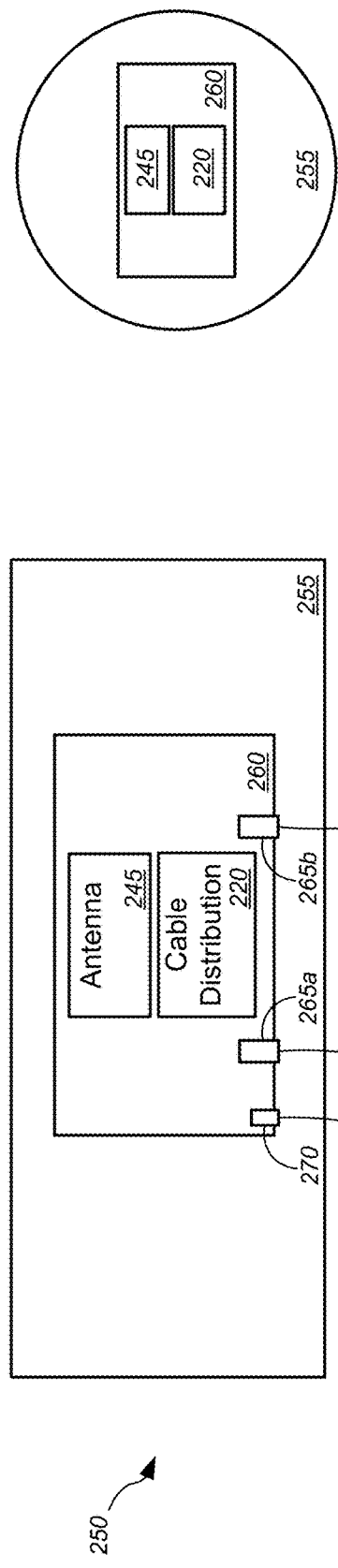
Fig. 2K
Fig. 2L

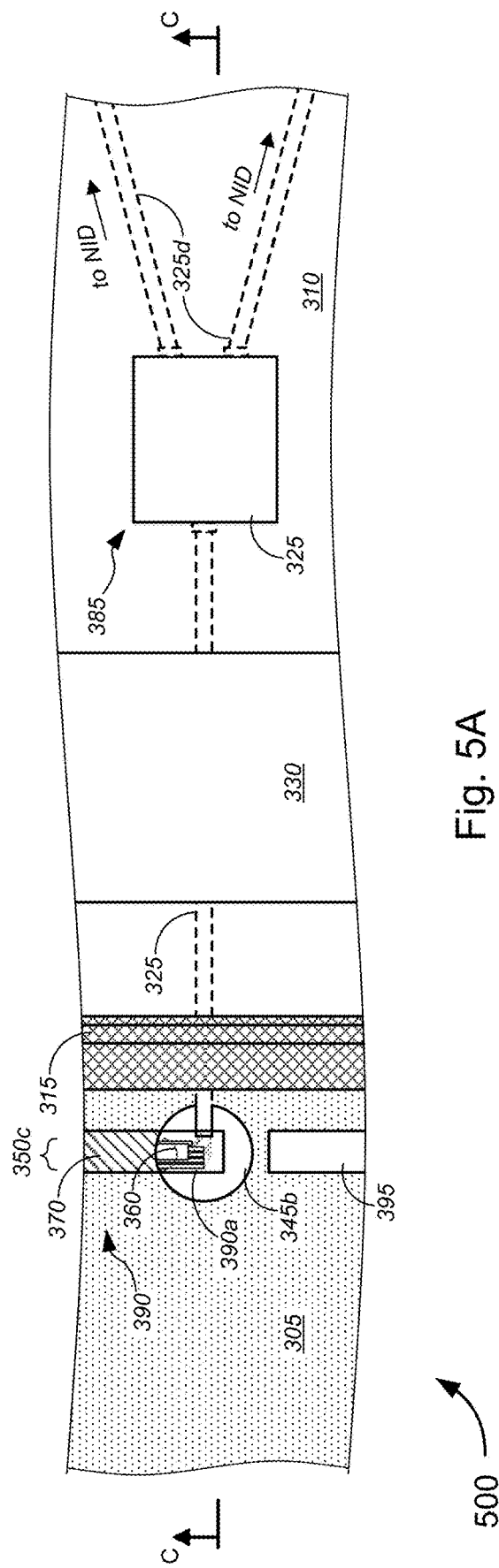
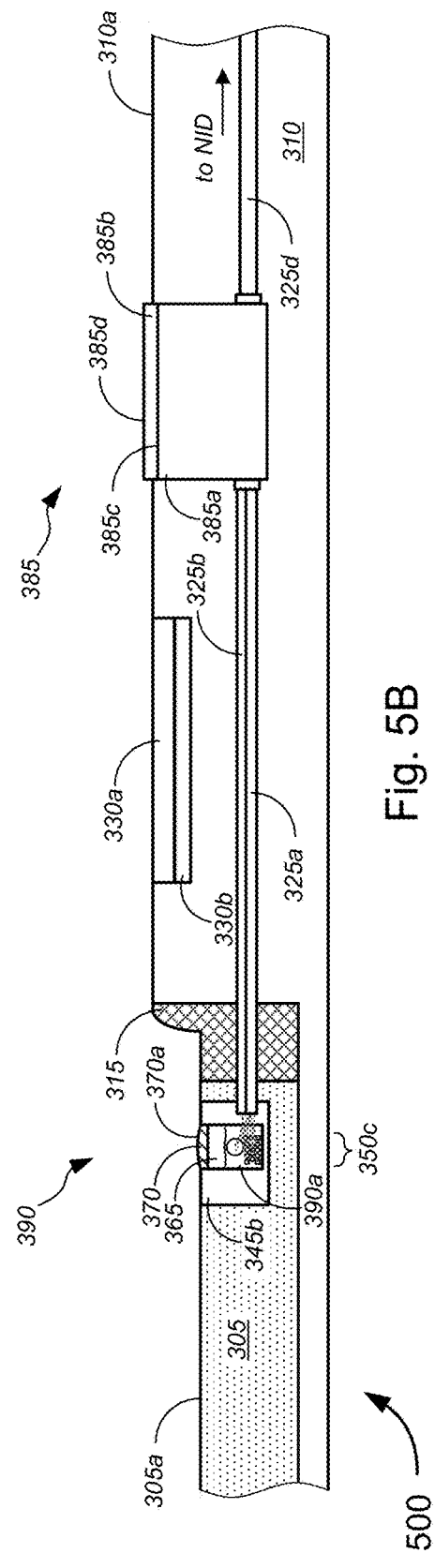
Fig. 5A
Fig. 5B

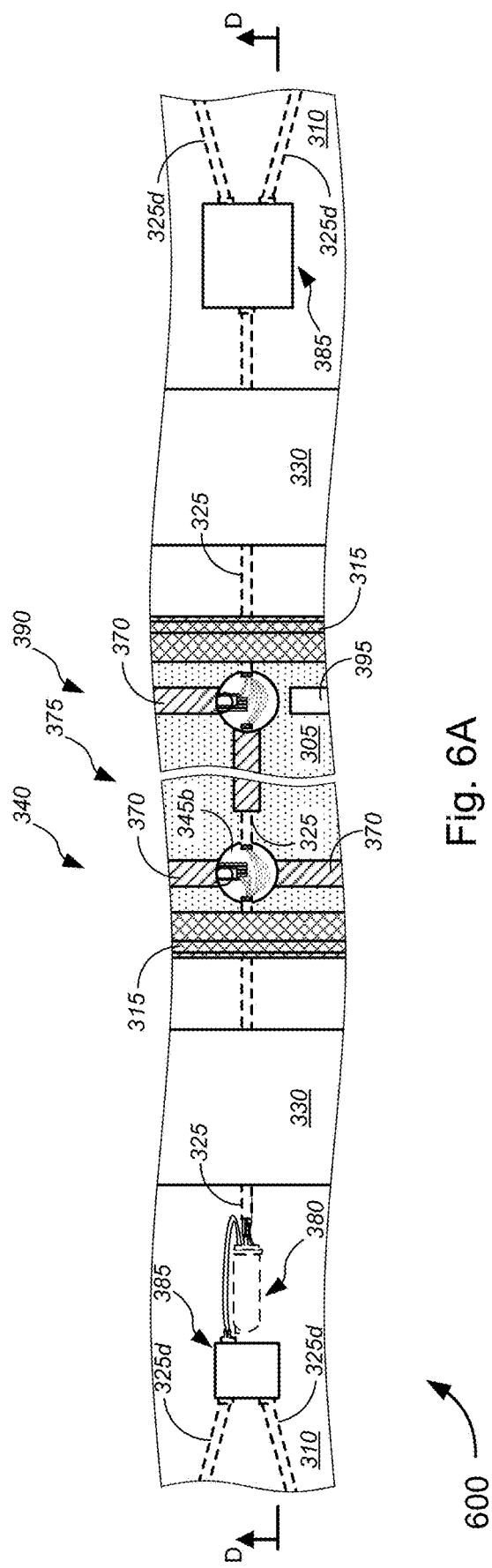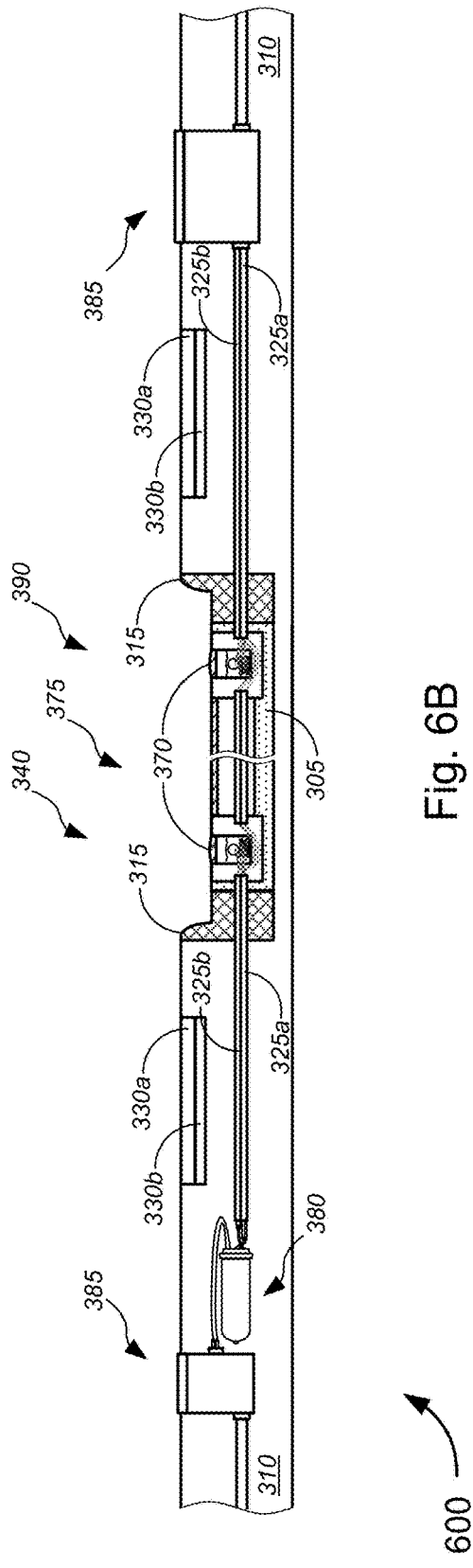

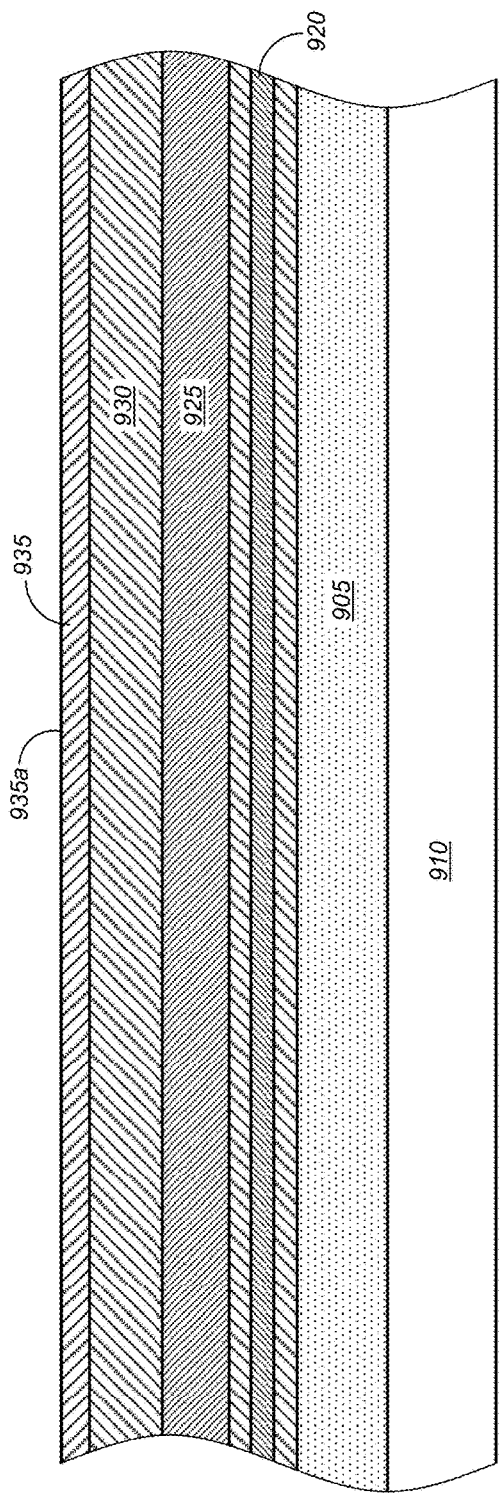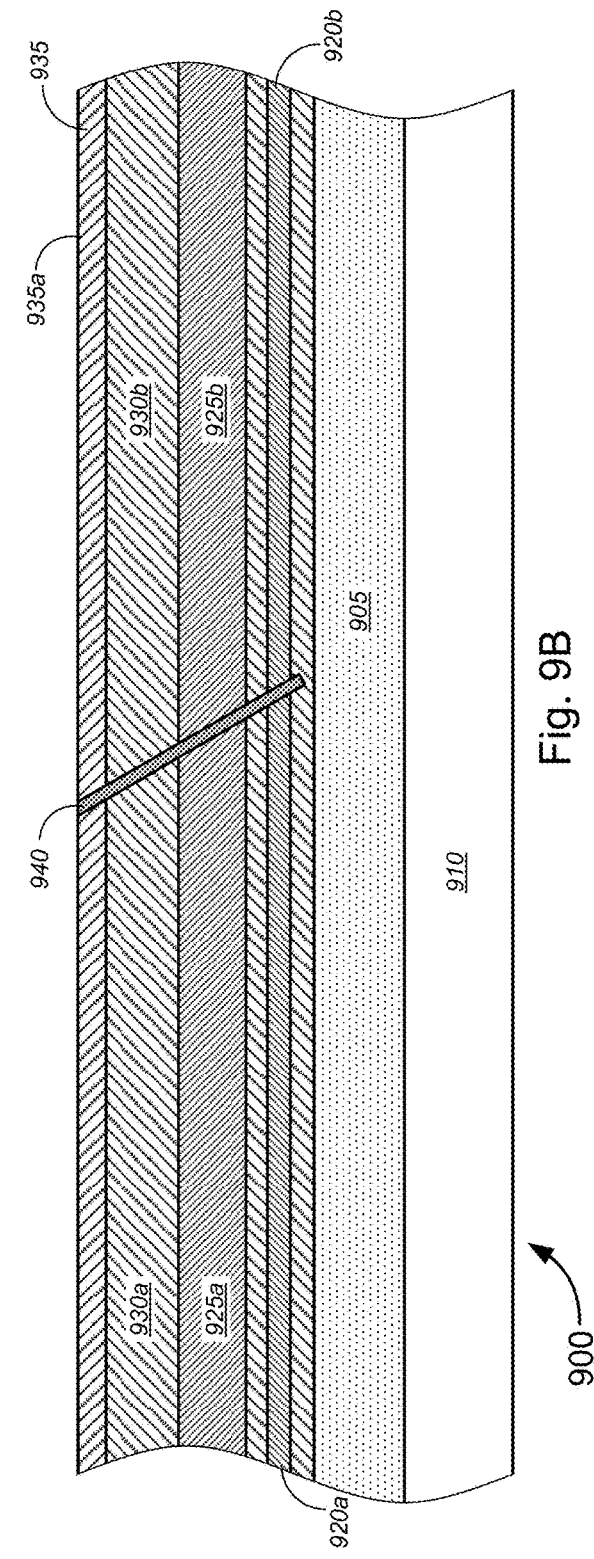

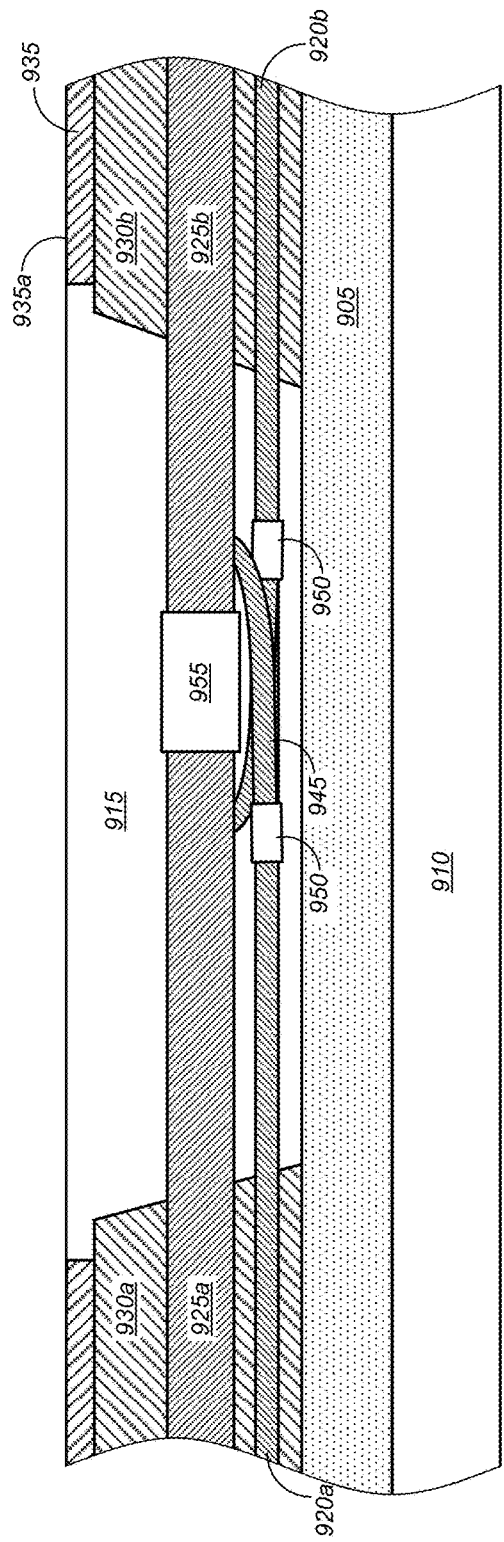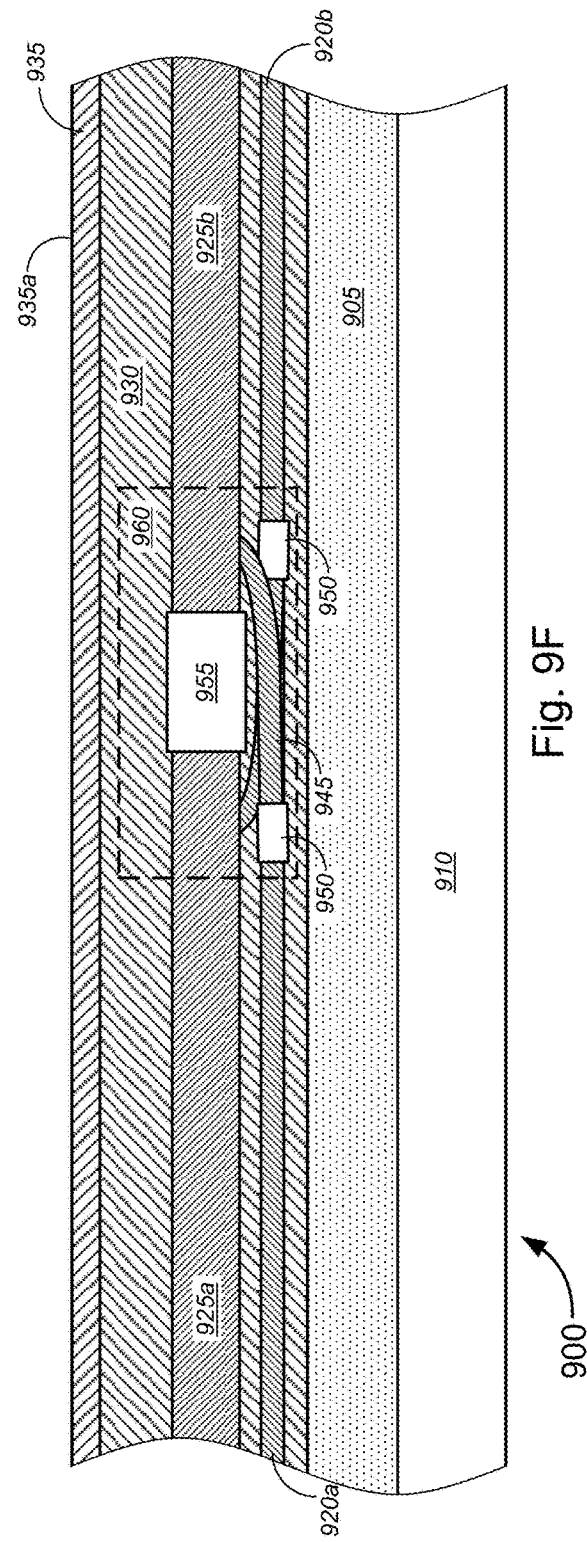

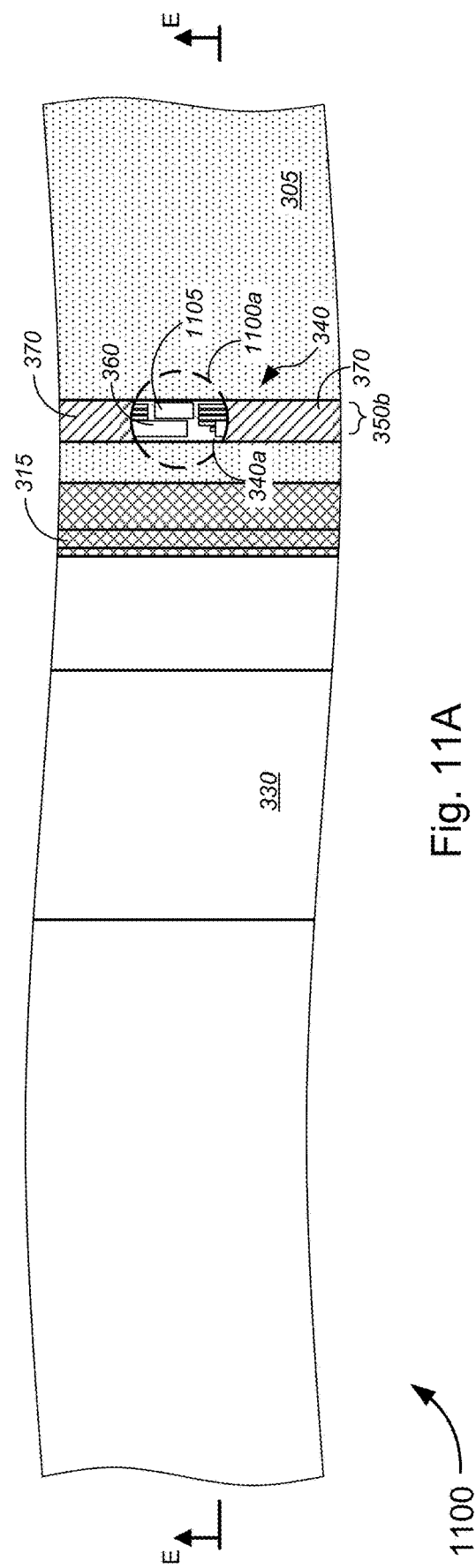

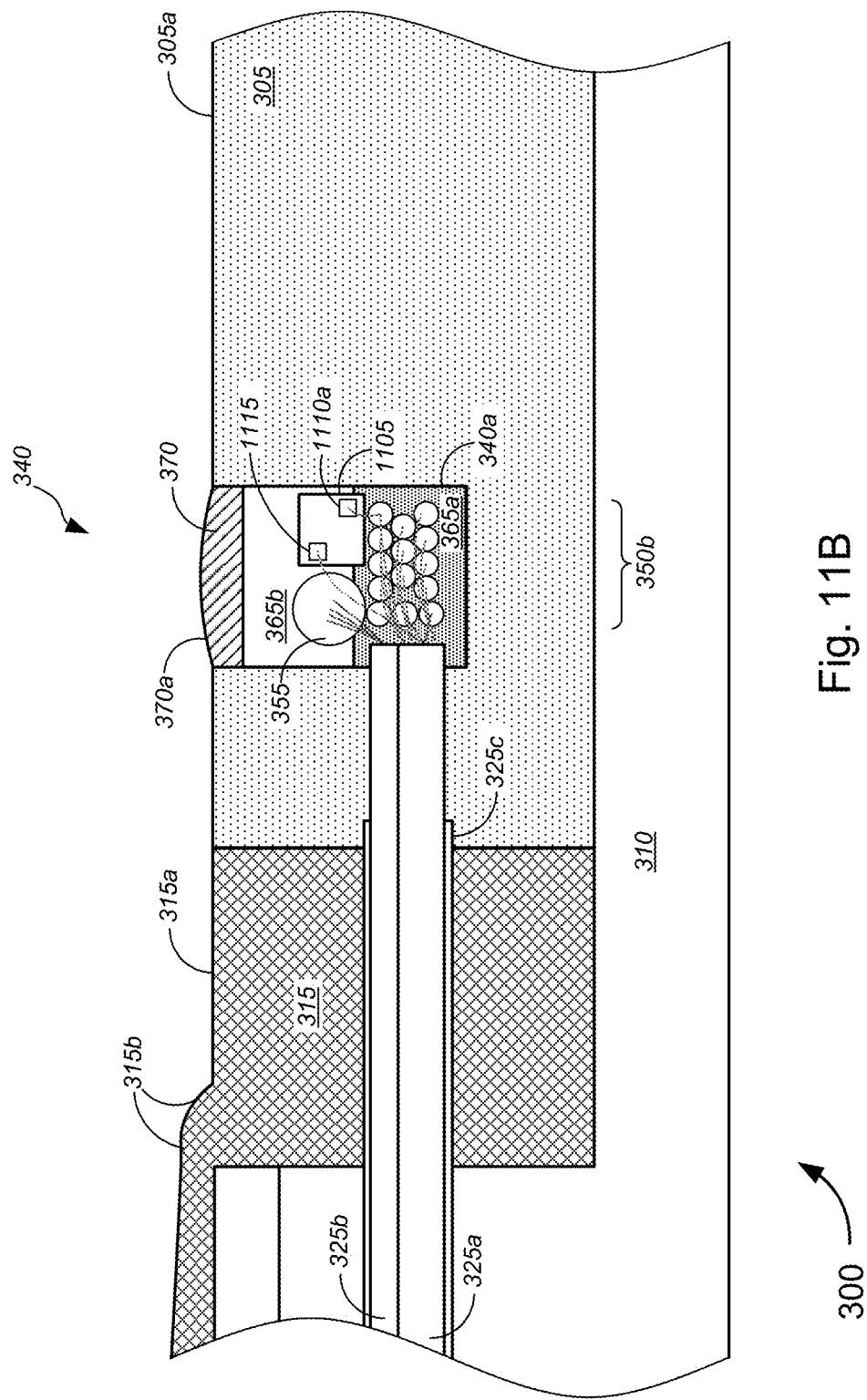

FIBER-TO-THE-PREMISES (FTTP) METHODS AND SYSTEMS

CROSS-REFERENCES TO RELATED APPLICATIONS

This application claims priority to U.S. Patent Application Ser. No. 61/893,034 (the "'034 application"), filed Oct. 18, 2013 by Michael L. Elford et al., entitled, "Fiber-to-the-Home (FTTH) Methods and Systems." This application may also be related to U.S. Patent Application Ser. No. 61/874,691 (the "'691 application"), filed Sep. 6, 2013 by Thomas Schwengler et al., entitled, "Wireless Distribution Using Cabinets, Pedestals, and Hand Holes"; U.S. patent application Ser. No. 14/316,676 (the "'676 application"), filed on Jun. 26, 2014 by Thomas Schwengler et al., entitled, "Wireless Distribution Using Cabinets, Pedestals, and Hand Holes," which claims priority to the '691 application"; U.S. Patent Application Ser. No. 61/861,216 (the "'216 application"), filed Aug. 1, 2013 by Thomas Schwengler et al., entitled, "Wireless Access Point in Pedestal or Hand Hole"; and U.S. patent application Ser. No. 14/316,665 (the "'665 application"), filed on Jun. 26, 2014 by Thomas Schwengler et al., entitled, "Wireless Access Point in Pedestal or Hand Hole," which claims priority to the '216 application. This application may also be related to U.S. Patent Application Ser. No. 61/604,020 (the "'020 application"), filed Feb. 28, 2012 by Michael L. Elford et al., entitled, "Apical Conduit and Methods of Using Same," U.S. Patent Application Ser. No. 61/636,227 (the "'227 application"), filed Apr. 20, 2012 by Michael L. Elford et al., entitled, "Apical Conduit and Methods of Using Same," U.S. patent application Ser. No. 13/779,488 (the "'488 application"), filed Feb. 27, 2013 by Michael L. Elford et al., entitled, "Apical Conduit and Methods of Using Same," which claims priority to the '020 and '227 applications; U.S. Patent Application Ser. No. 61/793,514 (the "'514 application"), filed Mar. 15, 2013 by Erez N. Allouche et al., entitled, "Cast-in-Place Fiber Technology," U.S. patent application Ser. No. 14/209,754 (the "'754 application"), filed Mar. 13, 2014 by Erez N. Allouche et al., entitled, "Cast-in-Place Fiber Technology," which claims priority to the '514 application; U.S. Patent Application Ser. No. 61/939,109 (the "'109 application"), filed Feb. 12, 2014 by Michael L. Elford et al., entitled, "Point-to-Point Fiber Insertion."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing telecommunications signal relays, and, more particularly, to methods, systems, and apparatuses for implementing FTTx, which might include Fiber-to-the-Home ("FTTH"), Fiber-to-the-Building ("FTTB"), Fiber-to-the-Premises ("FTTP"), Fiber-to-the-Node ("FTTN"), Fiber-to-the-Curb ("FTTC"), and/or the like.

BACKGROUND

While pedestals and hand holes have been used in the telecommunications field, Fiber to the Premises ("FTTP") has not (to the knowledge of the inventors and as of the filing of the Related Applications) been implemented from a central office ("CO") or digital subscriber line multiple access ("DSLAM") to customer premises via apical conduit systems that are at least in part set within roadway surfaces. Further, such pedestal and hand hole systems have not been implemented from the CO or DSLAM to a fiber distribution hub ("FDH") in a block or neighborhood of customer premises, and subsequently distributed to network interface devices ("NIDs") or optical network terminals ("ONTs") via network access points ("NAPs"), hand holes, ground-based conduits, and/or the like, using the aforementioned apical conduit systems.

Rather, currently available systems for broadband voice, data, and/or video access within customer premises (whether through wired or wireless connection) typically require a physical cable connection (either via optical fiber connection or copper cable connection, or the like) directly to network access devices or optical network terminals located at (in most cases mounted on an exterior wall of) the customer premises, or require satellite transmission of voice, data, and/or video signals to a corresponding dish mounted on the customer premises. Many of these broadband access architectures rely on aerial or buried techniques that do not utilize the potential (both in terms of cost, efficiency, flexibility, system strength and reliability, minimal ecological impact, visual unobstructiveness, and/or the like) of micro-trenching or similar techniques applicable to apical conduit systems. Thus, such systems are costly, difficult to implement, and difficult to repair when damaged.

Hence, there is a need for more robust and scalable solutions for implementing FTTx, including FTTH, FTTB, FTTP, FTTN, FTTC, and/or the like.

BRIEF SUMMARY

Various embodiments provide tools and techniques for implementing FTTx, which might include Fiber-to-the-Home ("FTTH"), Fiber-to-the-Building ("FTTB"), Fiber-to-the-Premises ("FTTP"), Fiber-to-the-Node ("FTTN"), Fiber-to-the-Curb ("FTTC"), and/or the like. In some embodiments, a method might include routing an F1 line(s) from one of a central office ("CO"), a digital subscriber line access multiplexer ("DSLAM"), and/or near/within a block or neighborhood of customer premises (collectively, "source"), to a fiber distribution hub ("FDH") located within the block or neighborhood of customer premises, via at least an apical conduit source slot. From the FDH, an F2 line(s) might be routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises. An F3 line(s) might be distributed, at the NAP and from the F2 line(s), to a network interface device ("NID") or optical network terminal ("ONT") at each customer premises, via any combination of the Apical Conduit Components, which might include channels in at least portions of roadways.

According to some embodiments, a method may be provided for repairing any damage to any of the lines within apical conduit systems. Such a method might include locating the damage in the lines, removing the capping material over a predetermined length (e.g., 30 ft) approximately centered about the damage in the line, removing the filler material encapsulating the damaged line(s) and/or microduct(s) to expose first ends and second ends of the damaged line(s) and/or microduct(s), and lifting the first ends and the second ends of the damaged line(s) and/or microduct(s) from the channel of the source/main/cross/far-side slot of the apical conduit system. The method might further include, without limitation, splicing the first ends and the second ends of the damaged line(s) and/or microduct(s) with splices, placing the spliced damaged line(s) and/or microduct(s) in the channel, placing the filler material in the channel, and placing the capping material in the channel over the filler material.

Some advantages of the systems described herein include, without limitation, relatively low costs, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein, surface trenching refers to a technique that is not unlike conventional micro-trenching techniques, except that trenching is within the top layer (e.g., asphalt layer or concrete layer, etc.) and not below the top layer. Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTTP using apical conduit system techniques and in terms of line repair (as described above). Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

In an aspect, a method might comprise placing one or more first lines in one or more first channels in a first ground surface, placing one or more second lines in one or more second channels in a second ground surface, and placing a filler material in at least one of at least a portion of the one or more first channels or at least a portion of the one or more second channels. The method might also comprise placing a container of a signal distribution device in a third ground surface. A top portion of the container might be one of substantially level with a top portion of the third ground surface or below the top portion of the third ground surface. The method might further comprise communicatively coupling the one or more first lines with the one or more second lines via a cable distribution device disposed within the signal distribution device.

According to some embodiments, each of the one or more first lines or the one or more second lines might comprise one or more of at least one conduit, at least one optical fiber, at least one conductive signal line, or at least one power line via the container. The at least one conductive signal line comprises at least one of one or more data cables, one or more video cables, or one or more voice cables.

In some embodiments, the method might further comprise placing one or more third lines in one or more third channels in the third ground surface, communicatively coupling, with a network access point ("NAP"), the one or more third lines with the one or more second lines, and communicatively coupling the one or more third lines with one or more network interface devices ("NIDs") each disposed on an exterior surface of a customer premises.

In some cases, the signal distribution device might comprise a fiber distribution hub ("FDH"), where the one or more first lines might communicatively couple at least one of a central office or a digital subscriber line access multiplexer ("DSLAM") of a telecommunications service provider with the FDH, and the one or more second lines might communicatively couple the FDH with a NAP. In alternative cases, the signal distribution device might comprise a NAP, where the one or more first lines might communicatively couple the NAP with a FDH, and the one or more second lines might communicatively couple the NAP with one or more NIDs each disposed on an exterior surface of a customer premises.

According to some embodiments, at least one channel of the one or more first channels and at least one channel of the one or more second channels is the same channel. In some instances, the filler material might comprise a thermosetting material and/or polyurea, or the like.

Merely by way of example, in some cases, at least a portion of the first ground surface might be a roadway surface, at least a portion of the second ground surface might be one of a roadway surface or a non-roadway surface, at least a portion of the third ground surface might be a non-roadway surface. The method might further comprise placing a capping material in the at least one of at least a portion of the one or more first channels or at least a portion of the one or more second channels, above the filler material. In some instances, the capping material might serve as road lines on the roadway surface.

In another aspect, a communications system might comprise an apical conduit system and a signal distribution device. The apical conduit system might comprise one or more first lines disposed in one or more first channels in a first ground surface, one or more second lines disposed in one or more second channels in a second ground surface, and a filler material disposed around at least one of the one or more first lines in at least a portion of the one or more first channels or around at least one of the one or more second lines in at least a portion of the one or more second channels. The signal distribution device might comprise a container disposed in a third ground surface. A top portion of the container might be one of substantially level with a top portion of the third ground surface or below the top portion of the third ground surface. The signal distribution device might further comprise a cable distribution device disposed within the signal distribution device and configured to communicatively couple the one or more first lines with the one or more second lines.

According to some embodiments, the signal distribution device might comprise a fiber distribution hub ("FDH"), where the one or more first lines might communicatively couple at least one of a central office or a digital subscriber line access multiplexer ("DSLAM") of a telecommunications service provider with the FDH, and the one or more second lines might communicatively couple the FDH with a network access point ("NAP"). In some cases, the fiber distribution hub might comprise a pedestal disposed above the top portion of the container. In alternative embodiments, the signal distribution device might comprise a NAP, where the one or more first lines might communicatively couple the NAP with a FDH, and the one or more second lines might communicatively couple the NAP with one or more network interface devices ("NIDs") each disposed on an exterior surface of a customer premises. In some instances, the NAP might comprise a direct bury NAP disposed below the top portion of the third ground. In some cases, the NAP might comprise a NAP disposed within one of a hand hole or a flowerpot hand hole that is at least partially disposed below the third ground surface. According to some embodiments, the one or more NIDs might comprise at least one optical network terminal ("ONT"), wherein at least one of the one or more first lines or the one or more second lines comprises at least one optical fiber line.

Merely by way of example, in some embodiments, the communications system might further comprise a wireless access point device comprising a device container and an antenna disposed in the device container. The wireless access point device might be disposed within at least a portion of one of the one or more first channels in the first ground surface. In some cases, the wireless access point device might be at least partially (if not entirely) encapsulated by the filler material. The antenna might be communicatively coupled to at least one of the one or more first lines via one or more pass-throughs in a wall of the device container (in some cases, via a second cable distribution device that is disposed in the device container and that is not unlike the cable distribution device that is disposed within the signal distribution device). In some instance, the wireless access point device might positioned in-line with the at least one of the one or more first lines, while in other cases, the wireless access point might be positioned above the one or more first lines (in some embodiments, within a groove at or near the top of the first channel. According to some embodiments, the device container might have a structure and configuration that is small (to fit within a channel of the apical conduit system), heat resistant, heat insulative, and/or water-tight (despite having cable pass-throughs).

In a further aspect, a method might comprise accessing, via a lid of a wireless access point device that is disposed within at least a portion of a channel in a ground surface, a wireless access point contained within the wireless access point device. The method might further comprise repairing or replacing at least one component of the wireless access point and closing the lid of the wireless access point device. In some embodiments, the method might further comprise removing a first capping material from the channel in the ground surface, prior to accessing the wireless access point contained within the wireless access point device, and placing a second capping material in the channel over the wireless access point device, after closing the lid of the wireless access point device.

In yet another aspect, a method might comprise removing a first capping material from a channel in a ground surface, lifting, from the channel, a first portion of one or more damaged lines, and lifting, from the channel, a second portion of the one or more damaged lines. The first portion of each line of the one or more damaged lines might be at least partially separated from the second portion of the corresponding line of the one or more damaged lines. The method might also comprise splicing the first portion and the second portion of the one or more damaged lines, by installing, for each line of the one or more damaged lines, a splice joining the first portion and the second portion of each line. The method might further comprise placing the one or more spliced lines in the channel and placing a second capping material in the channel.

According to some embodiments, the one or more damaged lines might be encapsulated within a first filler material along with one or more undamaged lines. In such cases, lifting, from the channel, the first portion of one or more damaged lines and lifting, from the channel, the second portion of the one or more damaged lines might comprise forming a cut through the first filler material proximate a location in the first filler material in which the one or more damaged lines is at least partially separated into the first and second portions of the one or more damaged lines, to separate each of the one or more undamaged lines into a first portion of the one or more undamaged lines and a second portion of the one or more undamaged lines and to fully separate each of the one or more damaged lines into the first and second portions of the one or more damaged lines. The first portion of the one or more undamaged lines and the first portion of the one or more damaged lines, both encapsulated in a first portion of the first filler material, may then be lifted from the channel. The second portion of the one or more undamaged lines and the second portion of the one or more damaged lines, both encapsulated in a second portion of the first filler material, may also be lifted from the channel. At least part of the first portion of the filler material may be removed to expose ends of the lifted first portion of the one or more undamaged lines and the lifted first portion of the one or more damaged lines. At least part of the second portion of the filler material may likewise be removed to expose ends of the lifted second portion of the one or more undamaged lines and the lifted second portion of the one or more damaged lines. After placing the one or more spliced lines in the channel and before placing the second capping material in the channel, a second filler material may be placed in the channel.

In some embodiments, splicing the first portion and the second portion of the one or more damaged lines might comprise splicing the first portion and the second portion of the one or more damaged lines, by installing, for each line of the one or more damaged lines, a first splice joining the first portion and the second portion of each line of the one or more damaged lines, and splicing the first portion and the second portion of the one or more undamaged lines, by installing, for each line of the one or more undamaged lines, a second splice joining the first portion and the second portion of each line of the one or more undamaged lines.

In some cases, each of the first capping material or the second capping material might comprise a sealer cap forming a mastic seal over one of the first filler material or the second filler material. Each of the first filler material or the second filler material might comprise a thermosetting material. In some instances, the thermosetting material might comprise polyurea.

Merely by way of example, in some embodiments, the one or more damaged lines might be encapsulated within a first filler material along with one or more undamaged lines. In such cases, lifting, from the channel, the first portion of one or more damaged lines and lifting, from the channel, the second portion of the one or more damaged lines might comprise removing the first filler material to expose ends of the first portion and the second portion of each line of the one or more damaged lines, lifting, from the channel, the first portion and the second portion of one or more damaged lines, without lifting the one or more undamaged lines, and placing a second filler material in the channel, after placing the one or more spliced lines in the channel and before placing the second capping material in the channel.

According to some embodiments, the one or more damaged lines might comprise at least one optical fiber line. In such cases, installing a splice joining the first portion and the second portion of each line might comprise installing, for each of the at least one optical fiber line, a first fiber splice joining a first end of a fiber service loop with a first length of an optical fiber line, and installing, for each of the at least one optical fiber line, a second fiber splice joining a second end of the fiber service loop with a second length of the same optical fiber line. In some cases, the one or more damaged lines might comprise at least one microduct. In such cases, installing a splice joining the first portion and the second portion of each line might comprise installing, for each microduct, a microduct finger splice joining a first length of a microduct with a second length of the same microduct. In some embodiments, placing the one or more spliced lines in the channel might comprise placing a splice case in the channel and placing the one or more spliced lines in the splice case.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2M are general schematic diagrams illustrating various ground-based signal distribution devices that may be used in implementing FTTP, in accordance with various embodiments.

FIGS. 5A-5B are general schematic diagrams illustrating various views of a system for communicatively coupling lines within an apical conduit system and lines within a hand hole for implementing FTTP, in accordance with various embodiments.

FIGS. 6A-6B are general schematic diagrams illustrating various views of a system for communicatively coupling lines within an apical conduit system and lines within a hand hole routed from a NAP through a cross-slot in a road surface for implementing FTTP, in accordance with various embodiments.

FIGS. 9A-9F are general schematic diagrams illustrating a method for implementing line repair for FTTP, in accordance with various embodiments.

FIGS. 11A-11E are general schematic diagrams illustrating various views of a system for communicatively coupling lines within an apical conduit system and lines within a wireless access point device that is located with a channel of the apical conduit system for implementing FTTP, in accordance with various embodiments.

DETAILED DESCRIPTION OF CERTAIN EMBODIMENTS

Figure 1:
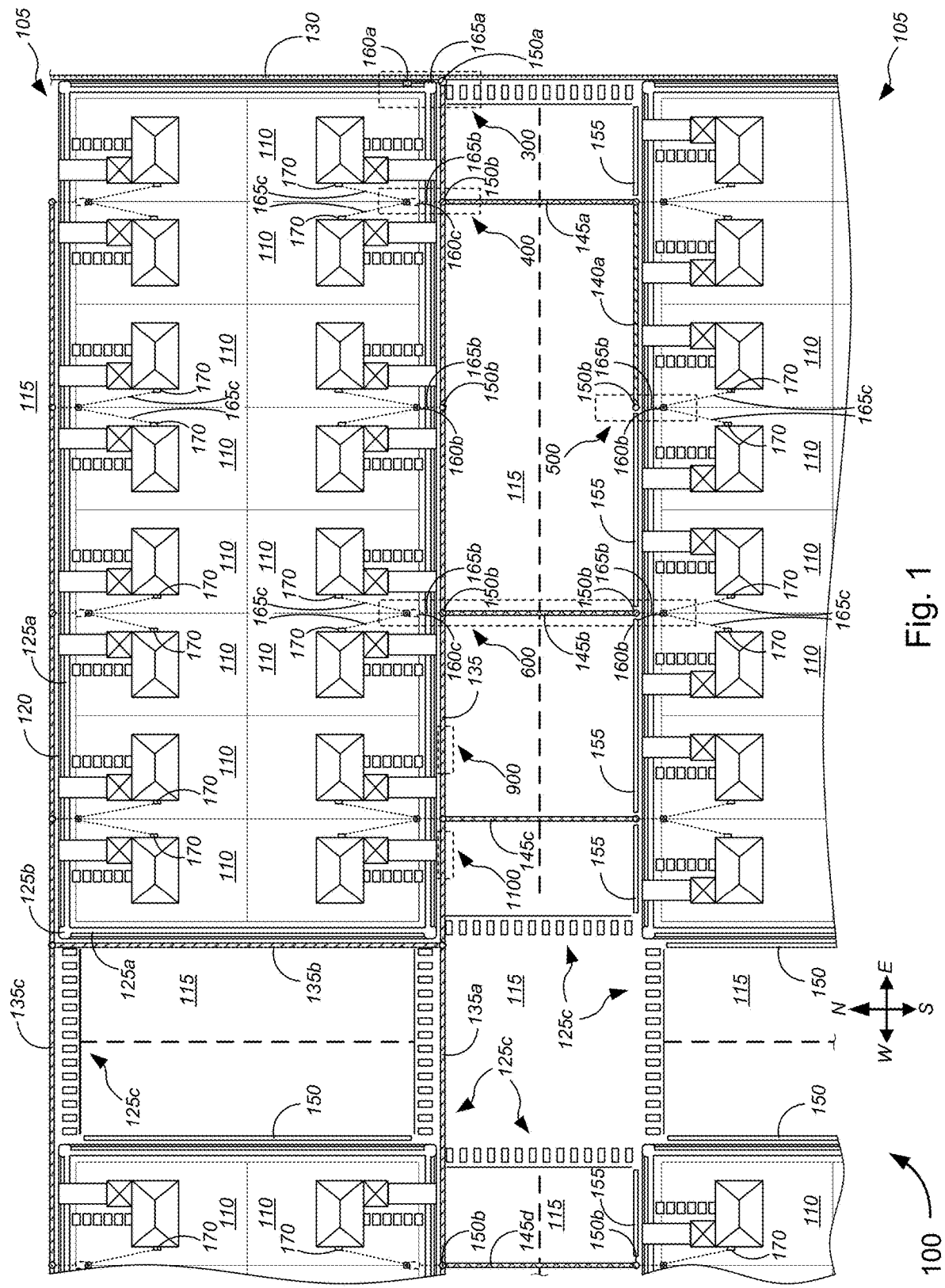
FIG. 1 is a general schematic diagram illustrating a system for implementing Fiber-to-the-Premises ("FTTP"), in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques for implementing telecommunications signal relays, and, in some embodiments, for implementing FTTx, which might include Fiber-to-the-Home ("FTTH"), Fiber-to-the-Building ("FTTB"), Fiber-to-the-Premises ("FTTP"), Fiber-to-the-Node ("FTTN"), Fiber-to-the-Curb ("FTTC"), and/or the like.

In some embodiments, a method might include routing an F1 line(s) from one of a central office ("CO"), a digital subscriber line access multiplexer ("DSLAM"), and/or near/within a block or neighborhood of customer premises (collectively, "source"), to a fiber distribution hub ("FDH") located within the block or neighborhood of customer premises, via at least an apical conduit source slot. From the FDH, an F2 line(s) might be routed, via any combination of apical conduit main slot(s), cross slot(s), far-side slot(s), missile bore(s), bore hole(s), and/or conduit(s) (collectively, "Apical Conduit Components"), to a network access point ("NAP") servicing one or more customer premises. An F3 line(s) might be distributed, at the NAP and from the F2 line(s), to a network interface device ("NID") or optical network terminal ("ONT") at each customer premises, via any combination of the Apical Conduit Components, which might include channels in at least portions of roadways. Each of the F1, F2, and F3 lines might provide single direction communication or bi-directional communication.

In some embodiments, the F1, F2, and F3 lines might each include at least one optical fiber line. In some cases, the F1, F2, and F3 lines might each further include, without limitation, one or more of at least one conductive signal line, at least one power line, and/or the like. The at least one conductive signal line might include, but are not limited to, copper data lines, copper video lines, copper voice lines, or any suitable (non-optical fiber) data cables, (non-optical fiber) video cables, or (non-optical fiber) voice cables, and/or the like.

Merely by way of example, in some embodiments, antenna structures might be implemented to optimize transmission and reception of wireless signals from ground-based signal distribution devices, which include, but are not limited to, FDH, hand holes, and/or NAPs. In some cases, antenna structures might also be implemented within devices (e.g., wireless access point devices) that are imbedded or located within apical conduit channels, as described in detail below with respect to FIGS. 2K and 11A-11E. Wireless applications with such devices and systems might include, without limitation, wireless signal transmission and reception in accordance with IEEE 802.11a/b/g/n/ac/ad/af standards, UMTS, CDMA, LTE, PCS, AWS, EAS, BRS, and/or the like. In some embodiments, an antenna might be provided within a signal distribution device, which might include a container disposed in a ground surface. A top portion of the container might be substantially level with a top portion of the ground surface. The antenna might be communicatively coupled to one or more of at least one conduit, at least one optical fiber line, at least one conductive signal line, or at least one power line via the container and via an apical conduit system(s) installed in a roadway.

According to some embodiments, the methods, apparatuses, and systems might be applied to 2.4 GHz and 5 GHz wireless broadband signal distribution as used with today's IEEE 802.11a/b/g/n/ac lines of products. Given the low profile devices, such methods, apparatuses, and systems may also be applicable to upcoming TV white spaces applications (and the corresponding IEEE 802.11 af standard). In addition, small cells at 600 MHz and 700 MHz may be well-suited for use with these devices. In some embodiments, higher frequencies can be used such as 60 GHz and the corresponding standard IEEE 802.11ad. The '216 and '665 applications, which have been incorporated herein by reference in their entirety, describe in further detail embodiments utilizing wireless access points based on IEEE 802.11ad and a system of ground-based signal distribution devices having these 60 GHz wireless access points disposed therein that are in line of sight of the customer premises. Methods for placing, powering, and backhauling radio access units using a combination of existing copper lines, cabinets, pedestals, hand holes, new power lines, new optical fiber connections to the customer premises, placement of radio equipment in pedestals or hand holes, and/or the like, via use of apical conduit systems are described in detail in the '691, '676, '216, and '665 applications, which are already incorporated herein by reference in their entirely.

According to some embodiments, a method may be provided for repairing any damage to any of the lines within apical conduit systems. Such a method might include locating the damage in the lines, removing the capping material over a predetermined length (e.g., 30 ft) approximately centered about the damage in the line, removing the filler material encapsulating the damaged line(s) and/or microduct(s) to expose first ends and second ends of the damaged line(s) and/or microduct(s), and lifting the first ends and the second ends of the damaged line(s) and/or microduct(s) from the channel of the source/main/cross/far-side slot of the apical conduit system. The method might further include, without limitation, splicing the first ends and the second ends of the damaged line(s) and/or microduct(s) with splices (and in some cases, service loops), placing the spliced damaged line(s) and/or microduct(s) in the channel (in some instances, within a splice box that has been placed in the channel, e.g., during the repair process), placing the filler material in the channel, and placing the capping material in the channel over the filler material.

Some advantages of the systems described herein include, without limitation, relatively low costs, efficiency, flexibility, system strength and reliability, minimal ecological impact, visual unobstructiveness, and/or the like, especially in conjunction with the use of surface trenching techniques as applied to apical conduit systems and the use of ground-based signal distribution systems. Herein, surface trenching refers to a technique that is not unlike conventional micro-trenching techniques, except that trenching is within the top layer (e.g., asphalt layer or concrete layer, etc.) and not below the top layer. In conventional micro-trenching techniques, trenches might extend 12 to 18 inches below the surface of the top layer, and in some cases deeper (reaching below the top layer into or beyond a sub-base layer). In contrast, for surface trenching, trenches might extend a few inches (e.g., 2 to 6 inches), while remaining within the top layer (and not deeper than the top layer). Because surface trenching for apical conduit systems require smaller profile channels or trenches compared to other buried solutions, labor costs and/or equipment costs may be kept low. Surface trenching also allows for flexibility in terms of routing and laying channels and surface trenches, relatively high system strength due to the use of polyurea and/or other thermosetting materials that have been proven in lab tests to have similar (and sometimes better) strength characteristics compared to asphalt (in which the channels or surface trenches are laid) thus leading to reliability, minimal ecological impact due to similar impact compared to asphalt and the like, efficiency in terms of implementing FTTP using apical conduit system techniques and in terms of line repair (as described above). Further, visual unobstructiveness may be achieved by the use of the apical conduit system laid in roadway and other ground surfaces, in conjunction with ground-based signal distribution devices, including a FDH (which includes a pedestal-based FDH with only its pedestal extending above ground surface or a non-pedestal FDH whose lid is substantially level with a ground surface), a NAP(s) (which may be a direct buried NAP that is completely underground), hand holes (whose lids may be substantially level with a ground surface), and/or the like.

Telecommunications companies have precious assets in the ground, and deploy more. The various embodiments herein utilize these assets (and, in some cases, minimal radio infrastructure costs to overlay a fiber or copper plant or network with wireless broadband) to overlay one or more networks distributed within one or more apical conduit systems. In so doing, a cost effective fiber and cable network, with a network for backhaul, may be provided.

In some embodiments, the various embodiments described herein may be applicable to brownfield copper plants, to greenfield fiber roll-outs, and/or the like. Herein, "brownfield" might refer to land on which industrial or commercial facilities are converted (and in some cases decontaminated or otherwise remediated) into residential buildings (or other commercial facilities; e.g., commercial offices, etc.), while "greenfield" might refer to undeveloped land in a city or rural area that is used for agriculture, used for landscape design, or left to naturally evolve. In the telecommunications context, "brownfield" might also refer to land on which a telecommunications company might have some existing facilities and/or inventory (e.g., copper, etc.) and may not require converting the land and/or repurposing commercial facilities, while "greenfield" might also refer to land (which may have existing buildings) on which the telecommunications company might not already have some existing facilities, inventory, and/or services and might require converting the land and/or repurposing commercial or other facilities.

We now turn to the embodiments as illustrated by the drawings. FIGS. 1-11 illustrate some of the features of the method, system, and apparatus for implementing telecommunications signal relays, and, in some embodiments, for implementing FTTx, including FTTH, FTTB, FTTP, FTTN, FTTC, and/or the like, as referred to above. In some embodiments, FIGS. 1-10 might also illustrate some of the features of the method, system, and apparatus for implementing wireless and/or wired transmission and reception of signals through ground-based signal distribution devices, in conjunction with an apical conduit method and system for implementing voice/data/video signals and (in some cases, power signals as well) just under a roadway and/or pathway surface, as describe herein. The methods, systems, and apparatuses illustrated by FIGS. 1-11 refer to examples of different embodiments that include various components and steps, which can be considered alternatives or which can be used in conjunction with one another in the various embodiments. The description of the illustrated methods, systems, and apparatuses shown in FIGS. 1-11 is provided for purposes of illustration and should not be considered to limit the scope of the different embodiments.

Throughout these embodiments, wireless access points—such as ones operating under any of the IEEE 802.11a/b/g/n/ac/ad/af standards discussed above, and described in detail in the '691, '676, '216, and '665 applications, which are already incorporated herein by reference in their entirely—may be implemented in any of the ground-based signal distribution devices (including, without limitation, the FDH, the NAPs, the handholes, the NIDs, the ONTs, and/or the like). In some cases, some or all of these wireless access points may be powered by power lines that are disposed along with the signal lines or fiber lines within the apical conduit system, and such powering of wireless access points is described in detail in the '691 and '676 applications, already incorporated herein by reference in their entirety. The wireless access points may be part of small cells, micro cells, femto cells, pico cells, and/or the like, as appropriate or desired.

With reference to the figures, FIG. 1 is a general schematic diagram illustrating a system 100 for implementing Fiber-to-the-Premises ("FTTP"), in accordance with various embodiments. For simplifying the illustration, the customer premises 110 are shown to be in a grid-like block pattern, and are shown to be of similar design and build. The grid-like block of customer premises is also shown to be oriented along particular cardinal directions (i.e., north, south, east, and west), as indicated in FIG. 1. However, the various embodiments are not so limited, and any arrangement of customer premises (of any variety of sizes and builds) may be applicable, in any arrangement or orientation with respect to the cardinal directions, as appropriate or desired. Moreover, the tools and techniques described herein may be implemented for established neighborhoods/blocks of customer premises or newly constructed ones.

Further, the various embodiments allow for any layout and arrangement of the apical conduit system and components (including, without limitation, source slot, main slot(s), cross-slots, far-side slots, bore holes, missile bores, and/or the like), not necessarily as shown in FIG. 1; the particular layout and arrangement of the apical conduit system and components in FIG. 1 represents only one particular embodiment. Although FIG. 1 shows a plurality of customer premises that are single-family home residences within a neighborhood setting, the various embodiments are not so limited, and the various systems and methods described with respect to FIG. 1 may be applicable to any arrangement and type of customer premises (including, without limitation, customer residences, multi-dwelling units ("MDUs"), commercial customer premises, industrial customer premises, and/or the like) within one or more blocks of customer premises (e.g., residential neighborhoods, university/college campuses, office blocks, industrial parks, mixed-use zoning areas, and/or the like), in which roadways and/or pathways might be adjacent to each of the customer premises.

In the non-limiting example of FIG. 1, blocks 105 might each have located thereon one or more customer premises 110 (which are depicted as single-family homes in FIG. 1, for the sake of illustration). Some of the one or more customer premises might include an attached or detached garage and a driveway, which connects the garage to a roadway 115. Herein, "roadway" might refer to any type of path on which people, vehicles, and the like might travel, and might include asphalt roads, concrete roads, and/or the like. Each block 105 might include a curb 120 along at least portions of the perimeter of the block 105, as well as pathways 125 (which might include, without limitation, sidewalks 125a, street-corner sidewalks 125b, and crosswalks 125c, and/or the like). According to some embodiments, pathways 125 might be made of materials including, but not limited to, asphalt, concrete, pavers, tiles, stone, and/or the like. In some cases, the areas bordered and defined by curb 120, sidewalks 125a, and street-corner sidewalks 125b might include grassy or gravel-filled areas (in some cases, with one or more trees, one or more shrubs, and/or one or more hedges, or the like). In some instances, sidewalks 125a might extend toward, and might be positioned immediately adjacent to, curb 120.

System 100, as shown in FIG. 1, might include, on roadway 115, apical conduit source slot 130, one or more apical conduit main slots 135, one or more apical conduit far-side slots 140, one or more apical conduit cross slots 145, road bores 150, road lines 155, and/or the like. Herein, "apical conduit" might refer to any type of conduit, groove, or channel disposed in a ground surface (particularly, a roadway or pathway surface), in which one or more lines are disposed. The one or more lines might include, without limitation, at least one of one or more conduits, one or more optical fiber cables, one or more conductive signal lines, one or more power lines, and/or the like. The conduit, groove, or channel may be covered with a filler material, including, but not limited to, a thermosetting material (which might include polyurea or the like). In some cases, a capping material might be placed on top of the filler material of the apical conduit, and the capping material might be set to have particular colors, so as to additionally serve as road lines on a roadway surface. In some embodiments, there might be a gap between road lines 155 and any of the apical conduit slots 130-145, while, in some instances, road lines 155 might be extended to abut adjacent apical conduit slots 130-145. According to some embodiments, colored capping material might be used to fill at least a portion of the channel, as well as to extend further along the surface of the roadway to serve as a continuous road line.

Road bores 150 provide vertical access, from a top surface of roadway 115, to the one or more lines disposed within (typically at or near the bottom of) the groove or channel of the apical conduit slots, and can be filled with the filler and/or capping material similar to any of the apical conduit slots 130-145. In some embodiments, road bores 150 might have diameters ranging from ~0.5 inches (~1.3 cm) to ~6 inches (~15.2 cm), preferably ~6 inches (~15.2 cm) for road bores 150 near FDHs, cabinets, and/or the like, and preferably ~2 inches (~5.1 cm) for most other road bores 150.

In the example of FIG. 1, the source slot 130 might extend from a central office ("CO"), a digital subscriber line access multiplexer ("DSLAM"), and/or near/within a block or neighborhood of customer premises (collectively, "source"), extending along, under, or beside portions of a curb (e.g., curb 120). The source slot 130 might carry (or might otherwise have placed in a channel therein) at least one line from the source, including, without limitation, one or more F-1 fiber cables, and/or the like. In some embodiments, the at least one line might further comprise, but is not limited to, at least one of one or more conductive signal lines, one or more power lines, and/or the like.

Further, in the embodiment of FIG. 1, the main slot 135 might extend along a significant length of roadway 115, disposed close to one of the curbs 120 of one of the blocks 105, while far-side slot 140 extends along a shorter length of roadway 115 on the side of the roadway 115 opposite to the side along which the main slot 135 is disposed. Cross slots 145 connect main slot 135 with far-side slot 140, and thus are disposed across an approximate width of the roadway 115. Although main slot 135 and far-side slot 140 are shown in FIG. 1 to be parallel to each other, they may be at any suitable angle with respect to each other, so long as they are at appropriate positions along the roadway 115 and/or beside curb 120 (e.g., in some cases, to serve as road lines, or the like, which in some cases might mean that one of the main slot 135 or the far-side slot 140 is positioned in the middle of the roadway 115 to serve as a middle road line). Although cross slots 145 are shown in FIG. 1 as being perpendicular to at least one of main slot 135 and far-side slot 140, cross slots 145 may be at any suitable angle relative to one or both of main slot 135 and far-side slot 140, so long as cross slots 145 connect main slot 135 with far-side slot 140, such that the one or more lines may be appropriately routed through these slots 130-145.

In some embodiments, one or more ground-based distribution devices 160 might be provided to service one or more customer premises 110. The one or more lines disposed in the apical conduit slots 130-145 might be routed underground, via conduits, missile bores, or the like (collectively, "conduits 165"), to containers of each of the one or more ground-based distribution devices 160, in a manner as described in detail with respect to FIGS. 1-4 as described in detail in the '676 application, which is already incorporated herein by reference in its entirety. In some embodiments, conduits 165c might be provided below ground between a container of a ground-based distribution device 160 to a position below and near a NID or ONT 170 that is mounted on an exterior wall of a customer premises. In some cases, conduits 165c might extend from the position below and near the NID or ONT 170 to communicatively couple with the appropriate wiring connections (i.e., with the optical fiber connections, conductive signal connections, and/or the like) within the NID or ONT 170. Although shown in FIG. 1 as being a direct route between the position near the NID or ONT 170 and the container of the ground-based distribution device 160, conduit 165b may be at right-angles, may be curved, and/or might follow other routes. In some embodiments, the ground-based distribution device 160 might include, without limitation, an FDH platform 160a, a hand hole 160b, a NAP 160c (which might be an above-surface platform NAP, a sub-surface NAP (which might extend from above the surface to below the surface), or a direct-bury NAP, or the like), and/or the like. Although the FDH platform 160a is shown communicatively coupled to the apical conduit system through the main slot 135, in some embodiments, the FDH platform 160a may be coupled to the apical conduit system through the source slot 130. In some instances, the FDH platform 160a might link two or more apical conduit systems (either through the main slots and/or source slots of these systems).

In some embodiments, the combination of main slot 135, far-side slot 140, and/or cross slots 145 might form particular configurations including, without limitation, an "h" configuration (i.e., as shown in the combination of main slot 135, far-side slot 140a, and cross slot 145a in FIG. 1), a "c" configuration (i.e., as shown in the combination of main slot 135 and cross slots 145b and 145c in FIG. 1), and/or the like. The "h" and "c" configurations each provide ways of routing lines from NAP 160c to hand holes 160b on the opposite side of roadway 115 to service NIDs and ONTs 170 across the road 115. Any other suitable configuration may be implemented, however.

Figure 2D:
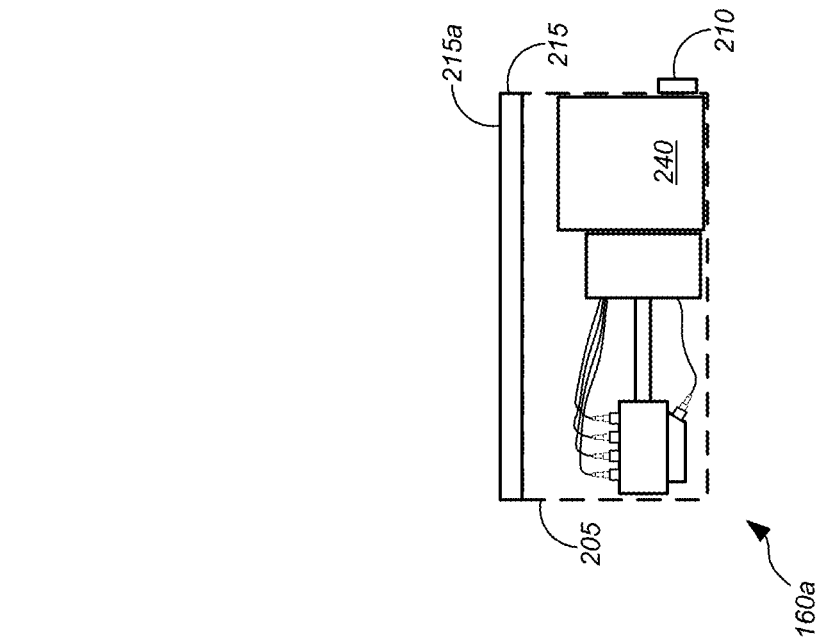
Figure 2C:
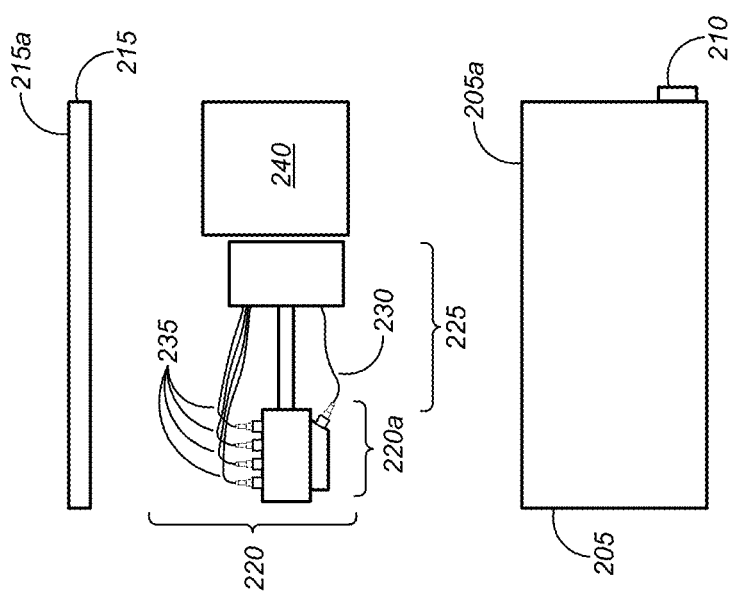

We now turn to FIGS. 2A-2M (collectively, "FIG. 2"), which are general schematic diagrams illustrating various ground-based signal distribution devices that may be used in implementing FTTP, in accordance with various embodiments. In FIG. 2, dash-lined boxes, covers, or containers depict outlines of said boxes, covers, or containers in order to illustrate examples of contents therein. Although particular configurations and components are shown in FIG. 2, the various embodiments are not necessarily limited to those configurations and components shown, but may include any suitable configurations and/or components, as appropriate or as desired. FIGS. 2A-2D depict various example embodiments of FDHs 160a, while FIGS. 2E-2H depict various example embodiments of handholes 160b, and FIGS. 2I-2J depict example embodiments of NAPs 160c. FIG. 2K depicts an example schematic diagram of a wireless access point device that is configured to be disposed within a channel of the apical conduit system, in accordance with various embodiments. FIGS. 2L and 2M are example schematic diagrams of wireless access point devices that are configured to be disposed within, at the top of, or near the top of a channel of the apical conduit system, in accordance with various embodiments.

In FIGS. 2A-2B, a pedestal-based FDH 160a is shown, which comprises, without limitation, a container 205, at least one conduit port 210, a cover or lid 215, and a cable distribution system 220. The container 205 might include a square or rectangular box that is made of a material that can durably and resiliently protect contents thereof while being disposed or buried in the ground surface (i.e., disposed or buried under the ground surface), and especially against damage caused by shifting ground conditions (such as by expansive soils, tremors, etc.). The container 205 is ideally constructed to be waterproof to protect electronics components disposed therein from getting wet; such a waterproof container can also protect against entry of dust, dirt, debris, and the like, which might affect or damage optical cables and/or optical cable connections. In some embodiments, cable distribution system 220—which is at least in part disposed above container 205 (and covered by or disposed within lid 215 during operation)—might include, but is not limited to, a signal distribution/splicing system 220a, a support structure 225, one or more first cables 230, and one or more second cables 235. In some cases, FDH 160a might further comprise an optional cable routing system 240, which is a system disposed in container 205 to route the one or more first and second cables 230 and 235 between the cable distribution system 220 and the at least one conduit port 210.

According to some embodiments, the one or more first cables 230 might include, without limitation, F-1 or F1 optical fiber cables routed from a CO, a DSLAM, and/or near/within a block or neighborhood of customer premises (collectively, "source") to the FDH 160a, while the one or more second cables 235 might include, but are not limited to, F-2 or F2 optical fiber cables routed between the FDH 160a and one or more NAPs 160c.

The embodiments of FIGS. 2C-2D are similar, if not identical, to those of FIGS. 2A-2B, except that the FDH 160a of FIGS. 2C-2D are substantially disposed with the ground surface, with either top surface 205a (of container 205) or top surface 215a (of lid 215) being substantially level with a top surface of the ground surface, and without a pedestal portion. In these embodiments of FDH 160a, the signal distribution/splicing system 220a, the support structure 225, the one or more first cables 230, the one or more second cables 235, and the (optional) cable routing system 240 are all disposed within the container, and all covered by substantially flat lid 215. Because of the similarity of the components therein, the description of FDH 160a in FIGS. 2A-2B is applicable to the FDH 160a of FIGS. 2C-2D.

The hand holes 160b of FIGS. 2E-2H are similar, if not identical, to the hand holes described in detail in the '676 application, which is already incorporated by reference herein in its entirety. With reference to FIGS. 2E-2H, an embodiment of hand hole 160b is shown in FIG. 2E, which hand hole 160b comprises a container 205, at least one conduit port 210, a lid 215, a cable distribution system 220, and an (optional) antenna 245. The container 205 might be similar, if not identical, to the container 205 described in detail with respect to FIGS. 2A-2D; accordingly, the descriptions above apply similarly to container 205 in FIGS. 2E-2H. The (optional) antenna 245 is configured to be disposed or mounted within the interior of the container 205, and can include any suitable antenna, antenna array, or arrays of antennas, as described in detail with respect to FIG. 3 of the '676 application, or any other suitable antenna, antenna array, or arrays of antennas. The lid 215 is ideally made of a material that provides predetermined omnidirectional azimuthal rf gain.

The at least one conduit port 210 (with two conduit ports shown in FIG. 2, or three conduit ports shown in FIGS. 3-6) is configured to connect with the one or more conduits 165b or 165c (in some cases, in a manner that seals against or otherwise prevents water, dirt, soil, or other foreign substances from entering the container 205). In this manner, at least one optical fiber line, at least one conductive signal line (including, but not limited to, copper data lines, copper voice lines, copper video lines, or any suitable (non-optical fiber) data cables, (non-optical fiber) video cables, or (non-optical fiber) voice cables, and/or the like), and/or the like that are provided in the one or more conduits 165b might be routed through the at least one conduit port 210 and into the interior of the container 205, to be correspondingly communicatively coupled to the antenna 245 or to the NIDs/ONTs 170 via cable distribution system 220. Cable distribution system 220 may also be configured to route (via container 205) the at least one power line that is provided in the one or more conduits 105 to appropriate power receptacles, cabinets, or power relay systems that are located above the ground surface.

FIG. 2F shows another embodiment of hand hole 160b. In FIG. 2F, the hand hole 160b comprises (optional) antenna 245, which is part of lid 215, either disposed completely within the lid 215, disposed below (but mounted to) the lid 215, or disposed partially within the lid 215 and partially extending below the lid 215. Hand hole 115 in FIG. 2F is otherwise similar, or identical to, and has similar, or identical, functionalities as hand hole 115 shown in, and described with respect to, FIG. 2E. Accordingly, the descriptions of the hand hole 115 of FIG. 2E are applicable to the hand hole 115 of FIG. 2F.

FIGS. 2G and 2H show two embodiments of flowerpot hand holes 160b. The differences between the hand holes 160b of FIGS. 2E and 2F and the flowerpot hand holes 160b of FIGS. 2G and 2H include a more compact structure (and a correspondingly compact set of (optional) antenna(s) 245 and cable distribution systems 220), a container 205 having a generally cylindrical or conical shape (not unlike a flower pot for planting flowers), a lid 215 having a generally circular shape to fit the generally cylindrical or conical container 205, and the like. The flowerpot hand holes 120 are otherwise similar, or identical to, and have similar, or identical, functionalities as hand holes 160b of FIGS. 2E and 2F, respectively. Accordingly, the descriptions of hand holes 160b of FIGS. 2E and 2F are respectively applicable to the flowerpot hand holes 160b of FIGS. 2G and 2H.

According to some embodiments, a wide range of hand holes (some including the hand holes 160b above) may be used, with polymer concrete lids of various shapes and sizes. In some cases, all splicing can be performed below the ground surface and no pedestal is added. In some instances, some splicing (e.g., using cable distribution system 220, or the like) can be performed above the ground surface, such as in pedestal type FDH 160a (shown in FIGS. 2A-2B) or other platforms, including, without limitation, pedestal platforms, NAP platforms, FDH platforms, and/or the like shown in FIG. 2 of the '676 application, already incorporated herein by reference in its entirety.

In some embodiments, if the hand hole is not placed in a driveway or sidewalk, or the like, the lid 215 (as shown in FIGS. 2E-2H) may be replaced by a pedestal lid 215 (such as shown in FIGS. 2G-2J), or the like. In other words, a small (i.e., short) radio-only pedestal (or pedestal lid) can be added, with no need for any splice tray or the like, just a simple antenna structure. The result might look like a few-inch high (i.e., a few-centimeter high) pedestal with antenna structures as described in the '676 application. An advantage with this approach is that the radio pedestal can be easily replaced, maintained, or the like, as it contains only the radio element.

Merely by way of example, in some instances, polymer concrete lids (such as used with typical hand holes) may be built with antenna elements in the lids. In particular, a ground plane can be placed below the lid, and the polymer concrete can be considered a low dielectric constant (i.e., as it has a dielectric constant or relative permittivity $\varepsilon_r$ similar to that of air—namely, $\varepsilon_r$ of about 1.0). In some cases, patch elements and/or directors may be included within the lid, subject to manufacturing processes.

Alternatively, planar antennas (such as described in detail in the '676 application) may be placed below the lid, with the concrete surface having negligible impact on radio frequency propagation. A low elevation (i.e., below street level) setting of the radio typically limits the distance of propagation of rf signals. However, architectures having hand holes placed every few customer premises (e.g., homes) in a particular area (i.e., neighborhood or block of customer premises) may sufficiently compensate for the limited distance of rf signal propagation. Some embodiments include hand holes 160b without any antennas 245.

In FIGS. 2I-2J, a NAP 160c is shown, which includes, without limitation, a base 205, a conduit port 210, a cover 215, and a cable distribution system 220. In some embodiments, cable distribution system 220 might include, but is not limited to, a signal distribution/splicing system 220b, a plurality of ports 220c, a support structure 225, one or more second cables 235, an (optional) antenna 245, and one or more third cables 250. In some cases, NAP 160c might be an above-surface NAP, a direct bury NAP, or a NAP disposed in the ground surface and extending above the ground surface. In some embodiments, the one or more second cables 235 might include, but are not limited to, F-2 or F2 optical fiber cables routed between the FDH 160a and one or more NAPs 160c, while the one or more third cables 250 might include, without limitation, F-3 or F3 optical fiber cables routed between a NAP 160c and one or more NIDs/ONTs 170 (in some cases, via one or more hand holes 160b).

With reference to FIG. 2K, a wireless access point device 250 is shown, which includes, but is not limited to, a container 255 and a wireless access point 260 disposed in the container 255. The wireless access point 260 might include one or more input ports 265a, one or more output ports 265b, and a power supply port 270. The input/output ports 265 might be data ports, optical cable ports, non-optical cable ports, etc. In one set of embodiments, the one or more input ports 265a might communicatively couple with the one or more second cables 235, while the one or more output ports might communicatively couple with the one or more third cables 250. In another set of embodiments, the one or more second cables 235 (i.e., F-2 or F2 optical fiber cables routed between the FDH 160a and one or more NAPs 160c) might communicatively couple to each of the one or more input ports 265a or the one or more output ports 265b. In such cases, between the FDH 160a and the one or more NAPs 160c, the wireless access point device 250 can provide wireless connectivity (in some cases, from the roadway location). In yet another set of embodiments, the one or more third cables 235 (i.e., F-3 or F3 optical fiber cables routed between a NAP 160c and one or more NIDs/ONTs 170) might communicatively couple to each of the one or more input ports 265a or the one or more output ports 265b. In such cases, between the NAP 160c and the one or more NIDs/ONTs 170, the wireless access point device 250 can provide wireless connectivity (in some cases, from the roadway location). In some embodiments, the container 255 is configured to be small (i.e., small enough to fit within a channel of the apical conduit system (i.e., with width in some cases less than 1 inch and height in some cases less than 1 or 2 inches; the length may be less constrained, and in some cases may be a few inches long), heat resistant (to survive application of thermosetting material within the channel of the apical conduit system), heat insulative (to protect the wireless access point 260 and other components contained therein during application of thermosetting material within the channel of the apical conduit system), and water-tight (to prevent liquids (e.g., the thermosetting material, water, etc.) from entering the container 255). To provide power to the wireless access point 260, a power cable 275 might be communicatively coupled to the power supply port 270. To maintain the water-tightness feature, the cable connections might be fed through a grommet-type pass-through or other type of cable pass-through in a wall of the container 255. According to some embodiments, the wireless access point 260 might further include, without limitation, a cable distribution device 220 and/or an antenna 245, both of which have been described in detail above. FIGS. 11A-11E illustrate an example of the wireless access point device 250 positioned within at least a portion of a channel of the apical conduit system (and, in some cases, in-line with the lines or cables/conduits that are disposed in the channel, with input cables entering at one end of the device and with output cables exiting at the other end of the device, or the like; while in other cases, disposed on a depression or groove straddling a channel (e.g., at or near a top portion of the channel), with input and output cables disposed on a lower surface of the device 250), particularly in relation to other elements of the apical conduit system. In some cases, the container 255 might comprise a lid structure to allow ease of access to the wireless access point 260 and other components contained within the container 255, when the container 255 is not encapsulated by filler material in the channel of the apical conduit system.

Figure 11C:
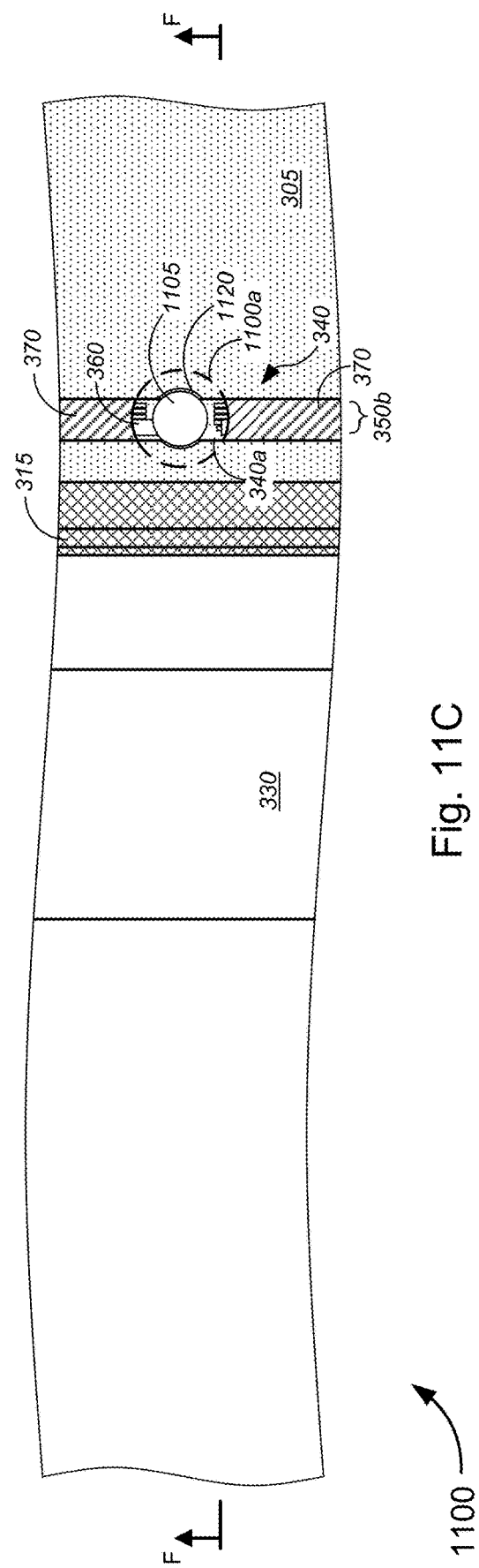
Figure 11D:
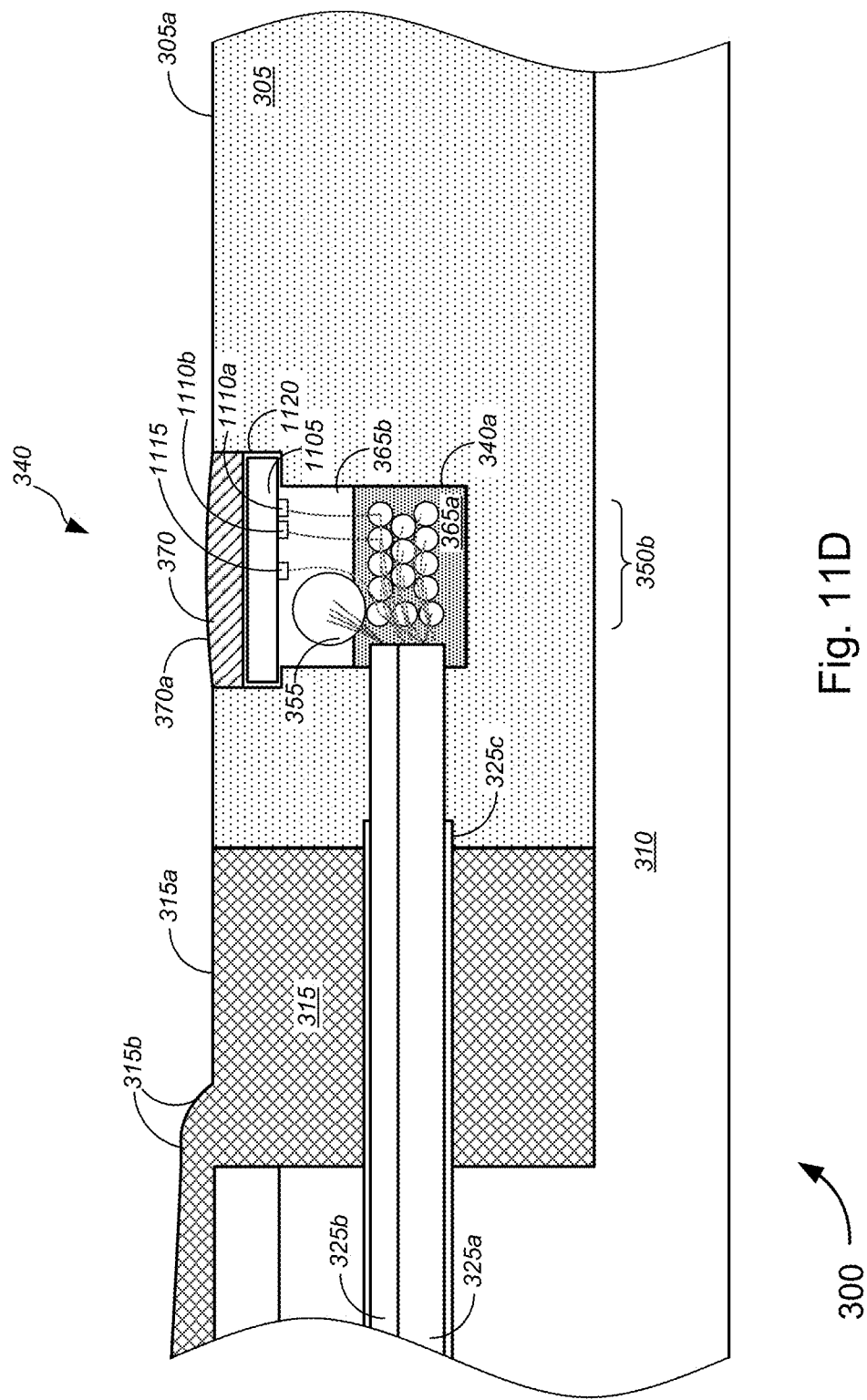

In FIGS. 2L and 2M, an alternative set of embodiments of the wireless access point device 250 is shown. In this set of embodiments, the wireless access point device 250 might be placed above the lines, cables, and/or conduits that are disposed in the channel of the apical conduit system. In some cases, the wireless access point device 250 might float on (or near) the surface of the filler material (which might include, without limitation, the second application of the filler material, after the tack coat layer, as described below with respect to FIG. 3D or the one application of the filler material, when a conduit/cable capture device or the like is used). In some instances, the pass-throughs, power supply port 270, and input/output ports 265 According to some embodiments, such as shown in FIGS. 11C and 11D, a depression or cut may be made in the road surface near the top of the channel to provide a groove, ledge, or the like upon which the wireless access point device 250 may be placed. In some cases, as shown in FIGS. 2M, 11C, and 11D, the wireless access point device 250 might have a circular shape (i.e., a cylindrical body or housing). In some instances, the cylindrical wireless access point device 250 might have a diameter of about 1-3 inches and a height of about 1 inch. In other cases (not shown), the wireless access point device 250 might have any suitable shape, including, but not limited to, square prism, rectangular prism, triangular prism, trapezoidal prism, or any other polygonal prism or irregular-shaped 3D structure, rhombohedrons, trigonal trapezohedrons, octahedrons, icosahedrons, dodecahedrons, any polygonal antiprism or any polyhedron, or the like.

FIGS. 3A-7C and 11A-11E illustrate embodiments of FTTP implementation, in some cases, depicting zoomed-in views of features shown in FIG. 1, and in other cases depicting several alternative embodiments of specific features.

Figure 3A:
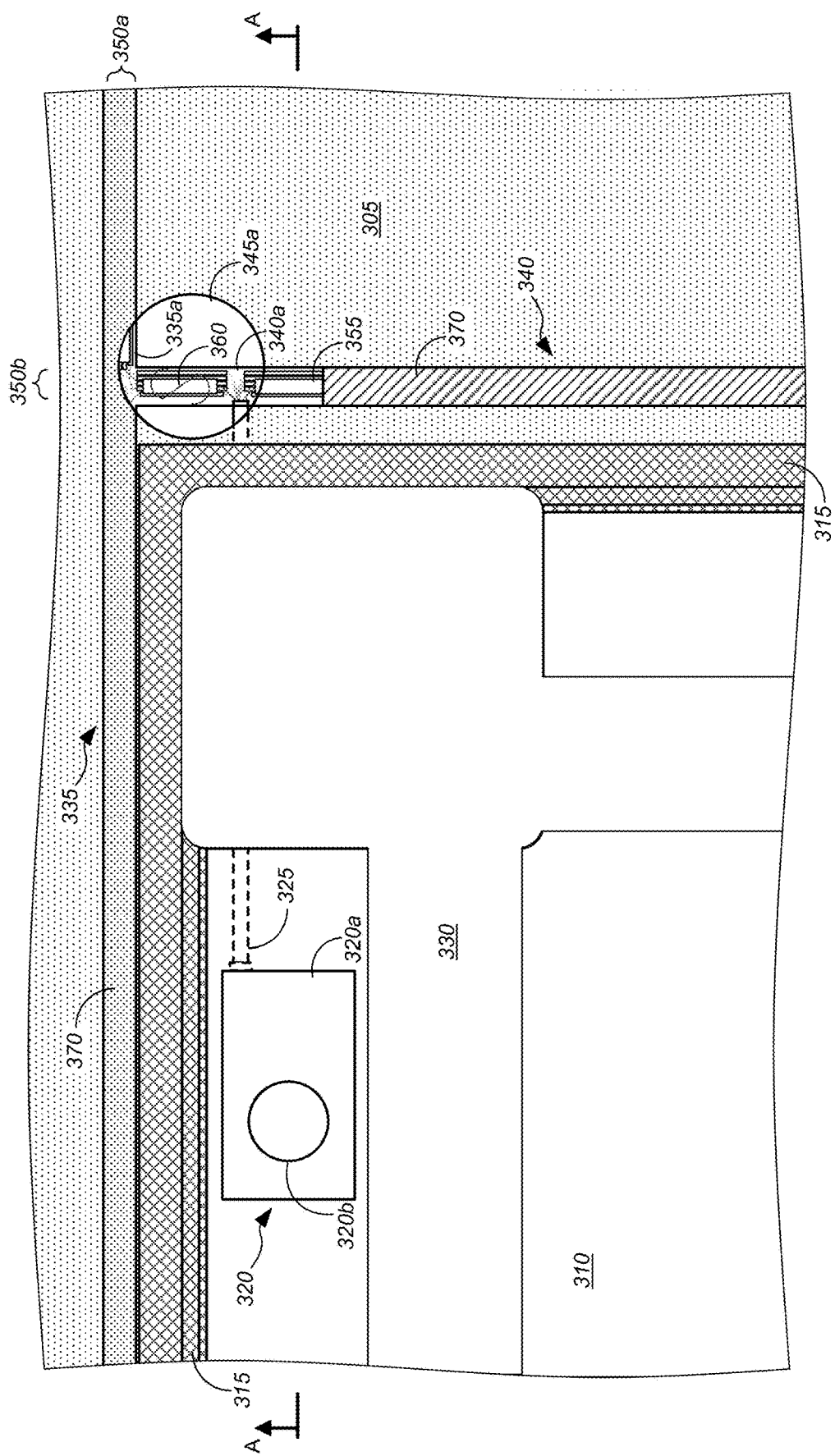
FIGS. 3A-3D are general schematic diagrams illustrating various views of a system for communicatively coupling lines within an apical conduit system and lines within a fiber distribution hub ("FDH") for implementing FTTP, in accordance with various embodiments.
Figure 3B:
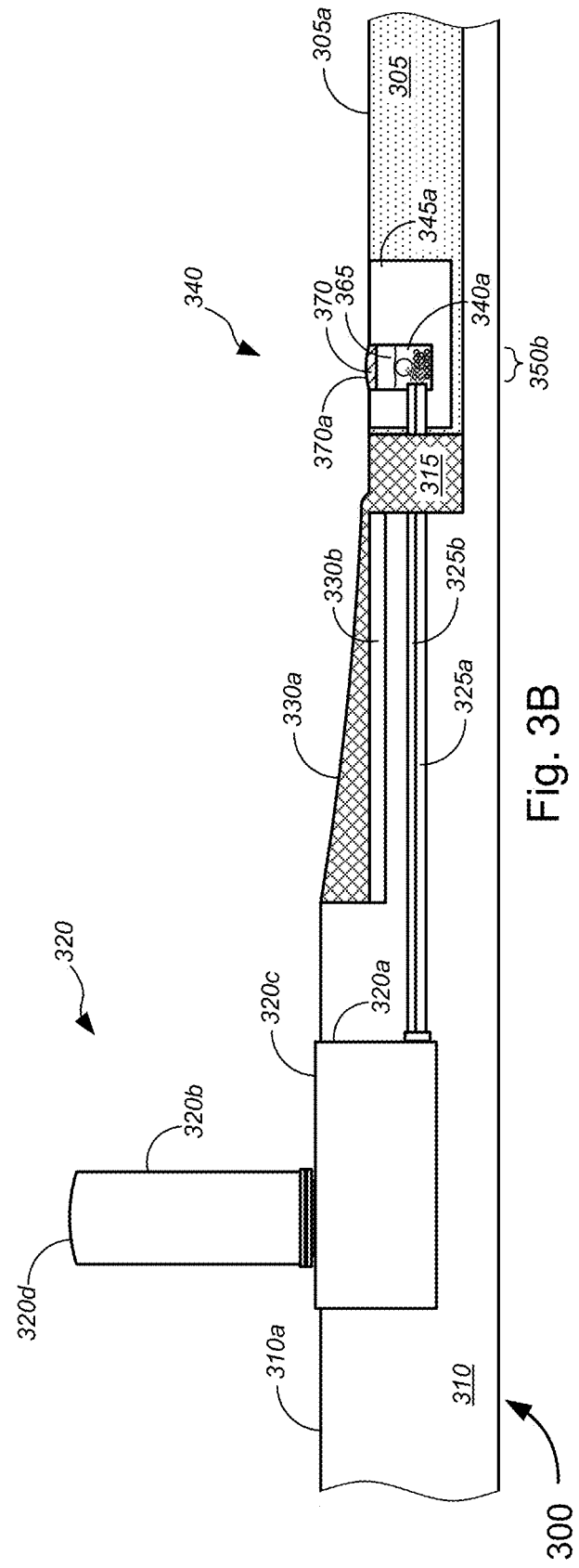
Figure 3C:
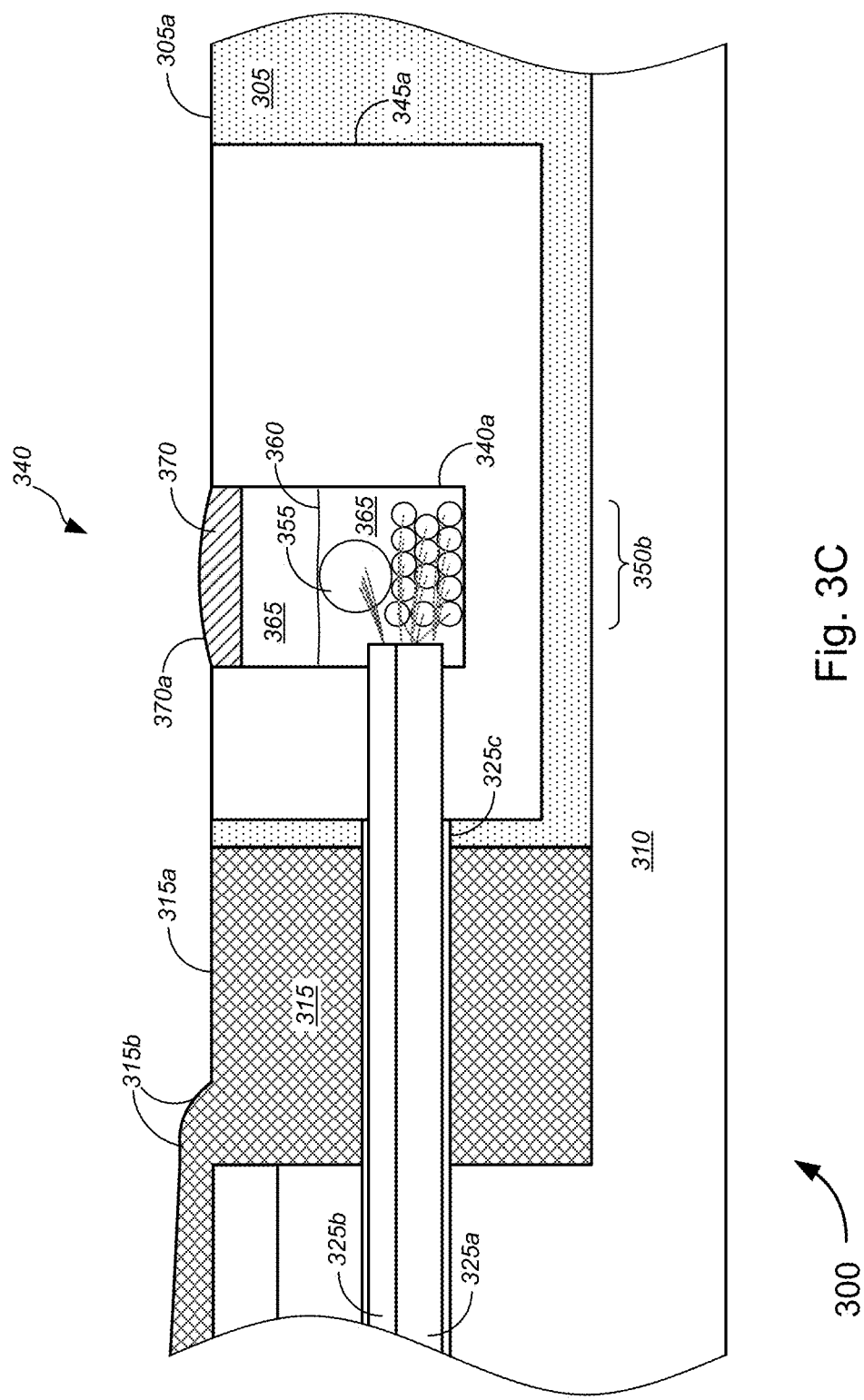
Figure 3D:
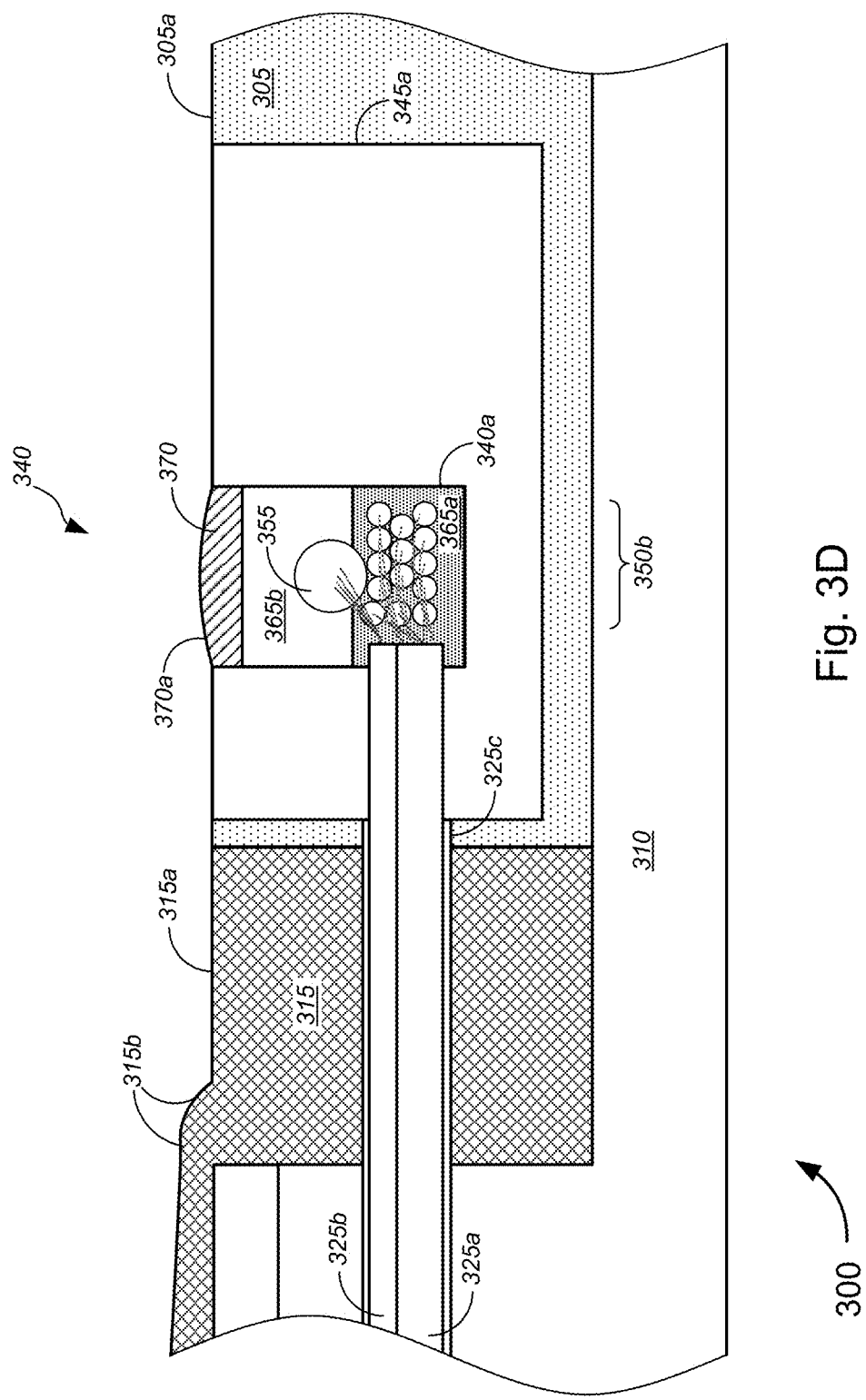

In particular, FIGS. 3A-3D (collectively, "FIG. 3") are general schematic diagrams illustrating various views of a system 300 for communicatively coupling lines within an apical conduit system and lines within a fiber distribution hub ("FDH") for implementing FTTP, in accordance with various embodiments. FIG. 3A shows a top view of a section of ground in which components of a ground-based distribution device and components of an apical conduit system are disposed. FIG. 3B shows a partial sectional view of the system 300 of FIG. 3A, as shown along the A-A direction indicated in FIG. 3A. FIG. 3C shows an enlarged partial view of the portion of system 300 shown in FIG. 3B. FIG. 3D shows an alternative embodiment to FIG. 3C in which the microduct/cable capture device 360 is replaced with a tack coat to hold the microduct/cables in place within the channel (i.e., source slot 335, main slot 340, cross slot 375, or far-side slot 390, etc.). System 300 in FIG. 3 generally corresponds to a section of ground as, for example, indicated by (but not necessarily precisely depicting) dash-lined rectangle 300 shown in FIG. 1.

Figure 4A:
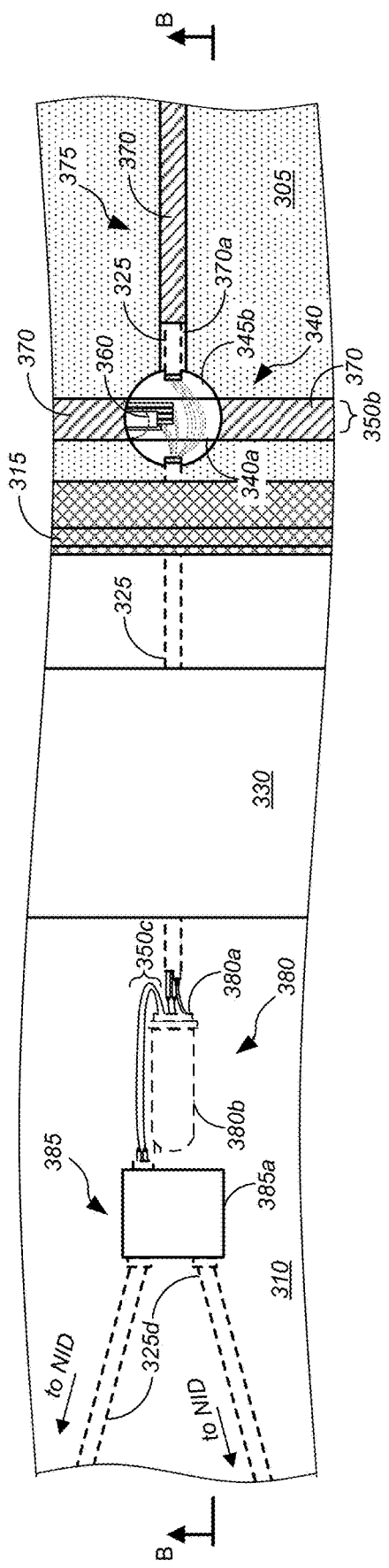
FIGS. 4A-4B are general schematic diagrams illustrating various views of a system for communicatively coupling lines within an apical conduit system and lines within a direct bury network access point ("NAP") for implementing FTTP, in accordance with various embodiments.
Figure 4B:
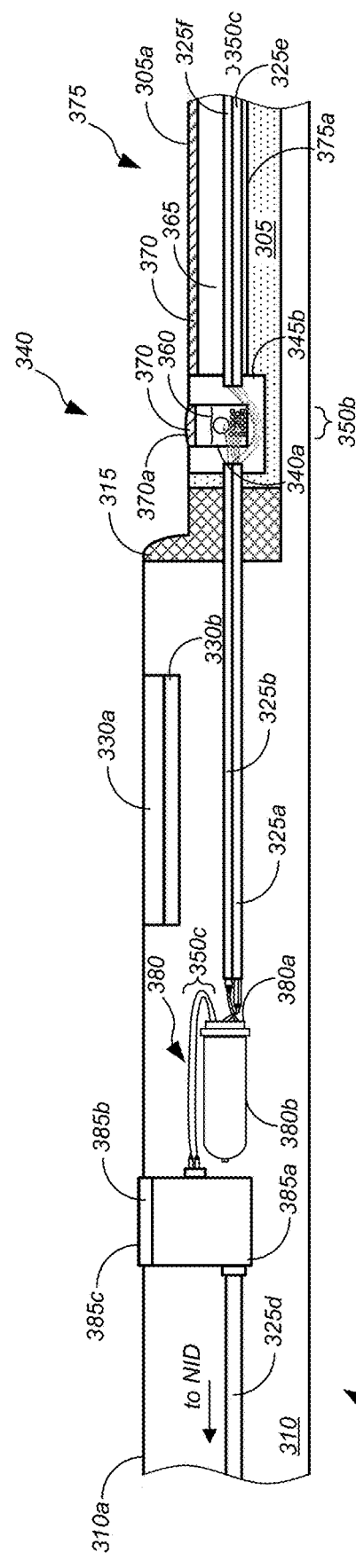

FIGS. 4A-4B (collectively, "FIG. 4") are general schematic diagrams illustrating various views of a system 400 for communicatively coupling lines within an apical conduit system and lines within a direct bury network access point ("NAP") for implementing FTTP, in accordance with various embodiments. FIG. 4A shows a top view of a section of ground in which components of a ground-based distribution device and components of an apical conduit system are disposed. FIG. 4B shows a partial sectional view of the system 400 of FIG. 4A, as shown along the B-B direction indicated in FIG. 4A. System 400 in FIG. 4 generally corresponds to a section of ground as, for example, indicated by (but not necessarily precisely depicting) dash-lined rectangle 400 shown in FIG. 1.

FIGS. 5A-5B (collectively, "FIG. 5") are general schematic diagrams illustrating various views of a system 500 for communicatively coupling lines within an apical conduit system and lines within a hand hole for implementing FTTP, in accordance with various embodiments. FIG. 5A shows a top view of a section of ground in which components of a ground-based distribution device and components of an apical conduit system are disposed. FIG. 5B shows a partial sectional view of the system 500 of FIG. 5A, as shown along the C-C direction indicated in FIG. 5A. System 500 in FIG. 5 generally corresponds to a section of ground as, for example, indicated by (but not necessarily precisely depicting) dash-lined rectangle 500 shown in FIG. 1.

FIGS. 6A-6B (collectively, "FIG. 6") are general schematic diagrams illustrating various views of a system 600 for communicatively coupling lines within an apical conduit system and lines within a hand hole routed from a NAP through a cross-slot in a road surface for implementing FTTP, in accordance with various embodiments. FIG. 6A shows a top view of a section of ground in which components of a ground-based distribution device and components of an apical conduit system are disposed. FIG. 6B shows a partial sectional view of the system 600 of FIG. 6A, as shown along the D-D direction indicated in FIG. 6A. System 600 in FIG. 6 generally corresponds to a section of ground as, for example, indicated by (but not necessarily precisely depicting) dash-lined rectangle 600 shown in FIG. 1.

Figure 7A:
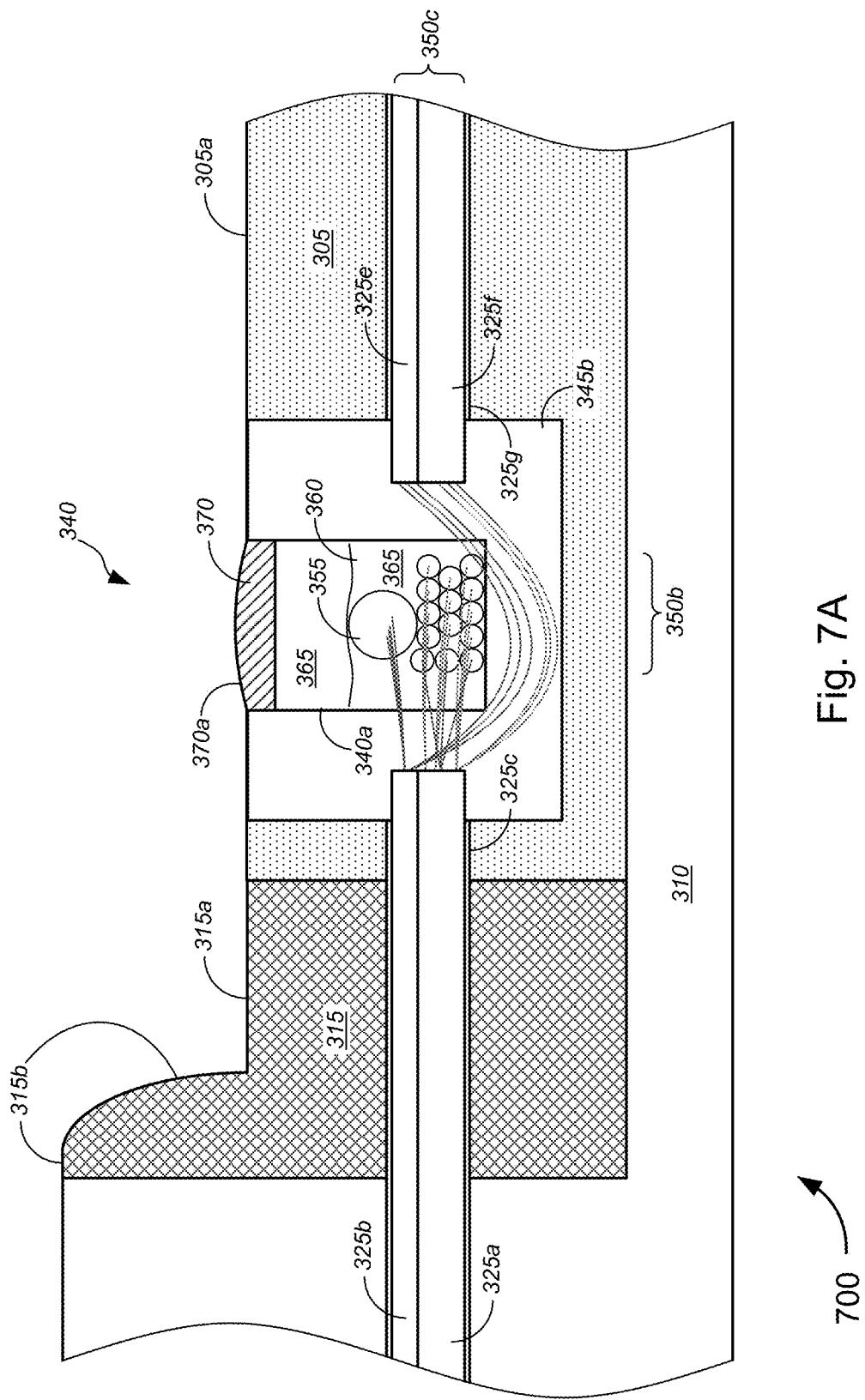
FIGS. 7A-7C are general schematic diagrams illustrating various embodiments for implementing curb transitions for communicatively coupling lines within an apical conduit system and lines within a ground-based signal distribution device when implementing FTTP.
Figure 7B:
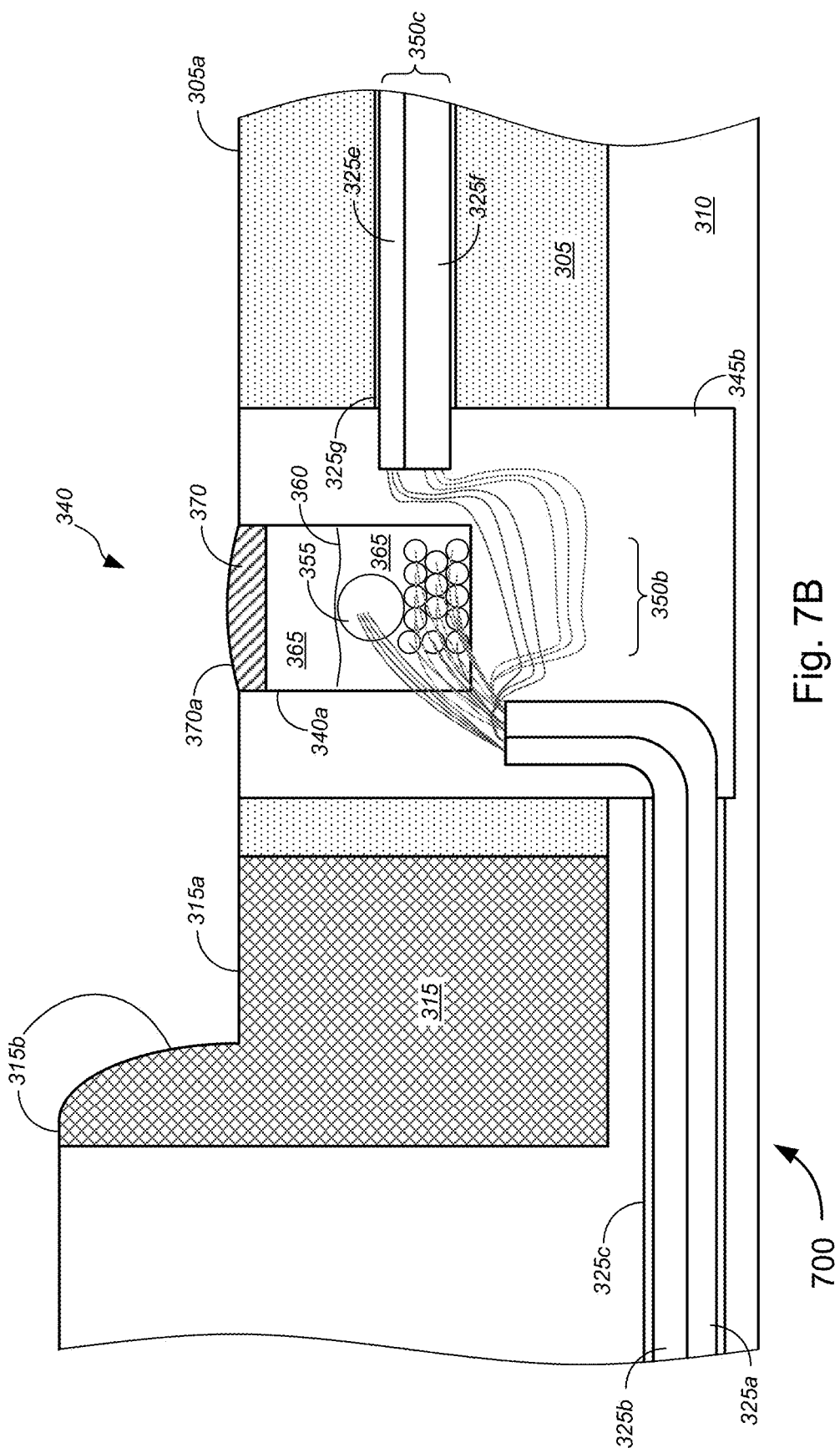
Figure 7C:
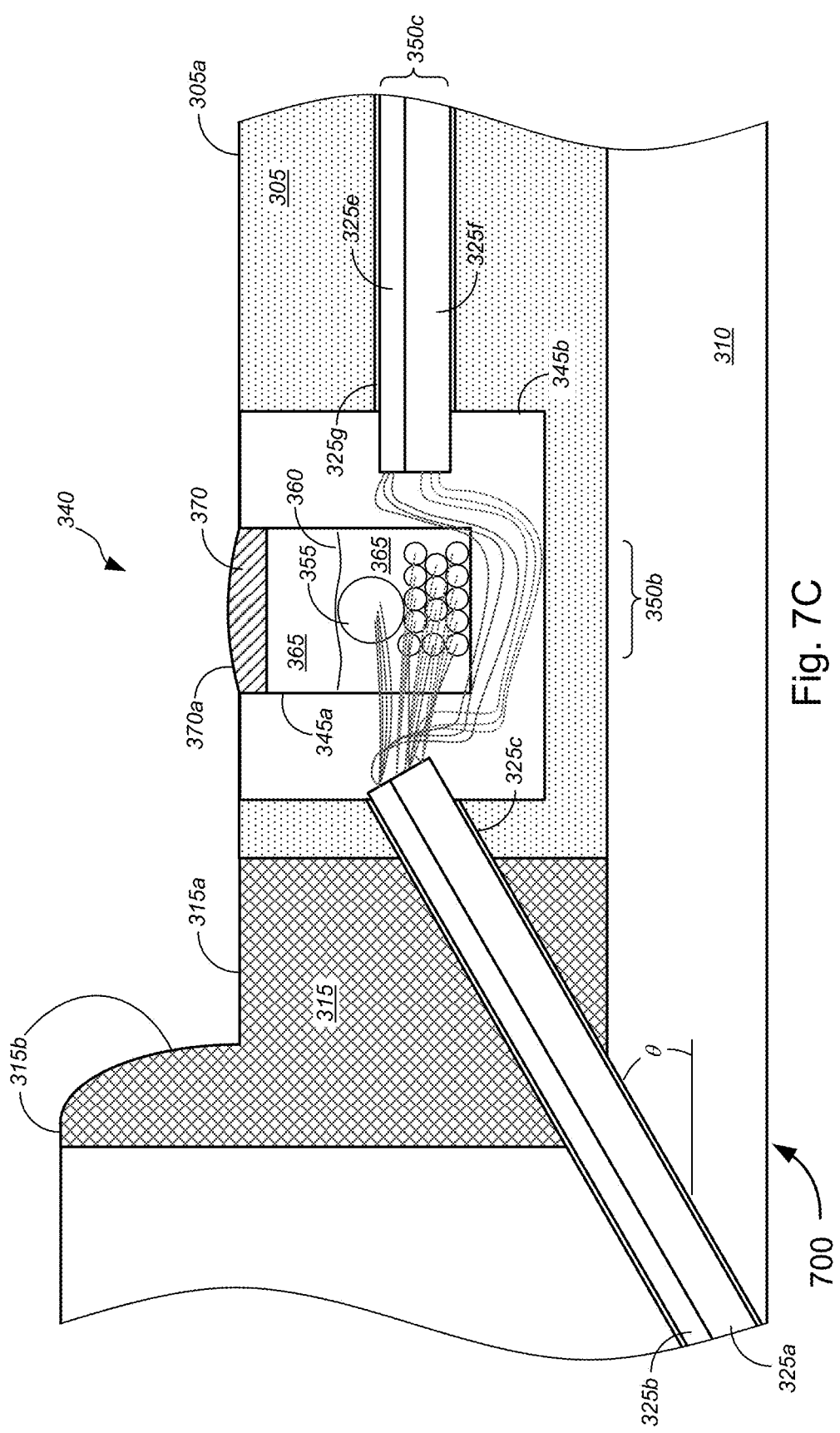

FIGS. 7A-7C (collectively, "FIG. 7") are general schematic diagrams illustrating various embodiments for implementing curb transitions for communicatively coupling lines within an apical conduit system and lines within a ground-based signal distribution device when implementing FTTP.

In FIGS. 3-7, systems 300-700 might comprise roadway 305, ground 310, curb 315, FDH 320, conduits 325, pathway 330, source slot 335, main slot 340, bore holes 345, lines 350, conduit/microduct 355, microduct/cable capture device 360, filler material 365, capping material 370, cross slot 375, NAP 380, hand hole 385, far-side slot 390, and road lines 395, and/or the like. In some instances, roadway 305 might be made of asphalt, concrete, and/or the like. Ground 310 might comprise soil (in some cases, compacted soil), mud, clay, rock, and/or the like. Curb 315 might be made of concrete or the like. A sub-base layer (not shown) might be disposed between the roadway 305 and ground 310. In some cases, curb 315 might comprise a portion of a roadway surface 315*a* and a portion of a non-roadway surface 315*b*.

According to some embodiments, conduits 325 might include, without limitation, conduits 325*a*-325*b*, missile bores 325*c*, conduit 325*d*, conduits 325*e*-325*f*, missile bore 325*g*, and/or the like. Conduits 325*a*-325*b* might extend, within missile bore 325*c*, between one of FDH 320, NAP 380, or hand hole 385 and one of bore hole 345, source slot 335, main slot 340, cross slot 375, or far-side slot 390. Conduit 325*d* might extend between one of NAP 380 or hand hole 385 and each of a NID or ONT (e.g., NID or ONT 170) disposed on an exterior wall or exterior surface of a customer premises (e.g., customer premises 110). Conduits 325*e*-325*f* might extend, within missile bore 325*g*, between one of bore hole 345, main slot 340, or far-side slot 390 and another of bore hole 345, main slot 340, or far-side slot 390; conduits 325*e*-325*f*, within missile bore 325*g*, might, in some cases lie within a channel of cross slot 375 (or might be a missile bore otherwise set or disposed under surface 305*a* of roadway 305, either before or after roadway 305 is laid).

Each bore hole 345 provides simultaneous access to two or more slots (including, without limitation, source slot 335, main slot 340, cross slot 375, and/or far-side slot 390, or the like), to enable cross-connection or cross-placement of lines in one of the two or more slots with lines in the other one(s) of the two or more slots, and vice versa. In some cases, bore holes 345 might comprise a first bore hole 345*a* and one or more second bore holes 345*b*. The first bore hole 345*a* might be larger in diameter and/or depth compared with the one or more second bore holes 345*b*. While the first bore hole 345*a* might be used to cross-connect lines within the source slot 335, the main slot 340, and/or the conduit 325 to the FDH 320, the one or more second bore holes 345*b* might cross-connect lines within the conduit 325 to NAP 380 and/or hand hole 385 with lines in the main slot 340, the cross slot 375, and/or the far-side slot 390. Although bore holes 345 shown in FIGS. 3-7 are depicted as extending below channels of the corresponding apical conduit slots, the bore holes, according to the various embodiments, may be set to have any suitable depth relative to the depth of the channel (i.e., deeper, less deep, or substantially as deep).

The plurality of lines 350, the microduct/conduit 355, and the microduct/cable capture device 360 are disposed or placed in a channel of one or more slots (e.g., channel 335a of the source slot 335, channel(s) 340a of the main slot(s) 340, channel(s) 375a of the cross slot(s) 375, channel(s) 390a of the far-side slot(s) 390, and so on). In some embodiments, the plurality of lines 350 might include, without limitation, at least one of one or more conduits, one or more optical fiber cables, one or more conductive signal lines, one or more power lines, and/or the like. The one or more conductive signal lines might include, but are not limited to, copper data lines, copper video lines, copper voice lines, or any suitable (non-optical fiber) data cables, (non-optical fiber) video cables, or (non-optical fiber) voice cables, and/or the like. In some cases, some lines 350 might be routed via conduit/microduct 355, while other lines 350 might be routed substantially parallel with conduit/microduct 355 within groove or channels.

According to some embodiments, the plurality of lines 350 might include, but is not limited to, F1 cables, F2 cables, F3A cables, F3B cables, multiple-fiber push-on/push-off ("MPO") cables, twisted-copper pair cables, and/or the like. In some embodiments, the F1 cables might include, but are not limited to, F1 optical fiber cables 350a, which might communicatively couple a central office of a telecommunications service provider with the FDH 320 (which might comprise a container 320a and a pedestal portion 320b), as shown, e.g., in the embodiment of FIG. 3. In some instances, the F2 cables might include, without limitation, F2 optical fiber cables 350b, which might communicatively couple the FDH 320 with a NAP 380, as shown, e.g., in the embodiments of FIGS. 3 and 4 as described above. According to some aspects, the F3A cables and F3B cables (collectively, "F3 cables") might include, without limitation, F3 optical cables 350c, which might communicatively couple the NAP 380 to a NID or ONT (e.g., NID/ONT 170 in FIG. 1) that is mounted on an exterior wall of a customer premises (e.g., building of customer premises 110). In some cases, the F3 cables might run through the missile bore 325c between the NAP and the main slot 340, through the cross slot 375, through the far-side slot 390, through the missile bore 325c between the cross-slot 375 or far-side slot 390 and the hand hole 385, through conduits 325d, and/or any combination of these routes, in order to communicatively couple lines from the NAP 380 with lines leading into the NID/ONT of customer premises located across (or on the other side of) roadway 305 with respect to the NAP 380. Although the examples above refer to F1, F2, and F3 optical cables, the F1, F2, and F3 cables may each include, without limitation, non-optical video/voice/data cables (e.g., conductive signal lines, as described above, or the like), power cables, and/or the like.

The conduit/microduct 355 might include any type of conduit that allows routing to any of the plurality of lines 350 described above. In some cases, the microduct 355 might have a range of diameters between 7.5 mm and 12 mm, while in other cases, conduit/microduct 355 might have any suitable diameter, so long as it fits within the channels (which is as described above).

In some embodiments, the microduct/cable capture device 360 might comprise a plurality of capture devices placed at suitable (possibly varying or, sometimes, random) intervals within the channels. Each capture device 360 might include at least one hooked end to hook under one or more lines or one or more conduits in order to facilitate lifting of the one or more lines or the one or more conduits, for maintenance, repair, replacement, etc. In some instances, some or all of the capture devices 360 might anchor to the sidewall(s) of the channels; in such cases, the capture devices 360 might further serve to secure the one or more lines or the one or more conduits at or near the bottom of the channels (e.g., to prevent lifting, such as during application/installation of the filler material). In some cases, some or all of the capture devices 360 might simply be placed on top of the one or more lines or the one or more conduits within the channels (i.e., without anchoring to the sidewalls of the channel). Although FIG. 3 shows an S-shaped capture device 360, the various embodiments are not so limited, and the capture device 360 may have any suitable shape to serve the function of lifting lines/conduits, the function of securing/keeping the lines/conduits at or near the bottom of the channels, or both.

The filler material 365 might include a thermosetting material, which in some cases might include, without limitation, polyurea or the like. The capping material 370 might include a thermosetting material (such as polyurea or the like), safety grout, asphalt sealer, concrete sealer, and/or the like. In some cases, the capping material 370 might comprise a sealer cap forming a mastic seal over the filler material. According to some embodiments, the capping material 370 might be colored and used to fill at least a portion of the channel, as well as to extend further along the surface of the roadway to serve as a continuous road line. In some instances, the filler material 365 and the capping material 370 might be the same material. In some embodiments, the filler material might be filled to a height within channels of between about 2.5 inches (~6.4 cm) and about 3 inches (~7.6 cm), while the capping material might be about 0.5 inches (~1.3 cm) to about 0.75 inches (~1.9 cm) deep.

In some embodiments, roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6 might correspond to roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1, respectively. As such, the descriptions of roadway 115, curb 120, FDH 160a, missile bores 165a-165b, conduits 165c, pathway 125, source slot 130, main slot 135, bore holes 150a-150b, cross slot 145, NAP 160c, hand hole 160b, far-side slot 140, and road lines 155 of FIG. 1 are applicable to roadway 305, curb 315, FDH 320, missile bores 325c, conduits 325d, pathway 330, source slot 335, main slot 340, bore holes 345, cross slot 375, NAP 380, hand hole 385, far-side slot 390, and road lines 395 of FIGS. 3-6.

With respect to the embodiments of FIGS. 1 and 3-6, the various apical conduit system components may be designed or configured in accordance with one or more of the following non-limiting implementations. In some embodiments, the channels of any or all of the source slot, main slot(s), far-side slot(s), and cross slot(s) (i.e., channel 335a, channel(s) 340a, channel(s) 375a, channel(s) 390a, and/or the like) can be created by milling the roadway or other ground surface. In various aspects, the channels might have a variety of widths. Merely by way of example, in some cases, the channels might have a width of between about 0.5 inches (~1.3 cm) and about 12 inches (~30.5 cm), while in other cases, the channels might have a width of between about 1 inch (~2.5 cm) and about 6 inches (~15.2 cm). In other cases, the channels might have width between about 1.5 inches (~3.8 cm) and about 2.5 inches (~6.4 cm), or a width of about 2 inches (~5.1 cm). The depth of the channels can vary as well, so long as the channel does not compromise the structural integrity of the ground surface (e.g., roadway, etc.) in which it is created. Merely by way of example, the channels might have a depth of no greater than about 3 inches (~7.6 cm), a depth of no greater than about 1 inch (~2.5 cm), or a depth of no greater than about 0.5 inches (~1.3 cm). In some embodiments, the depth of the channels might be about 3 inches (~7.6 cm), while the width of the channels might be either about 0.5 inches (~1.3 cm) or about 1 inch (~2.5 cm). In other embodiments, the depth of the channels might be about 4 or 5 inches (~10.2 or 12.7 cm), or any depth that is appropriate in light of the circumstances, including the structural features of the roadway (depth, strength, etc.), the characteristics of the communication lines to be installed in the channels, etc.

In one aspect, certain embodiments can allow a provider or vendor to lay fiber and/or other lines on top of the road surface by creating a shallow groove or channel (e.g., 2" (~5.1 cm) wide, 0.5" (~1.3 cm) deep; 0.5" (~1.3 cm) wide, 3" (~7.6 cm) deep; or 1" (~2.5 cm) wide, 3" (~7.6 cm) deep; and/or the like) in the pavement along the edge of the pavement. In some embodiments, the source slot or the main slot (e.g., source slot 130 or main slot 135 shown in FIG. 1) might each have a 0.75" (~1.9 cm) wide, 3" (~7.6 cm) deep channel, while the far-side slot (e.g., far-side slot 140 shown in FIG. 1) might have a 0.5" (~1.3 cm) wide, 2" (~5.1 cm) deep channel, and the cross slot (e.g., cross slot 145) might have a 0.5" (~1.3 cm) wide, 3" (~7.6 cm) deep channel.

In a single operation, a conduit (e.g., conduit 355 or the like) could be placed in the groove or channel, while cast-in-place polyurea cap is extruded over it, encapsulating the conduit and bonding it with the road surface. In this embodiment, the conduit provides the thoroughfare for the fiber optic or other lines while the polyurea provides bonding to the concrete or asphalt surface, mechanical protection against traffic and impact loads (including vandalism, etc.), and water tightness. Such embodiments can minimize costs associated with construction and tie-ins, providing a tailored technical solution that is optimized for the physical characteristics of the challenge at hand. The apical conduit system (otherwise referred to as "cast-in-place" technology or "cast-in-place fiber technology") is described in greater detail in the '034, '691, '216, '020, '227, '488, '514, '754, and '109 applications and in the '665 and '676 applications, which have already been incorporated herein by reference in their entirety for all purposes.

Turning to the embodiment of FIG. 3, the example of FIG. 3A shows the relative configurations, positions, and arrangement of one embodiment of the system for implementing FTTP, in which the lines 350a within the source slot 335 are communicatively coupled with lines 350b within the main slot 340 through FDH 320, via the first bore hole 345a. As shown in FIG. 3A, the source slot 335 runs along a first roadway 305, while the main slot 340 runs along a second roadway 305 (which is substantially perpendicular to the first roadway 305, although the various embodiments allow for any relative orientation at any suitable angles between the adjacent roadways, as appropriate). In the example as shown in FIG. 3A, the first bore hole 345a is positioned so as to serve as an intersection amongst the source slot 335, the main slot 340, and the conduit 325 (leading to the FDH 320). In some cases, the position of the conduit 325 might be chosen to facilitate interconnection with each of the source slot 335 and the main slot 340. Further, the various embodiments allow for any configuration of the pathway 330, curb 315, FDH 320, source slot 335, main slot 340, and bore hole 345a, relative to roadway 305 and ground 310, other than as shown in FIG. 3.

In the embodiment of FIG. 3B, a top surface 320c of container 320a of the FDH 320 is shown as being substantially level with a top portion 310a of ground surface 310. The only portions of the FDH that are substantially above the ground surface 310a is the pedestal portion 320b and applicable connection components for connection with the container 320c. The components of the pedestal FDH 330 are described in detail above with respect to FIGS. 2A-2B. The top portion 320d of the pedestal 320b may be one of flat with relatively sharp circular edge(s) connecting to the side of the cylindrical pedestal 320b, flat with rounded circular edge(s) connecting to the side of the cylindrical pedestal 320b, curved with sharp circular edge(s) connecting to the side of the cylindrical pedestal 320b, curved with rounded circular edge(s) connecting to the side of the cylindrical pedestal 320b, domed with sharp circular edge(s) connecting to the side of the cylindrical pedestal 320b, domed with rounded circular edge(s) connecting to the side of the cylindrical pedestal 320b, and/or the like.

Pathway 330, as shown in FIGS. 3-6, might include, without limitation, an upper portion 330a on which people may walk, run, or bike, and a base portion 330b that provides sufficient support and/or adhesion to surrounding ground 310. As shown in FIG. 3B, the upper portion 330a might comprise a sloped segment, and in some cases might join or merge with curb 315, particularly where the pathway 330 is a street-corner sidewalk (such as street-corner sidewalk 125b in FIG. 1). According to some embodiments, conduit 325—disposed between (and communicatively coupling) the FDH 320 and one or more of source slot 335, main slot 340, and/or bore hole 345—might comprise a first conduit 325a and a second conduit 325b, as shown in FIG. 3B. In some cases, the second conduit 325b might communicatively couple lines therein with lines in conduit 355. In some instances, the first conduit might communicatively couple lines therein with lines 350 (such as F1 cables, F2 cables, or both).

In some embodiments, F1 or F2 cables might be routed substantially parallel with the second conduit, without themselves being routed through any conduit; in such cases, the F1 cables might run through the channels of the source and/or main slots, might run through a missile bore 325c between the bore hole 345 and the FDH 320 to the FDH 320, might be spliced and distributed by the FDH as F2 cables, and the F2 cables might run through the missile bore 325c to the main slot (and might further run through channels in the main slot(s), cross slot(s), and/or far-side slot(s)). The F1 and F2 cables might represent individual unidirectional lines that function as separate feed and return lines, might represent individual bi-directional lines that each function as both feed and return lines, or might represent a combination of unidirectional and bi-directional lines for carrying signals from the CO to the FDH, from the FDH to a NAP, from the NAP to the FDH, from the FDH to the CO, and/or the like.

With reference to FIG. 3C, a top surface 370a of capping material 370 is shown substantially level with a top portion of ground surface 305a of roadway 305. Also shown in FIG. 3C, the filler material 365 substantially fills at least the bottom portion of groove or channels 340a, up to the capping material 370, thereby submerging, and filling interstitial spaces between components of, the plurality of lines 350 and the conduit/microduct 355. In some cases, the filler material 365 and the capping material 370 might be the same material.

In some embodiments, the roadway surface 305a in which the source slot is disposed might correspond to a first ground surface, the roadway surface 305a in which the main slot is disposed might correspond to a second ground surface, and ground surface 310 in which the container of the FDH is disposed might correspond to a third ground surface. As shown in FIG. 3, the second ground surface might be a roadway surface, while the third ground surface might be a non-roadway surface. In some cases, curb surface 315a might represent a portion of a roadway surface, while curb surface 315b might represent a portion of a non-roadway surface. In some embodiments, the third ground surface might extend from the container 320a to the channels of the apical conduit system, and thus might comprise a combination of roadway 305, ground 310, and curb 315.

Turning to FIG. 3D, rather than using a microduct/cable capture device 360 to hold the microduct/cables in place within the channel 340a, a tacking technique may be implemented. In some embodiments, an initial application of the filler material 365 may be implemented, resulting in a first filler material 365a being disposed in the channel 340a. Upon application of the first filler material 365a, at least some of the lines 350 and/or the conduit/microduct might float to a surface portion of the first filler material 365a. Within a certain period (e.g., about 5 minutes, about 15 minutes, about 60 minutes, or longer, or any period between about 5-60 minutes), the first filler material 365a might begin to set, thereby acting as a tack coating to hold the microduct/cables in place within the channel 340a. A further application of the filler material 365 may be implemented after the tack coating has been applied, resulting in a second filler material 365b (which may, in some cases be the same material or same type of material as the first filler material 365a) being disposed in the channel 340a above the first filler material 365a.

In some embodiments, the first filler material 365a and the second filler material 365b might be different materials. In such cases, the first filler material 365a might comprise a material that, when set, may be more easily cut with a knife or other sharp-edged tool (by hand, for example), while the second filler material 365b might comprise thermosetting material including, without limitation, polyurea or other materials, which are more resilient. Further, in such cases, after the tack coat layer with the first filler material 365a, a second layer of the first filler material 365a might be applied on top of the tack coat layer in order to completely cover all microducts and/or cables (which may have floated to a surface of the first filler material 365a upon initial application of the tack coat layer). Once all the microducts and/or cables are completely submerged or encapsulated within the first filler material 365a, and the first filler material 365a has had time to set, then the second filler material may be applied. In this manner, if repairs have to be made to any broken fiber lines or other cables or conduits (as described below with respect to FIGS. 9 and 10), it will be easier to access the broken fiber lines or other cables or conduits within the first filler material 365a, as compared with accessing the broken fiber lines or other cables or conduits when they are embedded within polyurea or other similar materials (which are extremely resilient to most cutting implements).

FIG. 4 shows the relative configurations, positions, and arrangement of one embodiment of the system for implementing FTTP, in which the lines from the NAP 380 are communicatively coupled with lines 350b within the main slot 340 and with lines 350c within the cross slot 375, via the second bore hole 345b. Some of lines 350c might communicatively couple with lines within conduits 325d leading to individual NIDs/ONTs (e.g., NID or ONT 170 in FIG. 1). In some embodiments, the cross slot 375 might be positioned to align with conduit 325 (or missile bore 325c); this allows a single bore hole 345a to serve as an intersection amongst the main slot 340, the cross slot 375, and the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, and the conduit 325 (or missile bore 325c) leading to the NAP 380.

In the embodiment of FIG. 4, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, and bore hole 345b, relative to roadway 305 and ground 310, other than as shown in FIG. 4.

FIG. 5 shows the relative configurations, positions, and arrangement of one embodiment of the system for implementing FTTP, in which the lines 350c from a far-side slot 390 (which are routed through cross slot 375 from the NAP 380) are communicatively coupled with lines within conduit 325 leading to hand hole 385. Lines 350c from hand hole 385 might communicatively couple with lines within conduits 325d leading to individual NIDs/ONTs (e.g., NID or ONT 170 in FIG. 1).

Although hand hole 385 is shown connecting with two (or more) conduits 325d, the hand hole 385 is merely optional (and may be omitted); in such cases, the conduit 325 might communicatively couple lines 350c through conduits 325d directly (e.g., via splitting, forking, or manifold connectors, or the like) to corresponding ones of the NIDs/ONTs (e.g., NID or ONT 170 in FIG. 1). Further, the various embodiments allow for any configuration of the pathway 330, curb 315, hand hole 385, far-side slot 390, road lines 395, and bore hole 345b, relative to roadway 305 and ground 310, other than as shown in FIG. 5.

FIG. 6 shows the relative configurations, positions, and arrangement of one embodiment of the system for implementing FTTP, in which the lines from the NAP 380 are communicatively coupled with lines 350b within the main slot 340 and with lines 350c within the cross slot 375, via one second bore hole 345b, and in which lines 350c within cross slot 375 are communicatively coupled with lines 350c in far-side slot 390 and lines 350c in conduit 325 leading to hand hole 385. Some of lines 350c might communicatively couple with lines within conduits 325d leading to individual NIDs/ONTs (e.g., NID or ONT 170 in FIG. 1), either directing from the NAP 380, from the NAP 380 through hand hole 385, from the NAP 380 through cross slot 375, through conduit 325, and through hand hole 385, or from the NAP 380 through cross slot 375, through far-side slot 390, through conduit 325, and through hand hole 385, or the like. In some embodiments, the cross slot 375 might be positioned to align with conduit 325 (or missile bore 325c); this allows a single bore hole 345a to serve as an intersection amongst any combination of the main slot 340, the cross slot 375, far-side slot 390, and/or the conduit 325 (or missile bore 325c) leading to the NAP 380. In alternative embodiments, the cross slot 375 may be positioned relative to the main slot 340 without regard to the position of conduit 325 (or missile bore 325c); in such embodiments, however, additional bore holes 345b may be necessary at intersections of two of the main slot 340, the cross slot 375, far-side slot 390, and the conduit 325 (or missile bore 325c) leading to the NAP 380.

In the embodiment of FIG. 6, the NAP 380 comprises a direct bury NAP 380. However, any suitable type of NAP may be implemented. Further, although hand hole 385 is shown in conjunction with NAP 380, the hand hole 385 is merely optional (and may be omitted); in such cases, the NAP 380 might communicatively couple lines 350c through conduits 325d directly to corresponding ones of the NIDs/ONTs (e.g., NID or ONT 170 in FIG. 1). Further, the various embodiments allow for any configuration of the pathway 330, curb 315, NAP 380, hand hole 385, main slot 340, cross slot 375, far-side slot 390, road lines 395, and bore hole 345b, relative to roadway 305 and ground 310, other than as shown in FIG. 6.

FIG. 7 shows various configurations for implementing curb transitions for communicatively coupling lines within an apical conduit system and lines within a ground-based signal distribution device when implementing FTTP. In the embodiment of FIG. 7A, a substantially horizontal missile bore 325c establishes a path through curb 315, as well as through ground 310 and roadway 305. The missile bore 325c allows conduits 325a and 325b (as well as other cables) to be routed between one of the slots (including, without limitation, source slot 335, main slot 340, cross slot 375, far-side slot 390, and/or the like) and one of the ground-based signal distribution devices (including, but not limited to, FDH 320, NAP 380, hand hole 385, and/or the like).

FIG. 7B depicts an embodiment in which a substantially horizontal missile bore 325c establishes a path through only the ground 310 and connects with a bore hole 345b that extends deeper than the roadway 305 and into the ground 310 beneath. In some cases, an L-shaped conduit connection might be attached to the conduits 325a and 325b to bring the lines 350c closer in depth to the channel 340a and/or to the missile bore 325g. In alternative cases, the conduits 325a and 325b might be similar, or identical to, those shown in FIG. 7A, i.e., without the L-shaped conduit connection in the bore hole 345b.

FIG. 7C depicts an embodiment in which an angled missile bore 325c (set at an angle θ) establishes an angled path through curb 315, as well as through ground 310 and roadway 305. In some embodiments, the angle theta may be any suitable angle, including, but not limited to, 15°, 20°, 30°, 45°, 60°, 75°, or any angle within the range of 10° and 80°, relative to a plane that is substantially parallel with at least one of surface 305a, 315a, or 370a. The embodiment shown in FIG. 7C is otherwise similar, if not identical to, that shown in FIG. 7A, and description of similar components and features are similarly applicable.

Figure 8:
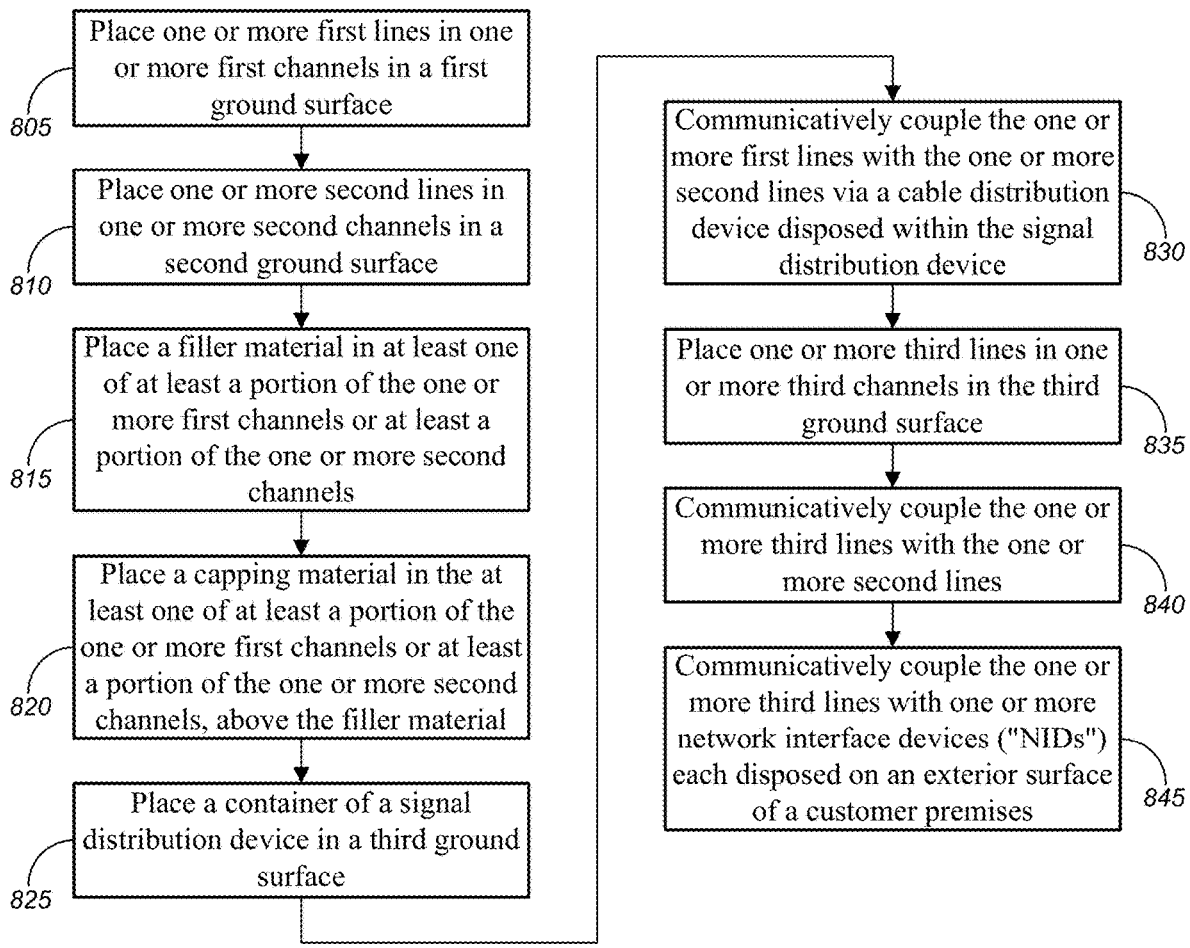
FIG. 8 is a flow diagram illustrating a method for implementing FTTP, in accordance with various embodiments.

We now turn to FIG. 8, which is a flow diagram illustrating a method 800 for implementing FTTP, in accordance with various embodiments. While the techniques and procedures are depicted in FIG. 8 in a certain order for purposes of illustration, it should be appreciated that certain procedures may be reordered and/or omitted within the scope of various embodiments, and that various embodiments might comprise only portions of the illustrated method, each of which can be considered methods in their own right. Moreover, the method illustrated by FIG. 8 can be implemented using any suitable hardware or hardware implementation. Similarly, while the systems described herein (and/or components thereof)—such as systems 100 and 300-700 (and/or components thereof) shown in FIGS. 1 and 3-7, respective—can be implemented according to the method illustrated by FIG. 8, the systems 100 and 300-700 can also operate according to other modes of operation and/or be implemented by performing other suitable procedures. It should be further noted that the method illustrated by FIG. 8 (and/or various operations thereof) can be combined with methods disclosed in the Related Applications (and/or various operations thereof) to provide various functionality in accordance with different embodiments.

In the embodiment of FIG. 8, method 800 might comprise placing one or more first lines in one or more first channels in a first ground surface (block 805), placing one or more second lines in one or more second channels in a second ground surface (block 810), and placing a filler material in at least one of at least a portion of the one or more first channels or at least a portion of the one or more second channels (block 815).

According to some embodiments, at least one channel of the one or more first channels and at least one channel of the one or more second channels is the same. In some cases, the one or more first channels and the one or more second channels are different channels. In some instances, the filler material might comprise a thermosetting material, polyurea, other suitable filler material, and/or any combination thereof. In some embodiments, the method 800 might further comprise, at block 820, placing a capping material in the at least one of at least a portion of the one or more first channels or at least a portion of the one or more second channels, above the filler material. In some cases, the capping material might serve as road lines on a roadway surface.

At block 825, method 800 might comprise placing a container of a signal distribution device (including, but not limited to, an FDH, a NAP, a hand hole, and/or the like) in a third ground surface. A top portion of the container might be either substantially level with a top portion of the third ground surface or below the top portion of the third ground surface. In some cases, the top portion of the container might be above the top portion of the third ground surface. According to some embodiments, method 800, at block 830, might comprise communicatively coupling the one or more first lines with the one or more second lines via a cable distribution device disposed within the signal distribution device.

According to a first set of embodiments, the one or more first lines might comprise F1 lines routed from one of a CO, a DSLAM, and/or near/within a block or neighborhood of customer premises, the one or more first channels might comprise at least one of a source slot or a main slot(s) (and any applicable bore holes and/or missile bores), at least a portion of the first ground surface might comprise a roadway surface, and the signal distribution device comprises an FDH. The one or more second lines might comprise F2 lines, the one or more second channels might comprise at least one of a main slot(s) or a cross slot(s) (and any applicable bore holes and/or missile bores), at least a portion of the second ground surface might comprise a roadway surface. The F1 lines might be routed to an FDH, and the F2 lines might be routed through channels of the main slot(s) and/or cross slot(s) to communicatively couple the FDH and a NAP.

Alternatively, according to a second set of embodiments, the one or more first lines might comprise F2 lines routed from a FDH, the one or more first channels might comprise at least one of a main slot or a cross-slot (and any applicable bore holes and/or missile bores), at least a portion of the first ground surface might comprise a roadway surface, and the signal distribution device comprises an NAP. The one or more second lines might comprise F3 lines, the one or more second channels might comprise at least one of a main slot, a cross slot, or a far-side slot (and any applicable bore holes and/or missile bores), and at least a portion of the second ground surface might comprise a roadway surface. The F2 lines might be routed to the NAP, and the F3 lines might be routed through channels of the main slot(s), the cross slot(s) and/or far-side slot(s) to communicatively couple the NAP and one or more NIDs/ONTs each disposed on an exterior surface of a customer premises.

In some embodiments, the configurations and interconnections of the first and second sets of embodiments may be combined. In such embodiments, for example, the first set of embodiments might apply to blocks 805-830, and method 800 might further comprise placing one or more third lines in one or more third channels in the third ground surface (block 835), communicatively coupling, with a NAP, the one or more third lines with the one or more second lines (block 840), and communicatively coupling the one or more third lines with one or more NIDs/ONTs each disposed on an exterior surface of a customer (block 845). In this case, the one or more third lines might comprise F3 lines, the one or more third channels might comprise at least one of a main slot, a cross slot, or a far-side slot (and any applicable bore holes and/or missile bores), and at least a portion of the third ground surface might comprise a roadway surface. The F1 lines might be routed to an FDH, and the F2 lines might be routed through channels of the main slot(s) and/or cross slot(s) between the FDH and the NAP, and the F3 lines might be routed through channels of the main slot(s), the cross slot(s) and/or far-side slot(s) between the NAP and the one or more NIDs/ONTs each disposed on an exterior surface of a customer premises.

When dealing with fiber optic cables (or other lines) disposed in ground surfaces (including, but not limited to, asphalt roadway surfaces, concrete roadway surfaces, asphalt (non-roadway) pathways, concrete (non-roadway) pathways, stone pathways, and/or the like), there is always a risk that the fiber optic cables (or other lines) may be hit, severed, or otherwise damaged, directly or indirectly by either natural occurrences (e.g., earth shifts, earthquakes, storms, fires and/or the like) or man-made occurrences (e.g., construction, carelessness, accidents, explosions, and/or the like). FIGS. 9A-9F (collectively, "FIG. 9") are general schematic diagrams illustrating a method 900 for implementing line repair for FTTP, in accordance with various embodiments. FIGS. 10A-10B (collectively, "FIG. 10") are flow diagrams are shown illustrating various methods 1000 for implementing line repair for FTTP, in accordance with various embodiments.

While the techniques and procedures are depicted in FIGS. 9-10 in a certain order for purposes of illustration, it should be appreciated that certain procedures may be reordered and/or omitted within the scope of various embodiments, and that various embodiments might comprise only portions of the illustrated method, each of which can be considered methods in their own right. Moreover, the method illustrated by FIGS. 9-10 can be implemented using any suitable hardware or hardware implementation. Similarly, while repairs of apical conduit components in the systems described herein (and/or components thereof)—such as systems 100 and 300-700 (and/or components thereof) shown in FIGS. 1 and 3-7, respective—can be implemented according to the method illustrated by FIGS. 9-10, repairs of apical conduit components in the systems 100 and 300-700 can also operate according to other modes of operation and/or be implemented by performing other suitable procedures. It should be further noted that the method illustrated by FIGS. 9-10 (and/or various operations thereof) can be combined with methods disclosed in the Related Applications (and/or various operations thereof) to provide various functionality in accordance with different embodiments.

FIG. 9A depicts an undamaged system 900, which comprises roadway 905 on top of ground 910. Within the roadway 905, a channel 915 for a slot (e.g., source slot, main slot, cross slot, far-side slot, and/or the like) is provided, in which one or more lines 920 and one or more conduits/microducts 925 are disposed. The one or more lines 920 might comprise at least one optical fiber line. In some cases, the one or more lines 920 might further comprise at least one conductive signal line (including, but not limited to, copper data lines, copper voice lines, copper video lines, or any suitable (non-optical fiber) data cables, (non-optical fiber) video cables, or (non-optical fiber) voice cables, and/or the like), at least one power line, or both. In some embodiments, some of the one or more lines might be routed through the one or more conduits/microducts 925. A filler material 930 might fill the channel to substantially submerge, encapsulate, or otherwise cover the one or more lines 920 and the one or more conduits/microducts 925. According to some embodiments, a capping material 935 might be placed in the channel, above the filler material 930. A top surface 935*a* of the capping material 935 might, in some instances, serve as road lines on the top surface of roadway 905. The channel 915, the one or more lines 920, the one or more conduits/microducts 925, the filler material 930, and the capping material 935 together form part of an apical conduit system.

FIG. 9B depicts a cut 940 through the apical conduit system. Cut 940 might extend to sever or otherwise damage at least one of the one or more lines 920 and at least one of the one or more conduits/microducts 925. In some cases, the cut 940 might separate the at least one of the one or more lines 920 into a first portion 920*a* and a second portion 920*b*, might separate the at least one of the one or more conduits/microducts 925 into a first portion 925*a* and a second portion 925*b*, might separate the filler material 930 into a first portion 930*a* and a second portion 930*b*. Although FIG. 9B describes it as a cut, cut 940 may represent any sort of hardware, device, or occurrence that results in the lines 920 and/or the microducts 925 being hit, severed, or otherwise damaged. Further, although cut 940 is depicted as being angled with respect to surface 935*a* or road surface 905*a*, cut 940 might be a substantially vertical cut (i.e., a cut substantially perpendicular to a plane defined by surface 935*a* or road surface 905*a*). Also, cut 940 may be angled with respect to a longitudinal extension of channel 915 or substantially perpendicular to channel 915, regardless of whether it is substantially vertical or not. Cut 940, in some cases, might include, but is not limited to, a crater in the roadway 905, depression, or other irregular displacement of the roadway surface or material, and/or the like.

Figure 9C:
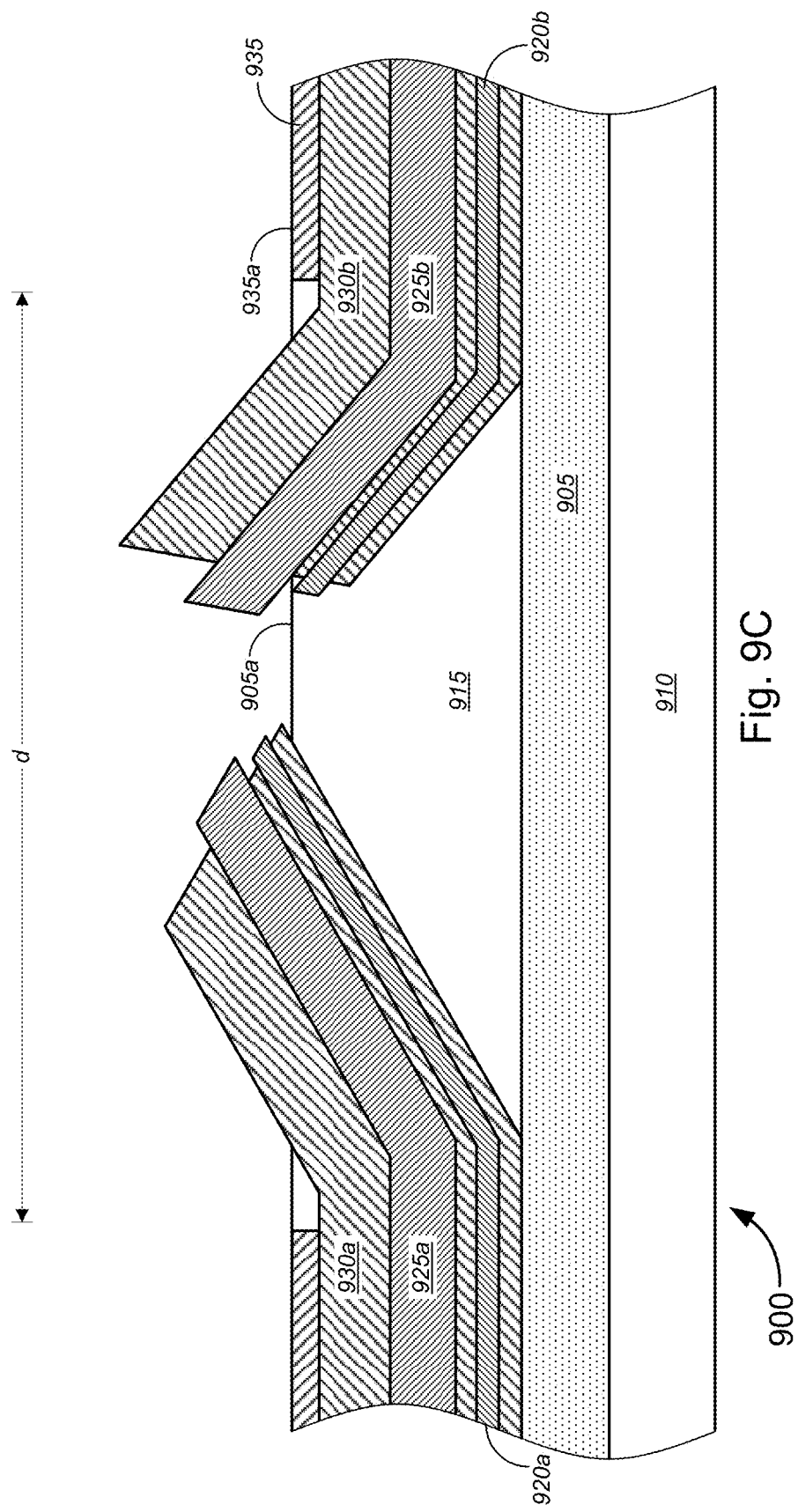
Figure 10A:
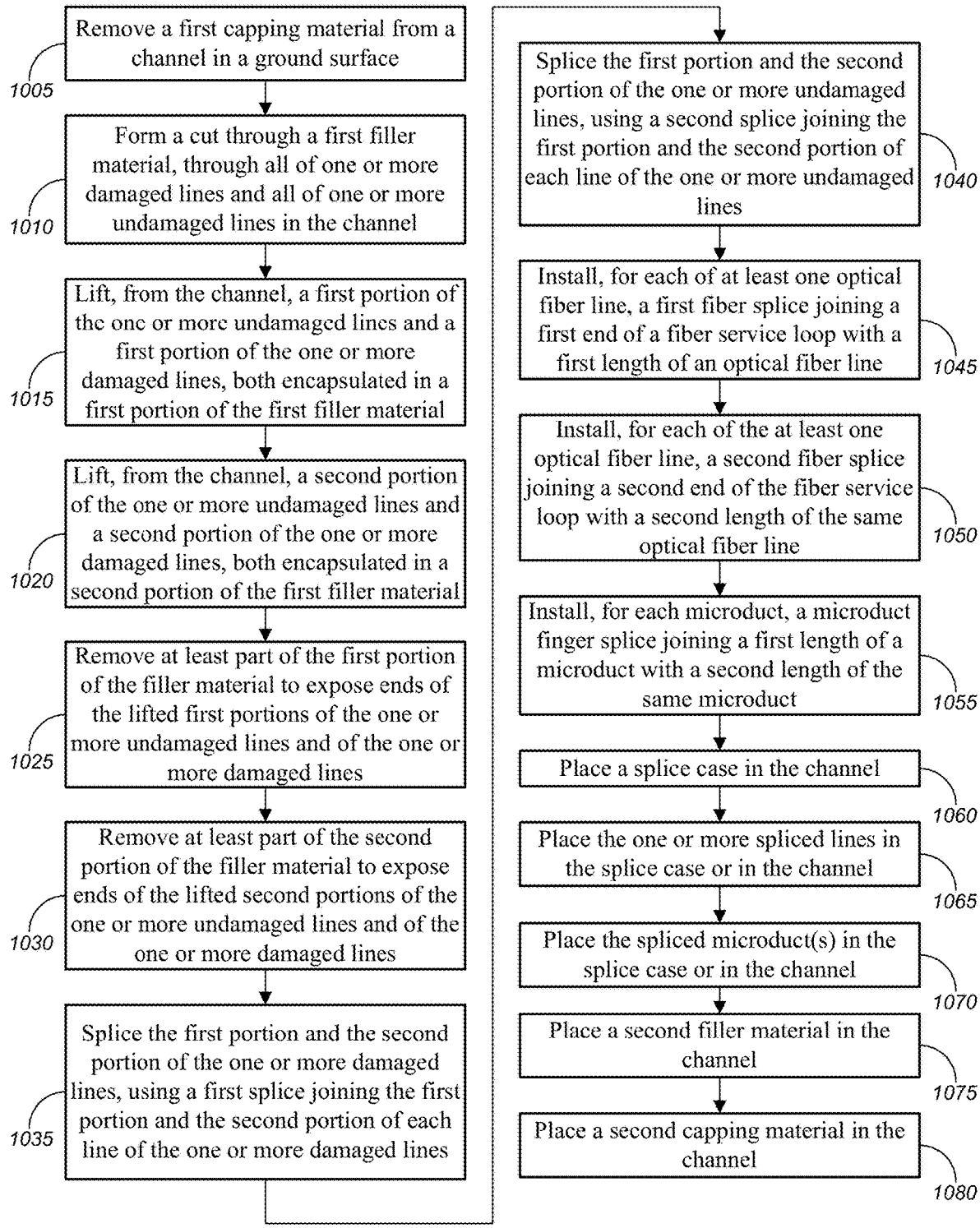
FIGS. 10A-10B are flow diagrams illustrating various methods for implementing line repair for FTTP, in accordance with various embodiments.
Figure 10B:
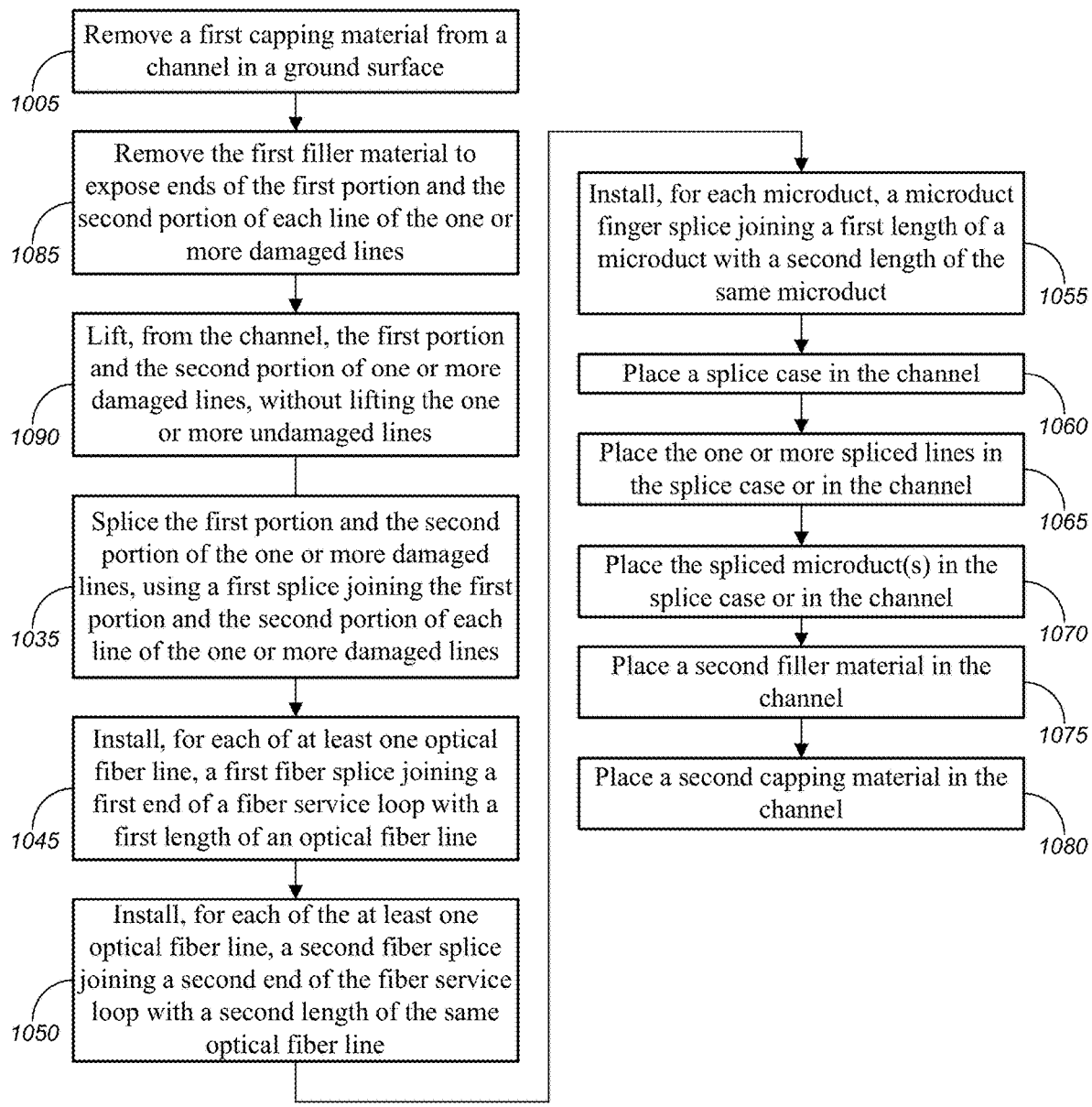

FIG. 9C depicts an embodiment for repairing line cuts, in which the capping material 935 is first removed over a particular or predetermined length d of the channel 915. In some embodiments, length d might a length including, but not limited to, 3 ft (~91.4 cm), 5 ft (~152.4 cm), 10 ft (~304.8 cm), 15 ft (~457.2 cm), 20 ft (~609.6 cm), 30 ft (~914.4 cm), or any range of lengths between 2 ft (70.0 cm) and 40 ft (~1219.2 cm), with the length d centered approximately about the position of the cut 940. Subsequently, the first portion 920*a* of the one or more lines 920 and the first portion 925a of the one or more conduits/microducts 925, both encapsulated in the first portion 930a of the filler material (collectively, "the first portion of the apical conduit system"), may together be lifted from channel 915. Concurrently, or serially, the second portion 920b of the one or more lines 920 and the second portion 925b of the one or more conduits/microducts 925, both encapsulated in the second portion 930b of the filler material (collectively, "the second portion of the apical conduit system"), may together be lifted from channel 915.

Figure 9D:
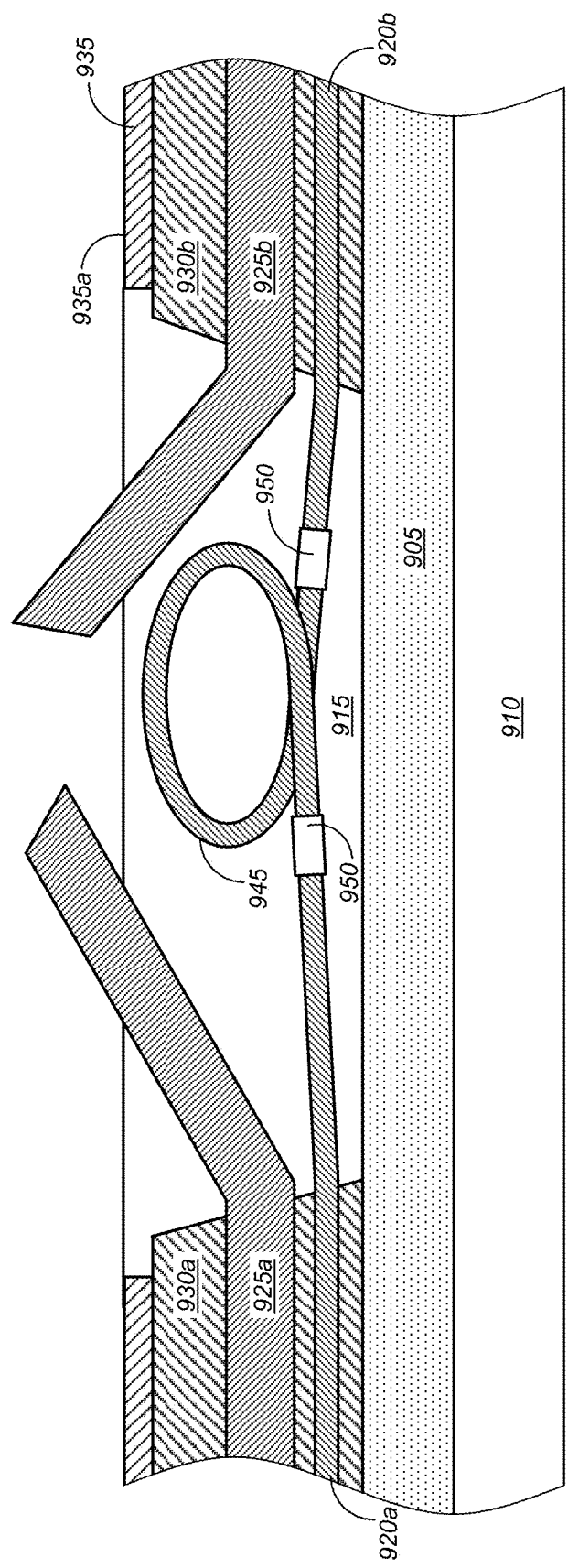

In FIG. 9D, the first portion 930a and the second portion 930b of the filler material 930 may be removed to expose the one or more lines 920 and the one or more conduits/microducts 925. The first portion 920a of the one or more lines 920 may be spliced with the second portion 920b of the one or more lines 920, using one or more first splices 950 joining each line of the first portion 920a with lines of a service loop 945 and using one or more second splices 950 joining each line of the second portion 920b with lines of the service loop 945. In some cases, the one or more lines 920 might comprise optical fiber lines, and the service loop 945 might comprise an optical fiber loop 945. In such cases, the splices 950 might comprise optical fiber line splices configured to splice the optical fiber lines in each portion 920a/920b of the lines 920 with the corresponding end of the optical fiber loop 945.

In FIG. 9E, the first portion 925a and the second portion 925b of the one or more conduits/microducts 925 may be spliced together, using splice 955, which might include, without limitation, a microduct finger splice, a microduct straight connector, a microduct push-fit connector, a microduct snap-in connectors, a conduit splice, a pipe/tube fitting, and/or the like. The spliced one or more lines 920 and the spliced one or more conduits/microducts 925, may thereafter be placed in the channel 915.

As shown in FIG. 9F, the channel 915 may be filled with the filler material 930 to encapsulate the spliced one or more lines 920 and the spliced one or more conduits/microducts 925, and capping material 930 may be placed over the filler material 930. In some embodiments, the spliced one or more lines 920 and the spliced one or more conduits/microducts 925 may be placed within a splice case 960 that is itself placed in channel 915, prior the filler material 930 and the capping material 935 being placed in the channel 915.

According to some embodiments, prior to lifting the first and second portions of the apical conduit system, it may be necessary to purposefully cut undamaged lines in the at least one or more lines 920 and/or undamaged portions of the one or more conduits/microducts 925. In alternative embodiments, only the damaged lines (and/or microducts) are handled for repair, without disturbing undamaged lines (and/or microducts).

Turning to FIG. 10, various methods 1000 may be used to implement repairs to damaged lines in an apical conduit system. In one embodiment (as shown in FIG. 10A), after determining that one or more lines have been damaged, and identifying the location of the damage, method 1000 might comprise removing a first capping material from a channel in a ground surface (block 1005), and forming a cut through a first filler material, through all of one or more damaged lines and all of one or more undamaged lines in the channel (block 1010). Method 1000 might further comprise, at block 1015, lifting, from the channel, a first portion of the one or more undamaged lines and a first portion of the one or more damaged lines, both encapsulated in a first portion of the first filler material, and, at block 1020, lifting, from the channel, a second portion of the one or more undamaged lines and a second portion of the one or more damaged lines, both encapsulated in a second portion of the first filler material. At block 1025, method 1000 might comprise removing at least part of the first portion of the filler material to expose ends of the lifted first portion of the one or more undamaged lines and the lifted first portion of the one or more damaged lines. At block 1030, method 1000 might comprise removing at least part of the second portion of the filler material to expose ends of the lifted second portion of the one or more undamaged lines and the lifted second portion of the one or more damaged lines.

Method 1000 might further comprise splicing the first portion and the second portion of the one or more damaged lines, using a first splice joining the first portion and the second portion of each line of the one or more damaged lines (block 1035) and splicing the first portion and the second portion of the one or more undamaged lines (which have been purposefully cut at block 1010), using a second splice joining the first portion and the second portion of each line of the one or more undamaged lines (block 1040). At block 1045, method 1000 might comprise installing, for each of at least one optical fiber line, a first fiber splice joining a first end of a fiber service loop with a first length of an optical fiber line. Method 1000, at block 1050, might comprise installing, for each of the at least one optical fiber line, a second fiber splice joining a second end of the fiber service loop with a second length of the same optical fiber line. Method 1000 might, at block 1055, comprise installing, for each microduct, a microduct finger splice joining a first length of a microduct with a second length of the same microduct. Although a microduct finger splice is described herein, any other suitable microduct splice may be used, including, but not limited to, a microduct straight connector, a microduct push-fit connector, a microduct snap-in connectors, a conduit splice, a pipe/tube fitting, and/or the like.

Method 1000 might further comprise (optionally) placing a splice case in the channel (block 1060), placing the one or more spliced lines in the splice case (if used) or in the channel (if the splice case is not used) (block 1065), placing the spliced microduct(s) in the splice case (if used) or in the channel (if the splice case is not used) (block 1070), placing a second filler material in the channel (block 1075), and placing a second capping material in the channel (block 1080). In some cases, the first and second filler materials may be the same type of material, including, but not limited to, thermosetting material, polyurea, and/or the like. The first and second capping materials may, in some cases, be the same type of material, including, without limitation, thermosetting material (such as polyurea or the like), safety grout, asphalt sealer, concrete sealer, and/or the like.

In an alternative embodiment, as shown in FIG. 10B, method 1000 might comprise removing a first capping material from a channel in a ground surface (block 1005), removing the first filler material to expose ends of the first portion and the second portion of each line of the one or more damaged lines (block 1085), and lifting, from the channel, the first portion and the second portion of one or more damaged lines, without lifting the one or more undamaged lines (block 1090). The remainder of method 1000 might be similar, if not identical to blocks 1035 and 1045-1080 of FIG. 10A. In particular, method 1000 might further comprise, at block 1035, splicing the first portion and the second portion of the one or more damaged lines, using a first splice joining the first portion and the second portion of each line of the one or more damaged lines. At block 1045, method 1000 might comprise installing, for each of at least one (damaged) optical fiber line, a first fiber splice joining a first end of a fiber service loop with a first length of an optical fiber line. Method 1000, at block 1050, might comprise installing, for each of the at least one (damaged) optical fiber line, a second fiber splice joining a second end of the fiber service loop with a second length of the same optical fiber line. Method 1000 might, at block 1055, comprise installing, for each microduct, a microduct finger splice joining a first length of a microduct with a second length of the same microduct. Although a microduct finger splice is described herein, any other suitable microduct splice may be used, including, but not limited to, a microduct straight connector, a microduct push-fit connector, a microduct snap-in connectors, a conduit splice, a pipe/tube fitting, and/or the like.

Method 1000 might further comprise (optionally) placing a splice case in the channel (block 1060), placing the one or more spliced lines in the splice case (if used) or in the channel (if the splice case is not used) (block 1065), placing the spliced microduct(s) in the splice case (if used) or in the channel (if the splice case is not used) (block 1070), placing a second filler material in the channel (block 1075), and placing a second capping material in the channel (block 1080). In some cases, the first and second filler materials may be the same type of material, including, but not limited to, thermosetting material, polyurea, and/or the like. The first and second capping materials may, in some cases, be the same type of material, including, without limitation, thermosetting material (such as polyurea or the like), safety grout, asphalt sealer, concrete sealer, and/or the like.

Figure 11E:
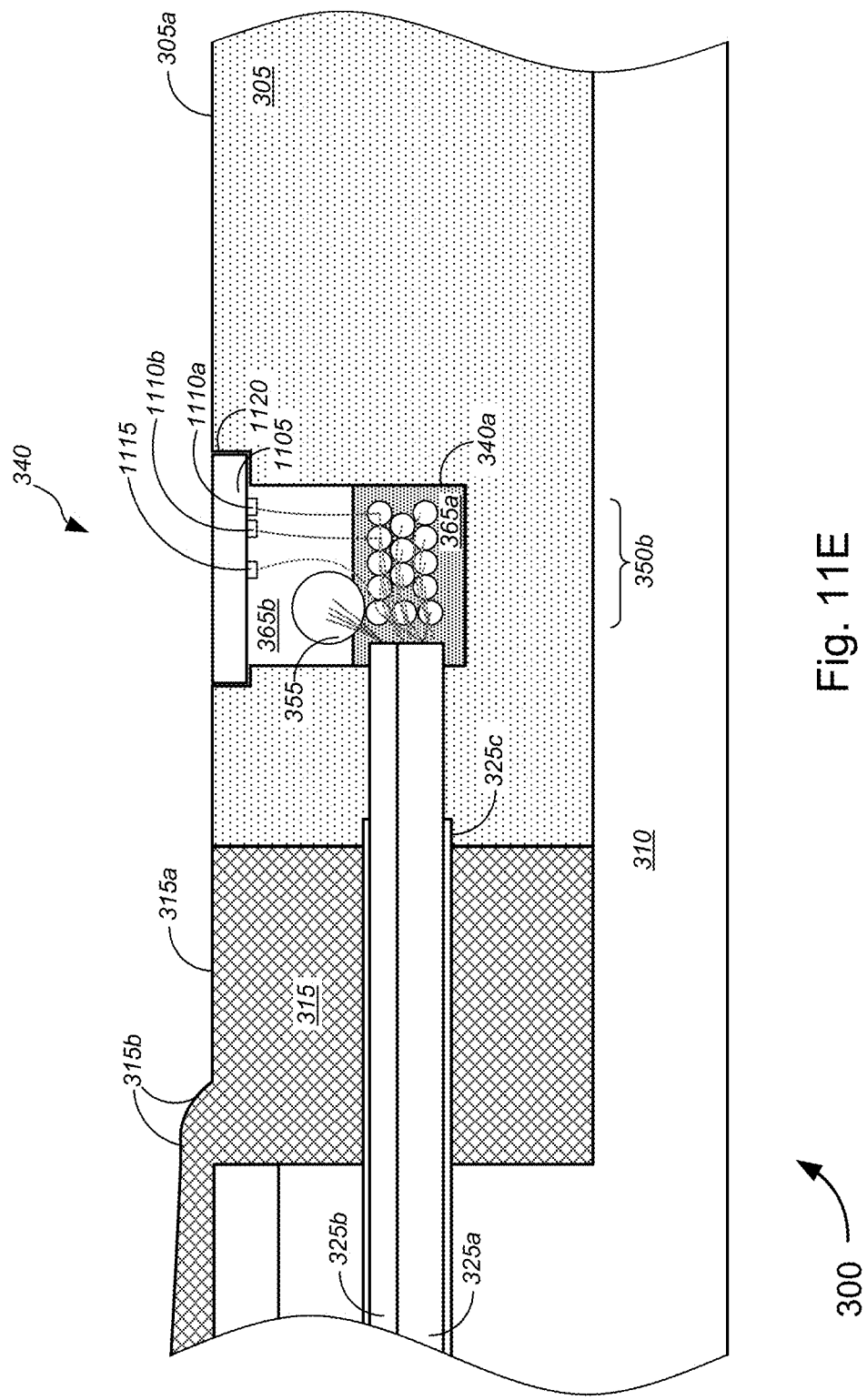

FIGS. 11A-11E (collectively, "FIG. 11") are general schematic diagrams illustrating various views of a system 1100 for communicatively coupling lines within an apical conduit system and lines within a wireless access point device that is located with a channel of the apical conduit system for implementing FTTP, in accordance with various embodiments. FIG. 11A shows a top view of a section 1100 of ground in which components of an apical conduit system are disposed. FIG. 11B shows a partial sectional view of the system 1100 of FIG. 11A, as shown along the E-E direction indicated in FIG. 11A. FIG. 11C shows an alternative embodiment of the top view of the section 1100 of ground in which components of an apical conduit system are disposed. FIGS. 11D and 11E show various embodiments of a partial sectional view of the system or section 1100 of FIG. 11C, as shown along the F-F direction indicated in FIG. 11C. System or section 1100 in FIG. 11 generally corresponds to a section of ground as, for example, indicated by (but not necessarily precisely depicting) dash-lined rectangle 1100 shown in FIG. 1. In FIG. 11, long-dashed lines forming circles and denoted 1100a might represent a cut-out view, in which certain layers or portions of components within the apical conduit system are purposely omitted for ease of illustration.

In the embodiment of FIG. 11, system 1100 might comprise roadway 305, ground 310, curb 315, pathway 330, source slot 335, main slot 340, lines 350, conduit/microduct 355, filler material 365, capping material 370, cross slot 375, far-side slot 390, and road lines 395, and/or the like, which are described in detail with respect to FIGS. 3-7 above. In some instances, roadway 305 might be made of asphalt, concrete, and/or the like. Ground 310 might comprise soil (in some cases, compacted soil), mud, clay, rock, and/or the like. Curb 315 might be made of concrete or the like. A sub-base layer (not shown) might be disposed between the roadway 305 and ground 310. In some cases, curb 315 might comprise a portion of a roadway surface 315a and a portion of a non-roadway surface 315b.

As shown in FIG. 11A, a wireless access point device 1105 might be disposed within channel 340a along with lines 350b and conduit/microduct 355 (in some cases, in-line with 350b and/or conduit/microduct 355). Wireless access point device 1105 might be any suitable device, including, but not limited to, wireless access point device 250 as described in detail above with respect to FIG. 2K (in such a case, description of the wireless access point device 250 is applicable to the wireless access point device 1100 of FIG. 11). In this manner, a wireless access point may be embedded in a roadway surface, thereby allowing wireless connectivity by user devices nearby (e.g., in the neighborhood), while preventing potential tampering by people, as the device is embedded in the roadway surface (compared with some wireless access points which might be accessible via hand holes or other such container structures that, in some cases, might not have secure locking mechanisms, for example).

With reference to FIG. 11B, wireless access point device 1105 might be disposed within channel 340a along with lines 350b and conduit/microduct 355, and when the first filler material 365a has been applied, the wireless access point device 1105 (like at least some of the lines 350b and conduit/microduct 355) might rise or float to a surface of the first filler material 365a. Upon setting, the first filler material 365a might hold the wireless access point device 1105 (along with the lines 350b and conduit/microduct 355) in place within channel 340a. In some embodiments, if the first filler material 365a is different from the second filler material 365b, the first filler material 365a might further be applied again (after setting of the tack coat layer) to fully or completely submerge or encapsulate the lines, conduits, and wireless access point device 1105, in a manner similar to that as described above with respect to FIG. 3D.

As shown in FIG. 11B, wireless access point device 1105 might further comprise ports or pass-throughs 1110 and 1115 that allow power lines and data lines to communicatively couple with the wireless access point contained therein. With reference to both FIGS. 2K and 11B, the ports or pass-throughs 1110a and 1110b might allow pass-through of data lines (e.g., F2 or F3 lines) to communicatively couple with data input/output ports of the wireless access point to allow wireless connectivity with user devices nearby. In some cases, the ports or pass-throughs 1110a and 1110b might be on the same wall of the container or housing of the wireless access point device 1105, while, in other cases, the ports or pass-throughs 1110a and 1110b might be on opposing walls of the container or housing of the wireless access point device 1105 (e.g., as shown in FIG. 2K). The port or pass-through 1115 allows a power line to communicatively couple with the power supply port of the wireless access point to provide power to the wireless access point. Although FIGS. 1 and 11 show only one wireless access point device 1105 being disposed within a channel of the apical conduit system, any suitable number of wireless access point devices 1105 may be distributed throughout one or more channels of the apical conduit system within any particular area (e.g., residential neighborhood, commercial district, a downtown area, or other population centers, etc.) depending on the wireless connectivity requirements of the people in those areas.

In FIGS. 11C and 11D, rather than being in-line with (or directly on top of) the lines 350b and/or conduit/microduct 355, as in the case with the embodiments of FIGS. 11A and 11B, an embodiment (or set of embodiments) may be implemented or provided in which the wireless access point device 1105 might be disposed at or near the top of the channel or slot 340 of the apical conduit system. In some cases, depressions or grooves 1120 may be provided or cut into the road surface 305 at or near the top of the channel. The depressions or grooves 1120 might have an overall shape corresponding to a shape of the container or housing of the wireless access point device 1105 (in the case of the embodiment as shown in FIGS. 11C and 11D, the shape would be circular; but any suitable polygonal shape may be used, so long as the shape of the depressions or grooves 1120 corresponds to the shape of the wireless access point device 1105). As shown in FIG. 11D (and in FIG. 2L), the ports or pass-throughs 1110 and 1115 might be provided on a bottom surface of the container or housing of the wireless access point device 1105. This configuration allows for ease of connection of the cables (i.e., signal as well as power cables) that are disposed within the channel with the ports (e.g., ports 265 and 270 as shown in FIG. 2L) of the wireless access point contained within the container or housing of the wireless access point device. This configuration further allows for ease of access to the wireless access point within the wireless access point device (e.g., through a lid, cover, or other openable/closeable mechanism on a top surface of the wireless access point device (not shown) that would not be covered by the filler material (which, in some cases, may be a resilient material from which it may be difficult to access components (e.g., wires, lines, wireless access point devices, etc.) that are encapsulated therein). Capping material, on the other hand, is far easier to remove than the filler material (e.g., polyurea or the like).

When installing the wireless access point device 1105 in a channel or slot in which the lines and conduits may already be disposed, one or more lines (containing data/signal lines and containing a power line) may be communicatively coupled to the corresponding ports in the wireless access point (e.g., ports 265-270) via ports or pass-throughs 1110-1115. Once the wireless access point and the wireless access point device have been wired and otherwise configured, the wireless access point device may be disposed on the depression or groove 1120. Thereafter, the tack coat layer of the filler material 365a may be applied (if not utilizing the conduit/cable capture device 360). After setting, the filler material 365b may be applied a second time (and may cover a portion of the wireless access point device 1105, but not a top surface thereof). In some cases, the capping material may be applied to cover both the wireless access point device 1105, along with the filler material in the channel.

With reference to FIG. 11E, rather than covering the wireless access point device 1105 with the capping material as shown in FIG. 11D, the wireless access point is made flush with the top surface 305a of the roadway 305. In such a case, the depression or groove 1120 need not be as deep as in the embodiment of FIG. 11D. The embodiment of FIG. 11E is otherwise similar or identical to the embodiment of FIG. 11D, and the descriptions of FIG. 11D may be applied to FIG. 11E.

In some embodiments (not shown), the wireless access point device 1105, which might have dimensions to fit within the channel (without the use of the depressions or grooves 1120), might be disposed in the channel after communicatively coupling to one or more lines or cables disposed in the channel and after application of the tack coat layer (as described with respect to FIG. 3D). After the wireless access point device 1105 floats or rises to the top portion of the second application of the filler material, more of the filler material may be applied (followed by the capping material) or the capping material may be applied directly over top of the wireless access point device 1105 and the rest of the filler material already placed in the channel.

In the embodiments of FIGS. 11C-11E, because the wireless access point device is larger than the channel (i.e., the wireless access point device is about 2-3 inches in diameter), it is possible that a tire of a vehicle might run over or rest on top of the device (either directly or through the capping material layer). Accordingly, the container or housing of the wireless access point device 1105 must be made to be weight-bearing or otherwise capable of withstanding the weight of a vehicle (even a large vehicle) as focused through the point of contact at the bottom portion of a tire of the vehicle. In contrast, in the embodiment of FIGS. 11A-11B, the wireless access point device 1120 is small enough to fit within the channel or slot, which might have a width that is smaller than a width of a tire of a vehicle—in which case, the roadway 305 on either side of the channel would distribute and hold the weight of the vehicle (especially when the filler material, which in some cases is stronger than conventional asphalt or concrete, has filled a substantial portion of the channel).

According to some embodiments, accessing the wireless access point within the wireless access point device (after installation) may be similar to the processes for accessing and repairing damaged lines or conduits as described in detail with respect to FIGS. 9 and 10. For example, in some embodiments, for wireless access point devices similar to that as shown in FIG. 11E, in which the wireless access point device is accessible at surface 305a of roadway 305, a method of repairing, upgrading, or accessing for other purposes (e.g., testing or the like) the wireless access point or other components of the wireless access point device might include, without limitation, accessing, via a lid of a wireless access point device that is disposed within at least a portion of a channel in a ground surface, a wireless access point contained within the wireless access point device. In some cases, this might include open the lid of the container of the wireless access point device. In some instances, this might include removing the lid of the container. Thereafter, the method might include repairing or replacing at least one component of the wireless access point, upgrading the at least one component, and/or testing the at least one component, or the like. The lid may subsequently be closed.

For wireless access point devices that are covered by a capping material (as shown, for example, in FIG. 11D, the method of repairing, upgrading, or accessing for other purposes (e.g., testing or the like) the wireless access point or other components of the wireless access point device might include, without limitation, removing a first capping material from the channel in the ground surface (the capping material covering the wireless access point device); accessing, via the lid of the wireless access point device that is disposed within at least a portion of the channel in the ground surface, a wireless access point contained within the wireless access point device; repairing or replacing at least one component of the wireless access point, upgrading the at least one component, and/or testing the at least one component, or the like; closing the lid of the wireless access point device; and placing a second capping material in the channel over the wireless access point device, after closing the lid of the wireless access point device.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    placing one or more first lines in one or more first channels in a first ground surface;
    placing one or more second lines in one or more second channels in a second ground surface;
    placing a filler material in at least one of at least a portion of the one or more first channels or at least a portion of the one or more second channels;
    placing a container comprising a signal distribution device in a third ground surface, a top surface of a lid of the container being substantially level with a top portion of the third ground surface, wherein a bottom portion of the container is below the third ground surface, and wherein an antenna is disposed completely within the lid of the container, wherein the signal distribution device comprises a fiber distribution hub ("FDH"), wherein the one or more first lines communicatively couples at least one of a central office or a digital subscriber line access multiplexer ("DSLAM") of a telecommunications service provider with the FDH, wherein the one or more second lines communicatively couples the FDH with a network access point ("NAP"); and
    communicatively coupling the one or more first lines with the one or more second lines via a cable distribution device disposed within the signal distribution device.

2. The method of claim 1, wherein each of the one or more first lines or the one or more second lines comprises one or more of at least one conduit, at least one optical fiber, at least one conductive signal line, or at least one power line via the container.

3. The method of claim 2, wherein the at least one conductive signal line comprises at least one of one or more data cables, one or more video cables, or one or more voice cables.

4. The method of claim 1, further comprising:
    placing one or more third lines in one or more third channels in the third ground surface;
    communicatively coupling, with a network access point ("NAP"), the one or more third lines with the one or more second lines; and
    communicatively coupling the one or more third lines with one or more network interface devices ("NIDs") each disposed on an exterior surface of a customer premises.

5. The method of claim 1, wherein at least one channel of the one or more first channels and at least one channel of the one or more second channels is the same channel.

6. The method of claim 1, wherein the filler material comprises a thermosetting material.

7. The method of claim 1, wherein at least a portion of the first ground surface is a roadway surface, wherein at least a portion of the second ground surface is one of a roadway surface or a non-roadway surface, and wherein at least a portion of the third ground surface is a non-roadway surface.

8. The method of claim 7, further comprising placing a capping material in the at least one of at least a portion of the one or more first channels or at least a portion of the one or more second channels, above the filler material.

9. The method of claim 8, wherein the capping material serves as road lines on the roadway surface.

10. A communications system, comprising:
    an apical conduit system, comprising:
        one or more first lines disposed in one or more first channels in a first ground surface;
        one or more second lines disposed in one or more second channels in a second ground surface; and
        a filler material disposed around at least one of the one or more first lines in at least a portion of the one or more first channels or around at least one of the one or more second lines in at least a portion of the one or more second channels;
    a signal distribution device, comprising:
        a container disposed in a third ground surface, a top surface of a lid of the container being substantially level with a top portion of the third ground surface, wherein a bottom portion of the container is below the third ground surface, wherein an antenna is disposed completely within the lid of the container, wherein the signal distribution device is contained within the container, and wherein the signal distribution device comprises a fiber distribution hub ("FDH"), wherein the one or more first lines communicatively couples at least one of a central office or a digital subscriber line access multiplexer ("DSLAM") of a telecommunications service provider with the FDH, wherein the one or more second lines communicatively couples the FDH with a network access point ("NAP"); and
        a cable distribution device disposed within the signal distribution device and configured to communicatively couple the one or more first lines with the one or more second lines.

11. The communications system of claim 10, further comprising:
    a wireless access point device comprising a device container and an antenna disposed in the device container, the wireless access point device being disposed within at least a portion of one of the one or more first channels in the first ground surface, the antenna being communicatively coupled to at least one of the one or more first lines via one or more pass-throughs in a wall of the device container.

12. The communications system of claim 11, wherein the wireless access point device is at least partially encapsulated by the filler material.

13. The method of claim 1, wherein the lid of the container is made of a material that provides predetermined omnidirectional azimuthal radio frequency ("rf") gain.

14. The method of claim 1, wherein the third ground surface is at least one of a sidewalk or a driveway.

15. The method of claim 1, wherein at least one of the one or more first channels or the one or more second channels comprise one or more capture devices, wherein the one or more capture devices each comprise at least one hooked end.

16. The method of claim 15, wherein each of the one or more capture devices are anchored to a sidewall of at least one of the one or more first channels or the one or more second channels.

17. The method of claim 15, wherein each of the one or more capture devices secure at least one of the one or more first lines or the one or more second lines to a bottom of at least one of the one or more first channels or the one or more second channels.

* * * * *